US012681451B2

(12) United States Patent
Kihara et al.

(10) Patent No.: US 12,681,451 B2
(45) Date of Patent: Jul. 14, 2026

(54) SCENARIO MANAGEMENT DEVICE, SCENARIO MANAGEMENT METHOD, AND A COMPUTER-READABLE RECORDING MEDIUM RECORDING A PROGRAM CAUSING A COMPUTER TO FUNCTION AS THE SCENARIO MANAGEMENT DEVICE

(71) Applicant: Keyence Corporation, Osaka (JP)

(72) Inventors: Kazunori Kihara, Osaka (JP); Kengo Yanase, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 987 days.

(21) Appl. No.: 17/900,900

(22) Filed: Sep. 1, 2022

(65) Prior Publication Data

US 2023/0108676 A1     Apr. 6, 2023

(30) Foreign Application Priority Data

Oct. 4, 2021     (JP) ................................. 2021-163225
Mar. 3, 2022     (JP) ................................. 2022-032226

(51) Int. Cl.
*G05B 19/042*          (2006.01)

(52) U.S. Cl.
CPC .................... *G05B 19/0426* (2013.01); *G05B 2219/13012* (2013.01)

(58) Field of Classification Search
None
See application file for complete search history.

(56) References Cited

U.S. PATENT DOCUMENTS

| | | | | |
|---|---|---|---|---|
| 7,383,183 B1 * | 6/2008 | Davis | ..................... | G16H 10/60 704/235 |
| 7,558,730 B2 * | 7/2009 | Davis | ..................... | G10L 15/26 704/235 |
| 8,131,557 B2 * | 3/2012 | Davis | ..................... | G10L 15/26 704/235 |
| 2003/0101054 A1 * | 5/2003 | Davis | ..................... | G10L 15/26 704/235 |

(Continued)

FOREIGN PATENT DOCUMENTS

| | | | | |
|---|---|---|---|---|
| CN | 103003875 A | * | 3/2013 | .......... G10H 1/0008 |
| CN | 104981794 A | * | 10/2015 | .......... G06F 40/205 |

(Continued)

*Primary Examiner* — Shelley Chen
(74) *Attorney, Agent, or Firm* — Kilyk & Bowersox, P.L.L.C.

(57)          ABSTRACT

To reduce the amount of code that needs to be written by a user and facilitate creation of an automation program. A method of creating an automation program that automates an operation of performing transcription to a second application, based on data acquired from a first application, the method including: a step of selecting the first application and the second application and creating a schematic procedure; a step of selecting, a range to be desirably acquired from out of data of the first application; a step of holding data in the range in a memory section as table data in a table format; a step of designating the transcription destination of the second application to which data based on the table data is to be transcribed; and a step of generating the automation program based on the schematic procedure, the range, and the transcription destination.

9 Claims, 51 Drawing Sheets

(56)                    References Cited

U.S. PATENT DOCUMENTS

| | | | |
|---|---|---|---|
| 2006/0149558 A1* | 7/2006 | Kahn | G10L 15/063 |
| | | | 704/278 |
| 2011/0022387 A1* | 1/2011 | Hager | G06Q 10/107 |
| | | | 715/752 |
| 2011/0224974 A1* | 9/2011 | Davis | G10L 15/26 |
| | | | 704/E21.001 |
| 2012/0123975 A1 | 5/2012 | Lin et al. | |
| 2021/0225377 A1* | 7/2021 | Zhao | G06F 40/166 |
| 2021/0405616 A1 | 12/2021 | Yamamoto et al. | |
| 2023/0068878 A1* | 3/2023 | Dwivedi | G10L 15/26 |

FOREIGN PATENT DOCUMENTS

| | | | | |
|---|---|---|---|---|
| CN | 108476168 B | * | 11/2020 | G06F 18/2178 |
| EP | 0144244 A2 | * | 6/1985 | G06F 15/163 |
| JP | 2005339213 A | | 12/2005 | |

* cited by examiner

130

NAVIGATION MODE     _ □ ✕

DESIGNATE FILE NAME, SHEET NAME, CELL RANGE, AND
NAME TO BE ASSIGNED TO EXTRACTED TABLE.
☑ ACQUIRE FIRST ROW AS NAME

FILE NAME:
SHEET NAME:
CELL:
NAME OF EXTRACTED TABLE: EXPENSE LIST TABLE

132

RETURN    NEXT

| ITEM NUMBER | AMOUNT | ARTICLE NAME | USE | STATEMENT NO. |
|---|---|---|---|---|
| 1 | 1073 | COPY PAPER | PRINTER | |
| 2 | 2166 | USB MEMORY | RECORDING MEDIUM | |
| 3 | 567 | MAGNET | FOR WHITE BOARD | |

FIG. 22B

| ITEM NUMBER | AMOUNT | ARTICLE NAME | USE | STATEMENT NO. |
|---|---|---|---|---|
| 1 | 1073 | COPY PAPER | PRINTER | |
| 2 | 2166 | USB MEMORY | RECORDING MEDIUM | |

FIG. 23

| CUSTOMER NAME | CUSTOMER CODE | STATE |
|---|---|---|
| KANA ENGINEERING | 123456 | PENDING NEGOTIATION |
| KANA HOLDINGS | 234567 | PRESENCE OF TRANSACTION HISTORY |
| | | |

| CUSTOMER CODE | MAIL ADDRESS |
|---|---|
| 123456 | aaaa@aaaa.aaaa.co.jp |
| 234567 | bbbb@bbbb.bbbb.co.jp |
| 345678 | cccc@cccc.cccc.co.jp |

FIG. 24

| CUSTOMER NAME | CUSTOMER CODE | STATE | MAIL ADDRESS |
|---|---|---|---|
| KANA ENGINEERING | 123456 | PENDING NEGOTIATION | aaaa@aaaa.aaaa.co.jp |
| KANA HOLDINGS | 234567 | PRESENCE OF TRANSACTION HISTORY | bbbb@bbbb.bbbb.co.jp |

FIG. 25

| CUSTOMER NAME | CUSTOMER CODE | STATE |
|---|---|---|
| KANA ENGINEERING | 123456 | PENDING NEGOTIATION |
| KANA HOLDINGS | 234567 | PRESENCE OF TRANSACTION HISTORY |

| CUSTOMER NAME | CUSTOMER CODE | STATE |
|---|---|---|
| KANA MANUFACTURE | 345678 | PENDING NEGOTIATION |
| KANA BANK | 456789 | PRESENCE OF TRANSACTION HISTORY |

FIG. 26

| CUSTOMER NAME | CUSTOMER CODE | STATE |
|---|---|---|
| KANA MANUFACTURE | 345678 | PENDING NEGOTIATION |
| KANA BANK | 456789 | PRESENCE OF TRANSACTION HISTORY |
| KANA ENGINEERING | 123456 | PENDING NEGOTIATION |
| KANA HOLDINGS | 234567 | PRESENCE OF TRANSACTION HISTORY |

FIG. 27

| CUSTOMER NAME | CUSTOMER CODE | STATE | MAIL ADDRESS |
|---|---|---|---|
| KANA ENGINEERING | 123456 | PENDING NEGOTIATION | |
| KANA HOLDINGS | 234567 | PRESENCE OF TRANSACTION HISTORY | |
| | 123456 | | aaaa@aaaa.aaaa.co.jp |
| | 234567 | | bbbb@bbbb.bbbb.co.jp |
| | 345678 | | cccc@cccc.cccc.co.jp |

FIG. 28

| CUSTOMER NAME | CUSTOMER CODE | STATE |
|---|---|---|
| KANA MANUFACTURE | 345678 | PENDING NEGOTIATION |
| KANA BANK | 456789 | PRESENCE OF TRANSACTION HISTORY |

| CUSTOMER CODE | MAIL ADDRESS |
|---|---|
| 123456 | aaaa@aaaa.aaaa.co.jp |
| 234567 | bbbb@bbbb.bbbb.co.jp |
| 345678 | cccc@cccc.cccc.co.jp |

FIG. 29

| CUSTOMER NAME | CUSTOMER CODE | STATE |
|---|---|---|
| KANA BANK | 456789 | PRESENCE OF TRANSACTION HISTORY |

FIG. 30

| CUSTOMER NAME | CUSTOMER CODE | STATE |
|---|---|---|
| KANA MANUFACTURE | 345678 | PENDING NEGOTIATION |

FIG. 31

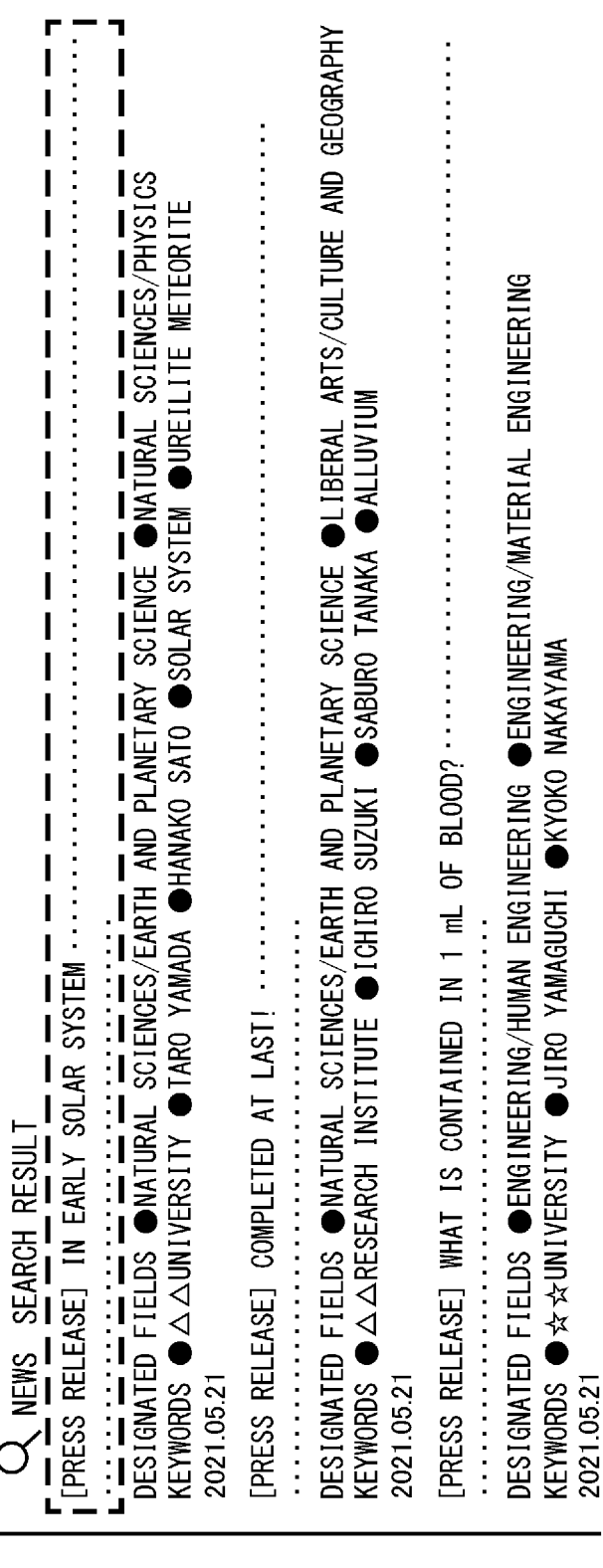

🔍 NEWS SEARCH RESULT

[PRESS RELEASE] IN EARLY SOLAR SYSTEM ......................

DESIGNATED FIELDS ●NATURAL SCIENCES/EARTH AND PLANETARY SCIENCE ●NATURAL SCIENCES/PHYSICS
KEYWORDS ●△△UNIVERSITY ●TARO YAMADA ●HANAKO SATO ●SOLAR SYSTEM ●UREILITE METEORITE
2021.05.21

[PRESS RELEASE] COMPLETED AT LAST! ......................

DESIGNATED FIELDS ●NATURAL SCIENCES/EARTH AND PLANETARY SCIENCE ●LIBERAL ARTS/CULTURE AND GEOGRAPHY
KEYWORDS ●△△RESEARCH INSTITUTE ●ICHIRO SUZUKI ●SABURO TANAKA ●ALLUVIUM
2021.05.21

[PRESS RELEASE] WHAT IS CONTAINED IN 1 mL OF BLOOD? ......................

DESIGNATED FIELDS ●ENGINEERING/HUMAN ENGINEERING ●ENGINEERING/MATERIAL ENGINEERING
KEYWORDS ●☆☆UNIVERSITY ●JIRO YAMAGUCHI ●KYOKO NAKAYAMA
2021.05.21

FIG. 32

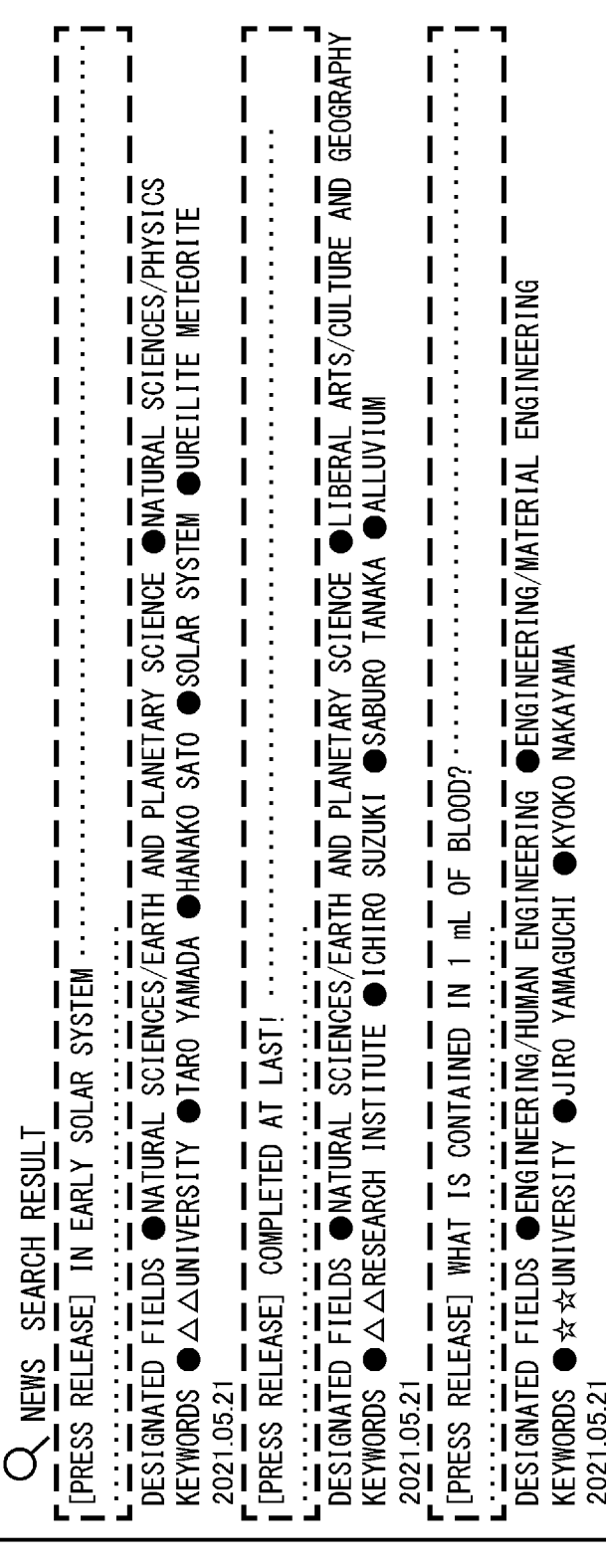

Q NEWS SEARCH RESULT

[PRESS RELEASE] IN EARLY SOLAR SYSTEM

DESIGNATED FIELDS ●NATURAL SCIENCES/EARTH AND PLANETARY SCIENCE ●NATURAL SCIENCES/PHYSICS
KEYWORDS ●△△UNIVERSITY ●TARO YAMADA ●HANAKO SATO ●SOLAR SYSTEM ●UREILITE METEORITE
2021.05.21

[PRESS RELEASE] COMPLETED AT LAST!

DESIGNATED FIELDS ●NATURAL SCIENCES/EARTH AND PLANETARY SCIENCE ●LIBERAL ARTS/CULTURE AND GEOGRAPHY
KEYWORDS ●△△RESEARCH INSTITUTE ●ICHIRO SUZUKI ●SABURO TANAKA ●ALLUVIUM
2021.05.21

[PRESS RELEASE] WHAT IS CONTAINED IN 1 mL OF BLOOD?

DESIGNATED FIELDS ●ENGINEERING/HUMAN ENGINEERING ●ENGINEERING/MATERIAL ENGINEERING
KEYWORDS ●☆☆UNIVERSITY ●JIRO YAMAGUCHI ●KYOKO NAKAYAMA
2021.05.21

EXTRACTION PREVIEW

<u>Value #1</u>

[PRESS RELEASE] IN EARLY SOLAR SYSTEM * * * * *
* * * * * * * * * * * * * * * * * * * * * * * * * * * * *
* * * * * * * * * * * * * * * * * * * * * * * * * * * * *
* * * * * * *

[PRESS RELEASE] COMPLETED AT LAST! * * * * * * * * *
* * * * * * * * * * * * * * * * * * * * * * * *
* * * * * * * * * * * * * * * * * * * * * * * *
* * * * * * * * * * * * *

RESET

DETAILED
SETTING      OK      CANCEL

FIG. 35

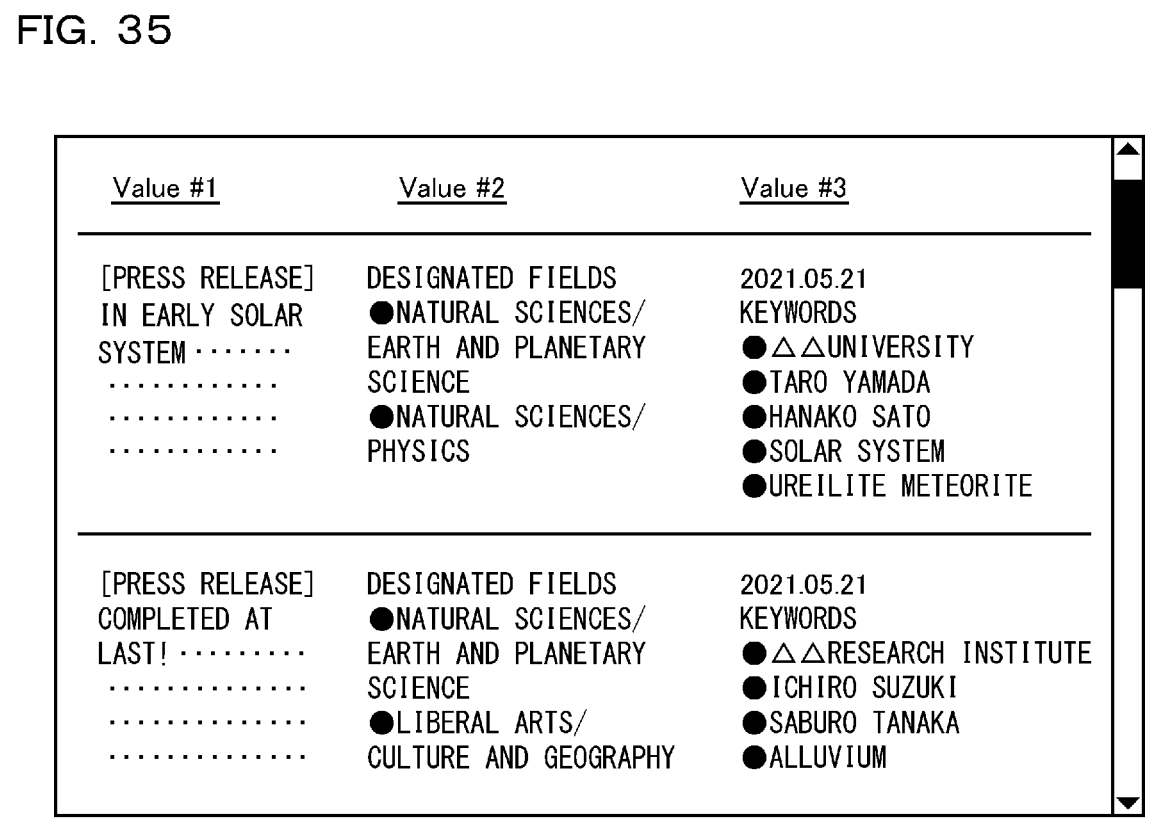

| Value #1 | Value #2 | Value #3 |
| --- | --- | --- |
| [PRESS RELEASE] IN EARLY SOLAR SYSTEM ······· ············ ············ ············ | DESIGNATED FIELDS ●NATURAL SCIENCES/ EARTH AND PLANETARY SCIENCE ●NATURAL SCIENCES/ PHYSICS | 2021.05.21 KEYWORDS ●△△UNIVERSITY ●TARO YAMADA ●HANAKO SATO ●SOLAR SYSTEM ●UREILITE METEORITE |
| [PRESS RELEASE] COMPLETED AT LAST! ········· ············ ············ ············ | DESIGNATED FIELDS ●NATURAL SCIENCES/ EARTH AND PLANETARY SCIENCE ●LIBERAL ARTS/ CULTURE AND GEOGRAPHY | 2021.05.21 KEYWORDS ●△△RESEARCH INSTITUTE ●ICHIRO SUZUKI ●SABURO TANAKA ●ALLUVIUM |

FIG. 44

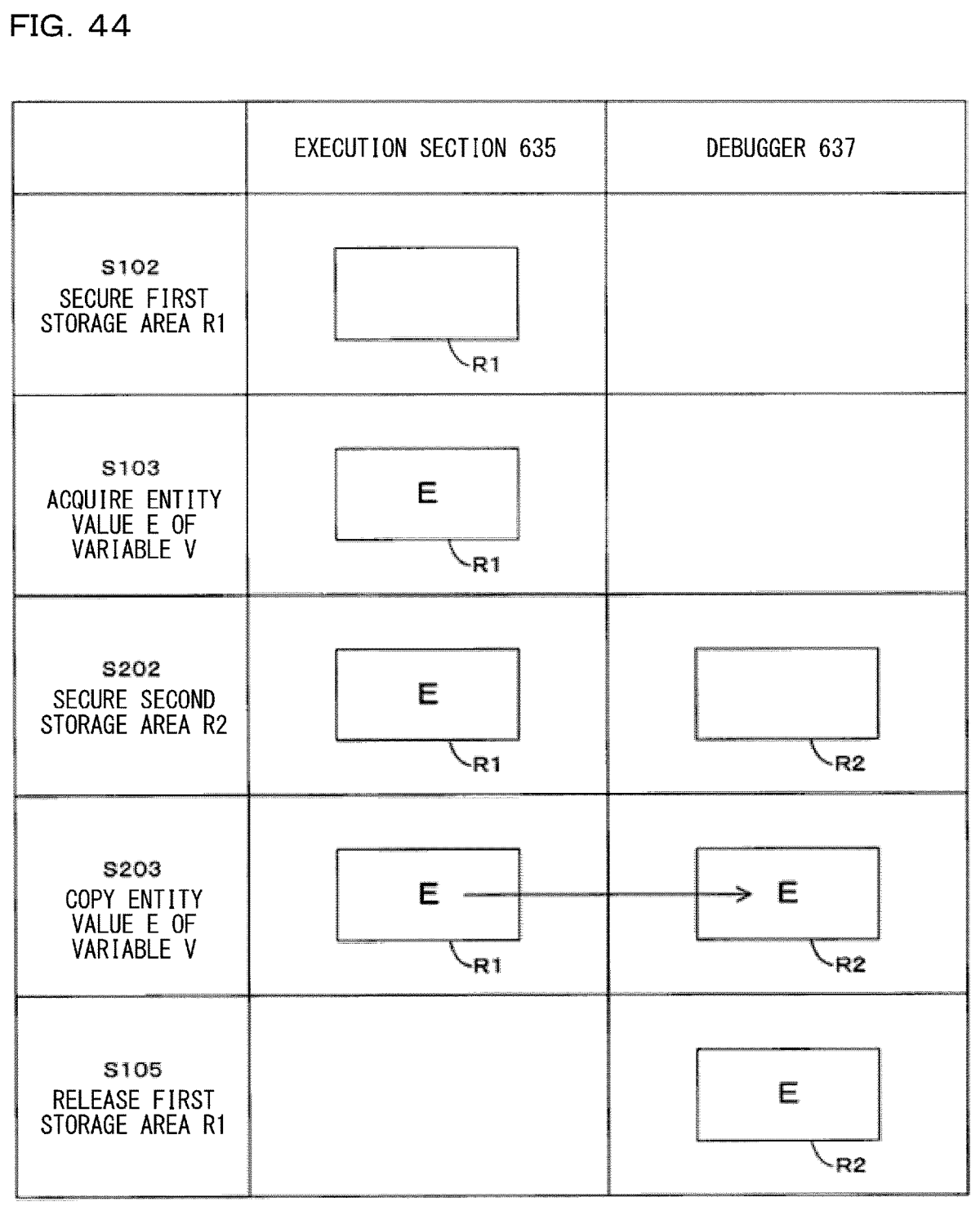

| | EXECUTION SECTION 635 | DEBUGGER 637 |
|---|---|---|
| S102<br>SECURE FIRST<br>STORAGE AREA R1 | R1 | |
| S103<br>ACQUIRE ENTITY<br>VALUE E OF<br>VARIABLE V | E<br>R1 | |
| S202<br>SECURE SECOND<br>STORAGE AREA R2 | E<br>R1 | R2 |
| S203<br>COPY ENTITY<br>VALUE E OF<br>VARIABLE V | E → R1 | E<br>R2 |
| S105<br>RELEASE FIRST<br>STORAGE AREA R1 | | E<br>R2 |

FIG. 45

| SECOND STORAGE AREA R2 | VARIABLE | ENTITY VALUE |
|---|---|---|
| R2(1) | V_t | E_t |
| R2(2) | V_v1 | E_v1 |
| R2(3) | V_v2 | E_v2 |
| R2(4) | V_v3 | E_v3 |

SCENARIO MANAGEMENT DEVICE, SCENARIO MANAGEMENT METHOD, AND A COMPUTER-READABLE RECORDING MEDIUM RECORDING A PROGRAM CAUSING A COMPUTER TO FUNCTION AS THE SCENARIO MANAGEMENT DEVICE

CROSS-REFERENCE TO RELATED APPLICATIONS

The present application claims foreign priority based on Japanese Patent Application No. 2021-163225, filed Oct. 4, 2021, and No. 2022-032226, filed Mar. 3, 2022, the contents of which are incorporated herein by references.

BACKGROUND OF THE INVENTION

1. Field of the Invention

The present disclosure relates to an automation program (scenario) management (including creation) device, a scenario management method, and a computer-readable recording medium recording a program causing a computer to function as the scenario management device.

2. Description of Related Art

In robotic process automation (RPA), a program executes work that has been performed by a person in a desktop environment of a computer, thereby automating the work that has been performed by the person in the desktop environment. In order to create an RPA program that is the program executing the work in the RPA, it is necessary for a user to write a code.

As a solution similar to the RPA, there is known a solution for executing a scenario to manage a storage device instead of a management task of the storage device performed by an operator. In such a solution, a method of facilitating scenario creation using templates is known. JP 2005-339213 A discloses that a scenario is created by embedding a variable in a template.

However, when the technique of generating a desired scenario by embedding a variable in a template is applied to create an RPA program, it may be rather difficult to create the RPA program. Typically, the work performed by the user in the desktop environment of the computer is intended for a plurality of applications, and thus, the work executed by the RPA program is also intended for the plurality of applications. Therefore, it is necessary for the template that can generate the RPA program by embedding the variable to reflect an order in which applications are used in an automation target work.

It is necessary for a creator who creates an RPA program to correctly understand an order of applications to be used and types of variables to be used in the applications for an automation target task, and then select an appropriate template from a wide variety of templates, which is difficult for a person who is unfamiliar with program creation.

SUMMARY OF THE INVENTION

An object of the present disclosure is to provide an automation program creation device, an automation program creation method, an automation program creation program, and computer-readable recording medium and recording instrument which are configured to reduce the amount of code to be written by a user and easily create an automation program while reducing the number of templates.

According to one embodiment of the invention, an automation program creation method is a method of creating an automation program that automates an operation of performing transcription to a second application, which is a transcription destination, based on data acquired from a first application, which is a transcription source, and can include: a step of selecting the first application and the second application and creating a schematic procedure by a schematic procedure creation section; a step of selecting, by an acquisition range designation section, a range to be desirably acquired from out of data of the first application selected by the schematic procedure creation section; a step of holding data in the range set by the acquisition range designation section in a memory section as table data in a table format; a step of designating the transcription destination to which data based on the table data of the second application selected by the schematic procedure creation section is to be transcribed; and a step of generating the automation program based on the schematic procedure created by the schematic procedure creation section, the range set by the acquisition range designation section, and the transcription destination. With the above configuration, the data of the first application is set to be transcribed to the second application in the table format, and thus, it is easy to designate a desirable range to be desirably input for a user, it is easy to image the data to be transcribed, and it is possible to easily create the automation program which is conventionally complicated.

According to one embodiment of the invention, an automation program creation program is an automation program creation program for generating an automation program that automates an operation of performing transcription to a second application, which is a transcription destination, based on data acquired from a first application, which is a transcription source, and can cause a computer to implement: a function of selecting the first application and the second application and creating a schematic procedure by a schematic procedure creation section; a function of selecting, by an acquisition range designation section, a range to be desirably acquired from out of data of the first application selected by the schematic procedure creation section; a function of holding data in the range set by the acquisition range designation section in a memory section as table data in a table format; a function of designating the transcription destination to which data based on the table data of the second application selected by the schematic procedure creation section is to be transcribed; and a function of generating the automation program based on the schematic procedure created by the schematic procedure creation section, the range set by the acquisition range designation section, and the transcription destination. With the above configuration, the data of the first application is set to be transcribed to the second application in the table format, and thus, it is easy to designate a desirable range to be desirably input for a user, it is easy to image the data to be transcribed, and it is possible to easily create the automation program which is conventionally complicated.

Further, according to one embodiment of the invention, a computer-readable recording medium or recording instrument is a medium storing the program or an instrument storing the program. Examples of the recording medium include a CD-ROM, a CD-R, a CD-RW, a flexible disk, a magnetic disk such as a magnetic tape, a MO, a DVD-ROM, a DVD-RAM, a DVD-R, a DVD+R, a DVD-RW, a DVD+RW, Blu-ray (trade name), UHD BD (trade name), and HD DVD (AOD: trade name), an optical disk, a magneto-optical disk, a semiconductor memory, and other media capable of storing programs. In addition, the program also includes an aspect that is downloaded and distributed through a network such as the Internet as well as what is stored in the recording medium and distributed. Further, the recording instrument includes a general-purpose or dedicated instrument on which the program is mounted in a state of being executable in an aspect of software, firmware, or the like. Further, each processing or function included in the program may be executed by program software executable by a computer, or the processing of each unit may be implemented in a format in which hardware such as a predetermined gate array (FPGA or ASIC) or program software and partial hardware modules that implements some elements of hardware are mixed. In addition, the computer-readable recording medium in the present specification includes a non-transitory tangible medium or a transitory propagating signal.

According to one embodiment of the invention, an automation program creation device is an automation program creation device that automates an operation of performing transcription to a second application, which is a transcription destination, based on data acquired from a first application, which is a transcription source, and can include: a schematic procedure creation section configured to select the first application and the second application and create a schematic procedure; an acquisition range designation section configured to select a range to be desirably acquired from out of data of the first application selected by the schematic procedure creation section; a memory section that holds data in the range set by the acquisition range designation section as table data in a table format; a transcription destination designation section that designates the transcription destination to which data based on the table data of the second application selected by the schematic procedure creation section is to be transcribed; and an automation program generation section that generates the automation program based on the schematic procedure created by the schematic procedure creation section, the range set by the acquisition range designation section, and the transcription destination designated by the transcription destination designation section. With the above configuration, the data of the first application is set to be transcribed to the second application in the table format, and thus, it is easy to designate a desirable range to be desirably input for a user, it is easy to image the data to be transcribed, and it is possible to easily create the automation program which is conventionally complicated.

According to one embodiment of the present invention, an automation program creation device is an automation program creation device that automates an operation of performing transcription to a second application, which is a transcription destination, based on data acquired from a first application, which is a transcription source, and can include a processor section that selects an operation of acquiring the data from the first application and an operation of transcribing the data to the second application; selects a range to be desirably acquired from data included in any data file of the selected first application; sets a data transcription unit for transcribing data in the selected range to the second application as acquisition source data in a table format; displays transcription data to be transcribed to the selected second application based on the set data transcription unit; and generates an automation program for transcribing the of the set range of the acquisition source data in the table format of the selected first application to the selected second application based on the set data transcription unit, and a memory section that holds the acquisition source data in the tabular format as table data. With the above configuration, the data of the first application is set to be transcribed to the second application in the table format, and thus, it is easy to designate a desirable range to be desirably input for a user, it is easy to image the data to be transcribed, and it is possible to easily create the automation program which is conventionally complicated.

According to one aspect of the present disclosure, it is possible to reduce the amount of code to be written by the user and facilitate the creation of the automation program while reducing the number of templates.

BRIEF DESCRIPTION OF THE DRAWINGS

FIG. 14 is a schematic view illustrating an example of an operation recording screen;

FIGS. 22A and 22B are schematic views illustrating an example of an expense list table and an example of a newly generated table;

FIG. 23 is a schematic view illustrating tables as combination targets;

FIG. 24 is a table obtained by combining the tables in FIG. 23 based on "customer code";

FIG. 25 is a schematic view illustrating tables as vertical stacking targets;

FIG. 26 is a table in which the tables of FIG. 25 are put together by a table vertical stacking function;

FIG. 27 is a table in which the tables of FIG. 23 are put together by the table vertical stacking function;

FIG. 28 is a schematic view illustrating tables as targets from which a difference is to be obtained;

FIG. 29 is a schematic view illustrating a table generated by obtaining the difference in FIG. 28;

FIG. 30 is a schematic view illustrating a table generated by extracting a common portion in FIG. 28;

FIG. 31 is a schematic view illustrating a state in which a title of one article is manually selected on a target web page;

FIG. 32 is a schematic view illustrating a state in which titles of a plurality of articles are automatically selected on the web page in FIG. 31;

FIG. 35 is a schematic view illustrating another example of the web scraping extraction preview display;

FIG. 44 is a schematic view illustrating operations of variable management executed based on the flowcharts of FIGS. 42 and 43;

FIG. 45 is a schematic view illustrating examples of entity values held in a memory section;

DETAILED DESCRIPTION OF PREFERRED EMBODIMENTS

Figure 1:
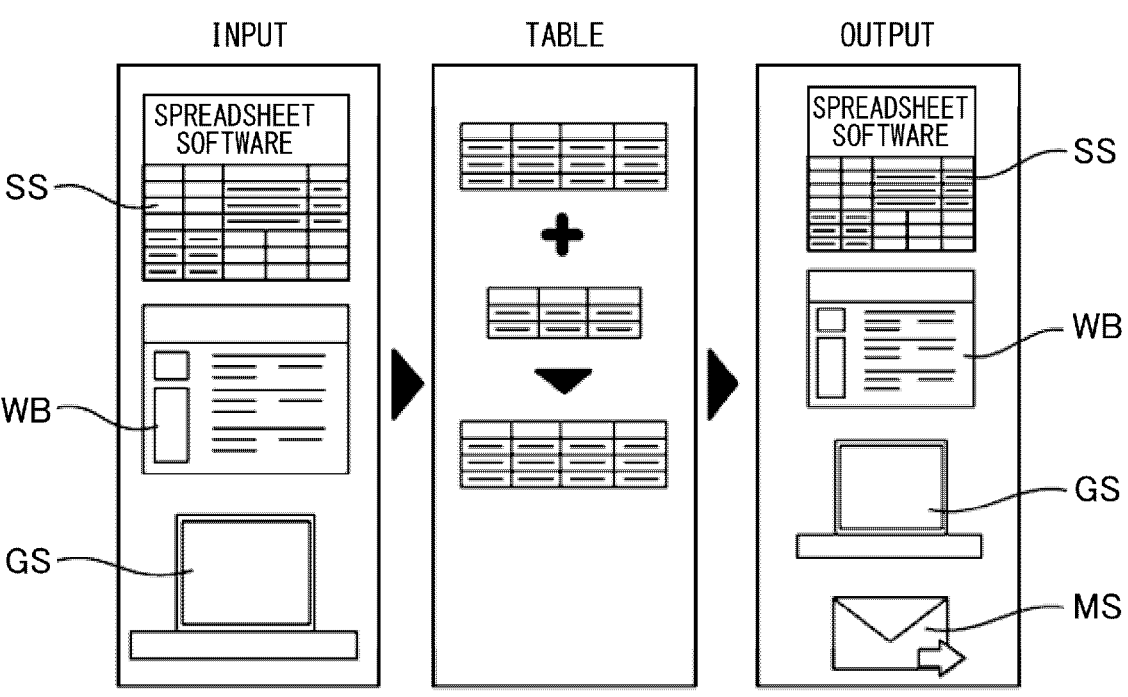
FIG. 1 is a schematic diagram illustrating a series of work to be automated.

Hereinafter, embodiments of the present aspect will be described with reference to the drawings. However, the following embodiments are to exemplify an automation program creation device, an automation program creation method, an automation program creation program, and computer-readable recording medium and recording instrument which are configured for embodying the technical idea of the present invention, and the present invention does not limit the automation program creation device, the automation program creation method, the automation program creation program, and the computer-readable recording medium and recording instrument specifically to those described below. In addition, the present specification does not limit members described in the claims specifically to members of the embodiments. In particular, dimensions, materials, shapes, relative arrangements, and the like of constituent components described in the embodiments are not intended to limit the range of the present invention only thereto unless otherwise specified, and are merely illustrative examples. Note that sizes, positional relationships, and the like of members illustrated in the respective drawings are sometimes exaggerated for clarity of the description. Further, the same names and reference numerals in the following description indicate the same or similar members, and the detailed description thereof is omitted as appropriate. Further, regarding elements constituting the present invention, there may be an aspect in which a plurality of elements are configured as the same member such that one member serves as the plurality of elements, or conversely, a function of one member can also be allotted to and achieved by a plurality of members.

First Embodiment

An automation program creation device as a scenario management device is a device that assists a user in creating a scenario for replacement and automation of work that has been performed by the user in a desktop environment of a personal computer with a program, which is generally called robotic process automation (RPA). FIG. 1 is a conceptual diagram illustrating a method of creating an RPA program for executing transcription work of outputting data in an arbitrary file or data in an application to a form of an arbitrary file or a form of an application using the automation program creation device of the present invention. In FIG. 1, spreadsheet software SS, a web browser WB, and automation target software GS located on the left are transcription source applications that display data to be transcribed by the transcription work. Spreadsheet software SS, a web browser WB, automation target software GS, and mail software MS located on the right in FIG. 1 are transcription destination applications to which data to be transcribed in the transcription work is output. Note that the automation target software GS in the present embodiment represents all applications operable by the user in the desktop environment. For example, the automation target software GS as the transcription source application in the present embodiment represents an application operable by the user other than the spreadsheet software SS and the web browser WB. In addition, for example, the automation target software GS as the transcription destination application in the present embodiment represents an application operable by the user other than the spreadsheet software SS, the web browser WB, and the mail software MS.

In the present embodiment, the transcription work is defined as work of acquiring data from a transcription source application and outputting the data to a transcription destination application. For example, transcription work of transcribing data in a data file of the spreadsheet software SS to another data file of the same spreadsheet software SS is illustrated in FIG. 1 as work of acquiring data from a data file of spreadsheet software SS as the transcription source application illustrated on the left in FIG. 1 and outputting the data or data based on the data to a data file of the spreadsheet software SS as the transcription destination application illustrated on the right in FIG. 1. In addition, work of transcribing data in a page browsed by a web browser into a form of predetermined software is illustrated in FIG. 1 as work of acquiring data from the web browser WB as the transcription source application illustrated on the left in FIG. 1 and outputting the data or data based on the data to the automation target software GS as the transcription destination application illustrated on the right in FIG. 1.

When the user creates the RPA program for executing such transcription work, it is necessary to consider which data is to be treated as a variable and how to treat the variable. For example, it is necessary to consider which data is to be acquired from a transcription source application as what kind of variable, how the acquired data is to be edited and processed into data to be output to the transcription destination, and which variable is to be output to a transcription destination application in which manner. It is difficult for a user who is unfamiliar with a program to create the program while considering how to treat variables. In the present embodiment, data acquired from the transcription source application is held as a table as illustrated in FIG. 1, thereby facilitating designation regarding how to handle variables. Details will be described later.

Figure 2:
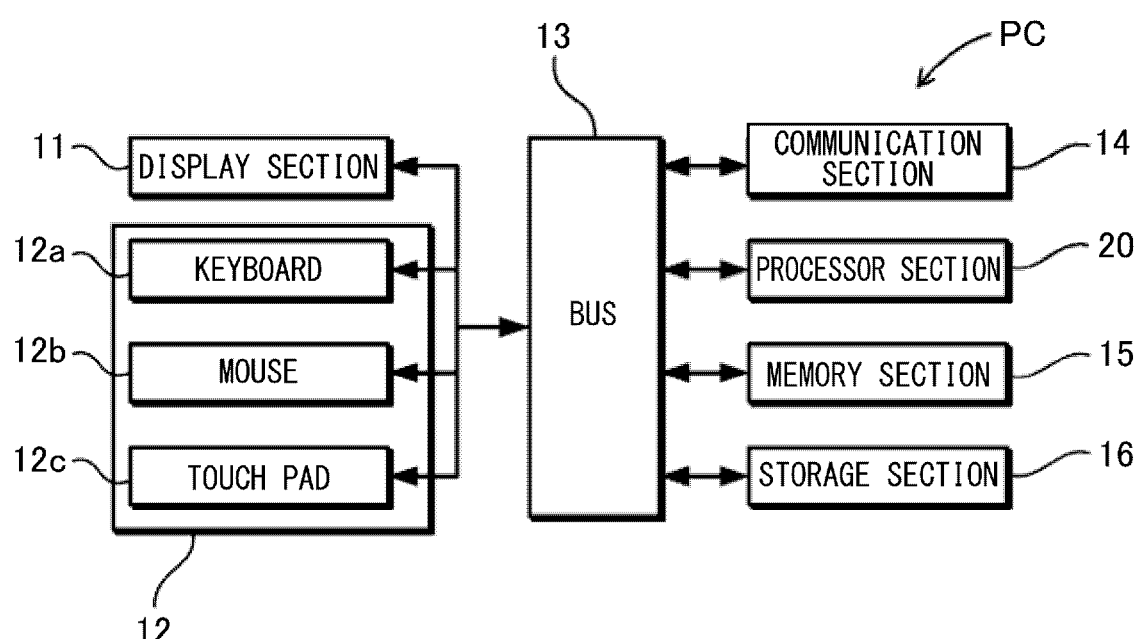
FIG. 2 is a block diagram illustrating a hardware configuration of an automation program creation device according to one embodiment of the present invention.

FIG. 2 illustrates a configuration of a general-purpose computer PC that functions as the automation program creation device according to the present embodiment. The computer PC includes a display section 11 such as a display, an input section 12, a bus 13, a communication section 14, a processor section 20, a memory section 15, and a storage section 16. When an automation program creation program as a scenario management program is installed in the computer PC, the computer PC functions as the automation program creation device. Although the general-purpose computer PC functions as the automation program creation device in the present embodiment, a dedicated automation program creation device may be configured by hardware.

The display section 11 displays screen information provided by the respective applications illustrated in FIG. 1 or the automation program creation program. The display section 11 is configured by, for example, a liquid crystal display (LCD), an organic EL, or the like. The display section 11 may be configured by a touch panel, and in this case, the touch panel serves as both the display section 11 and the input section 12. The input section 12 is an input device such as a keyboard 12a, a mouse 12b, or a touch pad 12c. The bus 13 forms a data transmission path configured to transmit and receive data between the respective members. The communication section 14 is a member configured to perform data communication with an external instrument, and a standardized communication interface or module, such as Ethernet (trade name) or IEEE 802.x, can be used. The connection with the external instrument can be performed in a wired or wireless manner in this manner. The processor section 20 is a member that performs various types of computation and processing, and can be suitably achieved by a CPU, an MPU, an SoC, an ASIC, or the like. The memory section 15 allows a load module to be deployed when a computer program is executed, and holds temporary data and the like generated when the computer program is executed. As such a memory section 15, a RAM configured by a volatile memory, such as an SRAM or an SDRAM, or a ROM including a nonvolatile memory such as an EEPROM can be used. The storage section 16 is a member configured to hold various kinds of information such as an automation program execution file, data, or setting information. The storage section 16 is configured by a hard disk, a semiconductor memory, a portable medium, and the like.

(Processor Section 20)

Figure 3:
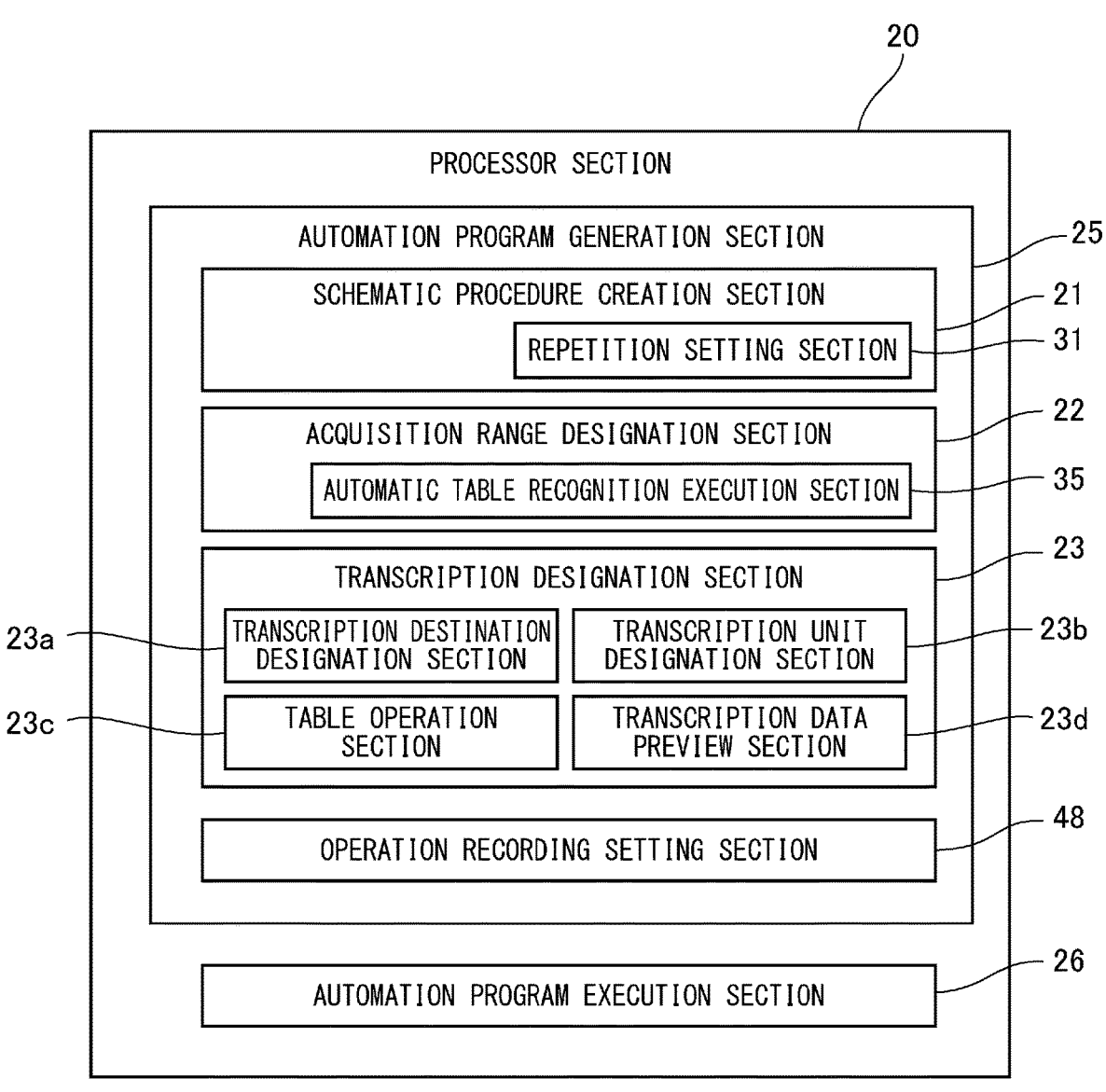
FIG. 3 is a functional block diagram of a processor section of FIG. 2.

FIG. 3 is a functional block diagram illustrating functions of the processor section 20 of the computer PC that functions as an automation program creation device according to the present embodiment. The processor section 20 includes an automation program generation section 25 as a scenario generation section and an automation program execution section 26 as a scenario execution section. The automation program generation section 25 is a functional block configured to generate an automation program, and includes a schematic procedure creation section 21, an acquisition range designation section 22, a transcription designation section 23, and an operation recording setting section 48. The automation program execution section 26 is a functional block configured to execute the automation program generated by the automation program generation section 25.

The schematic procedure creation section 21 is a functional block configured to set a schematic procedure indicating transmission and reception of data between applications in transcription work to be automated. The schematic procedure creation section 21 includes a repetition setting section 31. The repetition setting section 31 is a functional block configured to set a procedure to be repeatedly performed out of the schematic procedure set by the schematic procedure creation section 21.

The acquisition range designation section 22 is a functional block configured to designate a range in which data to be acquired exists out of data of a transcription source application, and displays screen information for designating the range or receives designation of the user for the screen information. In the present embodiment, the data of the transcription source application includes data included in a file treated by the transcription source application and data included in the screen information displayed by the function of the transcription source application. For example, a case where a transcription source application is the spreadsheet software SS and data is acquired from a file displayed in a table format by the spreadsheet software SS is a case where the data included in the file treated by the transcription source application is acquired. In this case, designation of a range in which the data to be acquired in the file exists is received. In particular, in a case where the data is acquired from the file displayed in a table format by the spreadsheet software SS, the range in which the data to be acquired exists is designated by designating a row and a column of the table. In addition, for example, a case where a transcription source application is the automation target software GS and a character string displayed by a function of this software is acquired as data is a case where the data included in the screen information displayed by a function of the transcription source application is acquired. In this case as well, designation of a range in which the character string to be acquired in the screen information exists is received. Note that, although details will be described later, in a case where it is difficult to designate data by a method specific to a target application, such as the designation of data based on a row and a column in the spreadsheet software SS, an acquisition range of the data is designated by a function of the operation recording setting section 48 to be described later.

In addition, the acquisition range designation section 22 includes an automatic table recognition execution section 35. The automatic table recognition execution section 35 is a functional block that extracts data from a file that is treated by the spreadsheet software SS but has a shape in which pieces of data are not regularly arranged so that it is difficult for the user to designate a range of data to be acquired, and shapes the data into a shape which allows the user to easily designate the range. For example, in the case of a file including a portion intended as a table and a portion not intended as a table, a table is extracted by recognizing a portion surrounded by ruled lines as the portion intended as the table. In addition, a table is extracted by, for example, recognizing a cell combined over a plurality of columns as a cell of a single column. Further, for example, when data is extracted from a plurality of files, a table is extracted by adding names of the files indicating extraction sources of rows as a new column. In this manner, a table shaped into the shape that allows the user to easily designate the range is generated by appropriately applying a known algorithm. The user designates a row and a column with respect to the shaped table, thereby designating the range in which the data to be acquired exists.

Data of the transcription source application for which the range in which the data to be acquired exists has been designated by the acquisition range designation section 22 in this manner is held in the memory section 15 as table data.

In a case where a transcription source application is the spreadsheet software SS, data included in the transcription source application is arranged for each column displayed on the spreadsheet software SS to generate table data. In a case where a table has been recognized by the automatic table recognition execution section as well, data is arranged based on the shaped table to generate table data. That is, the spreadsheet software SS is an application in which data is arranged according to a row and a column as rules that are easy to use for the generation of table data. In addition, in a case where a transcription source application is the web browser WB, data to be visible to the user through the web browser WB is arranged according to an html tag. Therefore, the data included in the transcription source application is arranged for each tag to generate table data. That is, the web browser WB is an application in which data is arranged according to tag information as a rule that is easy to use for the generation of table data. When an application in which data is arranged according to a rule that is easy to use for the generation of table data is the transcription source application in this manner, the table data is generated according to the rule. Note that the spreadsheet software SS and the web browser WB have been exemplified in the present embodiment as the applications in which the data is arranged according to the rule that is easy to use for the generation of table data, but the present invention is not limited thereto. In a case where data of a transcription source application is arranged according to a certain rule and the rule is known, a method of generating table data from the data of the transcription source application can be set in the acquisition range designation section 22 in advance, and thus, it can be said that the data arrangement is performed according to the rule that is easy to use for the generation of table data. In this case, when a type of the transcription source application is set by the schematic procedure creation section 21, a corresponding table data generation method is applied, and the table data is generated from the data of the transcription source application, which is similar to the spreadsheet software SS and the web browser WB. In the table data, the data is arranged according to the rule for the data arrangement in the transcription source application. Note that a column name of the generated table data may be appropriately set by the user.

In addition, in a case where the acquisition range designation section 22 does not support a data arrangement rule of the automation target software GS as a transcription source application, for example, a case where the automation target software GS is an application used only in a certain company, it is difficult to generate table data according to the data arrangement rule of the automation target software GS. In such a case, a data acquisition range is designated by the function of the operation recording setting section 48 as described above. When a data acquisition range is designated by the function of the operation recording setting section 48, the data acquisition range and a column name of table data are designated according to an operation of the user. More specifically, position information and coordinate information in an object hierarchy related to data designated by the user are associated with the designated column name. This association results in generating the table data in which data included in first screen information displayed by the automation target software GS and data included in second screen information displayed by the automation target software GS and located at the same position as the above data are arranged in the same column.

In this manner, data of a transcription source application for which a range in which the data to be acquired exists has been designated by the acquisition range designation section 22 is acquired as table data by an appropriate method according to a type of the transcription source application, and the table data is held in the memory section 15. Note that the table data held in the memory section 15 is similarly given a name so as to be distinguishable from other table data held in the memory section 15, but the name may be given by the user. In this case, the acquisition range designation section 22 receives the name given to the table data.

The transcription designation section 23 is a functional block configured to designate data to be transcribed to a transcription destination application. The transcription designation section 23 includes a transcription destination designation section 23*a*, a transcription unit designation section 23*b*, a table operation section 23*c*, and a transcription data preview section 23*d*.

The transcription destination designation section 23*a* is a functional block configured to designate a form in which data is to be written in a transcription destination application, and displays screen information for designating the form or receives designation of the user for the screen information. In the present embodiment, the form of the transcription destination application is a target for which some designation has been made by the user based on data to be transcribed in conventional transcription work, and includes a text box to which text data is input by the user, a combo box in which an arbitrary option is selected from among options determined in advance by the user, and a radio button indicating that any of a plurality of the options has been selected.

The transcription unit designation section 23*b* is a functional block configured to designate a unit to transcribe data acquired from a range designated by the acquisition range designation section 22. That is, the range of the data to be transcribed by one transcription is designated by the transcription unit designation section 23*b*. Since data to be transcribed to a transcription destination application is held in the memory section 15 as table data as described above, the transcription unit designation section 23*b* receives designation of the number of rows as the unit for transcribing the data. Note that, in a case where transcription to a transcription destination application for which a unit is designated by the transcription unit designation section 23*b* is set as a repetition target in the schematic procedure, the unit designated by the transcription designation section 23 is treated as a unit for the transcription.

The table operation section 23*c* is a functional block configured to edit data to be written to a transcription destination application by operating data held in the memory section 15 as table data. The operation of the table data by the table operation section 23*c* includes a filter operation of determining a row to be displayed depending on whether or not data included in a certain column satisfies a predetermined condition, a table combining operation of combining a plurality of pieces of table data according to a condition, such as a common column item, and the like.

The transcription data preview section 23*d* is a functional block that performs display indicating a table operated by the table operation section 23*c* and a unit for data transcription designated by the transcription unit designation section 23*b* in the table. The user views information displayed by the transcription data preview section 23*d* and confirms results of the transcription unit and the table operation set by the user.

The operation recording setting section 48 is a functional block configured to record an operation of the user on an arbitrary application of a transcription source application or a transcription destination application.

FIGS. 4 to 7 are views illustrating a relationship between software and data included in the computer PC functioning as the automation program creation device according to the present embodiment. The RPA software RS illustrated in FIGS. 4 to 7 is an automation program creation program. When the RPA software RS is installed, the processor section 20 functions as the automation program generation section 25 and the automation program execution section 26, and thus, is described as the functional blocks included in the RPA software RS in FIGS. 4 to 7.

Figure 4:
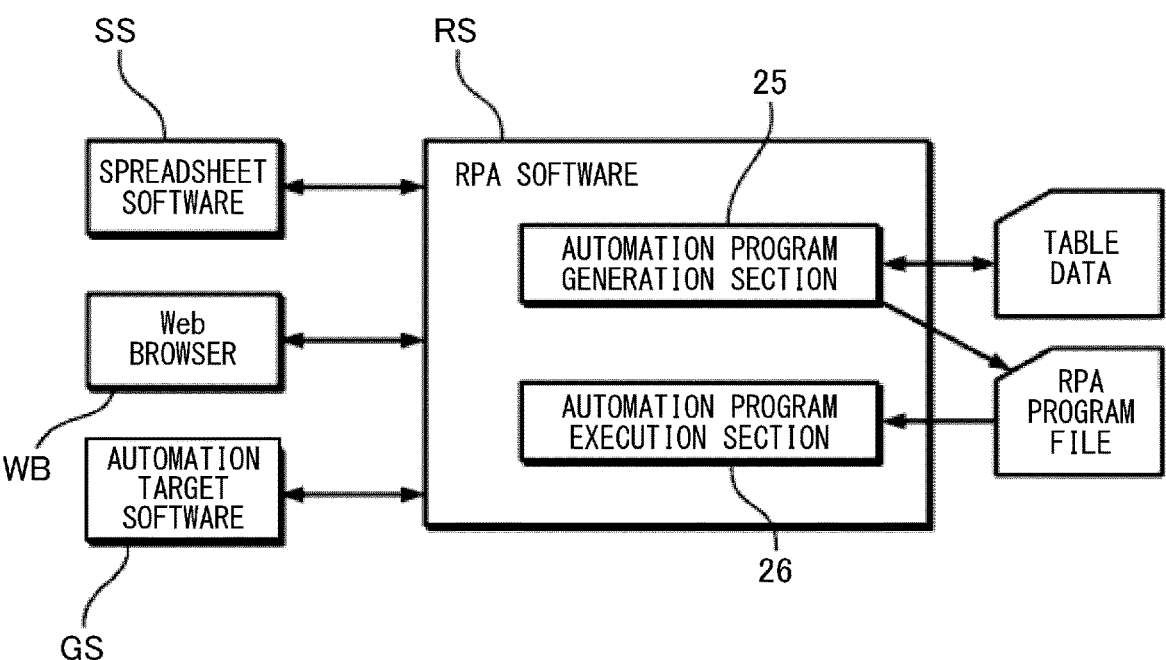
FIG. 4 is a block diagram illustrating a software configuration of an automation program creation program according to one embodiment of the present invention.

As illustrated in FIG. 4, the RPA software RS acquires data from existing applications such as the spreadsheet software SS, the web browser WB, and the other automation target software GS, and writes data to these existing applications. The data acquisition and the data writing from and to the existing applications are performed by a function of each functional block of the automation program generation section 25 when an automation program is generated, and are performed by the automation program execution section 26 when the generated automation program is executed. In addition, the automation program generation section 25 generates table data based on data acquired from a transcription source application, holds the table data in the memory section 15, and sets writing of data to a transcription destination application with reference to the table data held in the memory section 15, thereby generating the automation program. The automation program execution section 26 executes transcription work based on the generated automation program.

When creation of an automation program is supported by the RPA software RS, the RPA software RS transmits and receives data and the like to and from an external program, which is the spreadsheet software SS, such as Microsoft Excel (product or service name) reading a data file, such as xlsx, or the like via an API as illustrated in FIG. 4. In addition, the web browser WB (whose data format is an html file) and the RPA software RS perform inter-process communication using selenium or the like to acquire, write, and operate data.

The automation program generation section 25 supports the creation of an automation program in a table data format. The automation program created by the automation program generation section 25 is saved in the storage section 16 or the like as an RPA program file. Further, the automation program execution section 26 reads the saved RPA program file to execute the automation program. As a result, a series of operations defined in advance is automatically executed.

Figure 5:
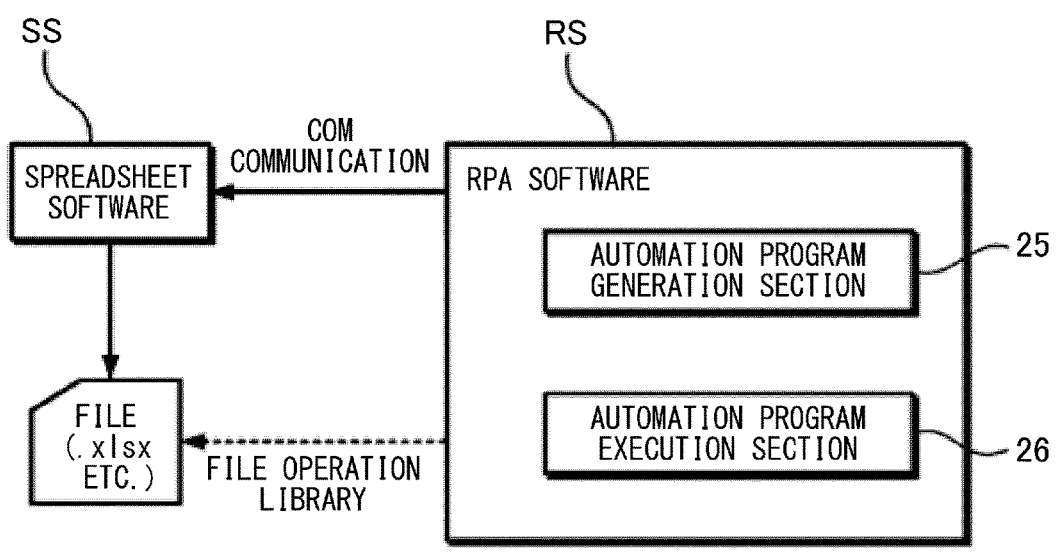
FIG. 5 is a schematic diagram illustrating transmission and reception between the automation program creation program and spreadsheet software.

FIG. 5 illustrates a relationship between the RPA software RS and the spreadsheet software SS. The RPA software RS performs COM communication with the spreadsheet software SS to operate the spreadsheet software SS. The RPA software RS acquires a value of a cell of a table displayed by the spreadsheet software SS as acquisition of data included in a file, and writes data in a cell of the table displayed by the spreadsheet software SS as data writing by operating the spreadsheet software SS. In addition, in the present embodiment, the spreadsheet software SS is Excel, and the file displayed by the spreadsheet software SS is a file with an extension ".xlsx". In this case, the RPA software RS may be used in a process of an Excel file operation library to write data into the file.

Figure 6:
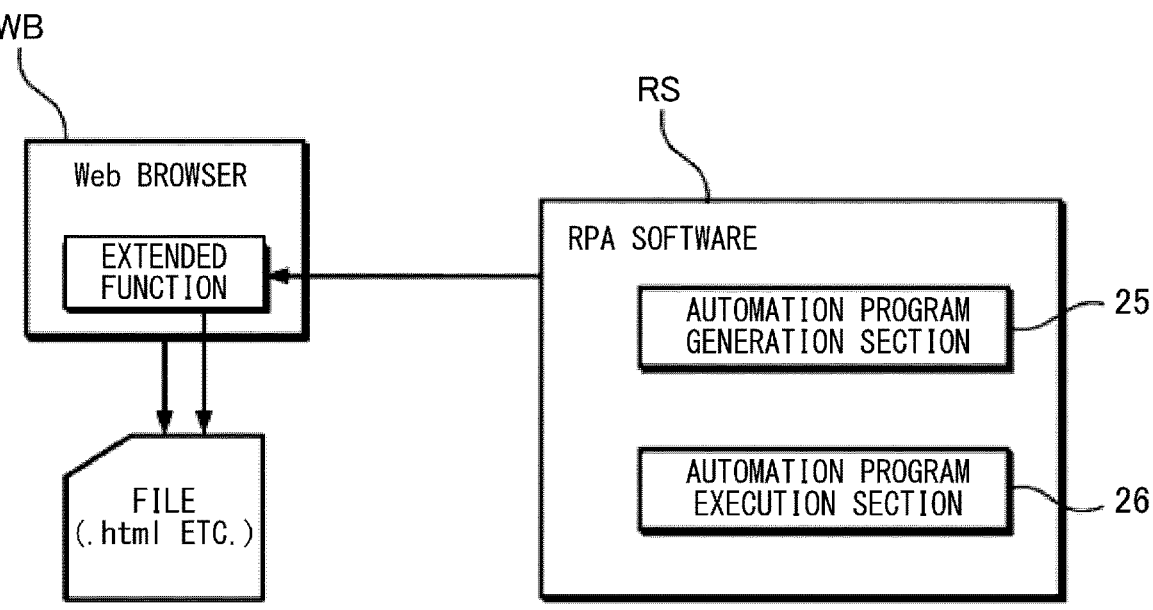
FIG. 6 is a schematic diagram illustrating transmission and reception between the automation program creation program and a web browser.

FIG. 6 illustrates a relationship between the RPA software RS and the web browser WB. The RPA software RS allows the user to operate the web browser when acquiring data from the web browser. At this time, a path of an element clicked by the user with a pointing device, such as a mouse, is acquired by an extended function added in advance to the web browser WB. The RPA software RS extracts an element of a path corresponding to Xpath using the Xpath as a search formula based on the acquired path. When the RPA software RS executes a created automation program, a path of a form displayed on the web browser WB is specified by the extended function of the web browser WB, and data is transcribed to an element of the specified path.

Note that, when Xpath is generated from a path acquired by the extended function of the web browser WB, the RPA software RS can generate the Xpath capable of extracting an element in the same hierarchy as an element corresponding to the path, and extract a plurality of the elements in the same hierarchy as an element designated by the user by operating the web browser WB. At this time, in a case where the user designates a plurality of elements determined to be in the same hierarchy, Xpath can be generated from a portion common to paths of the plurality of elements, and thus, the accuracy of generating the Xpath suitable for extracting elements in the same hierarchy is improved.

Figure 7:
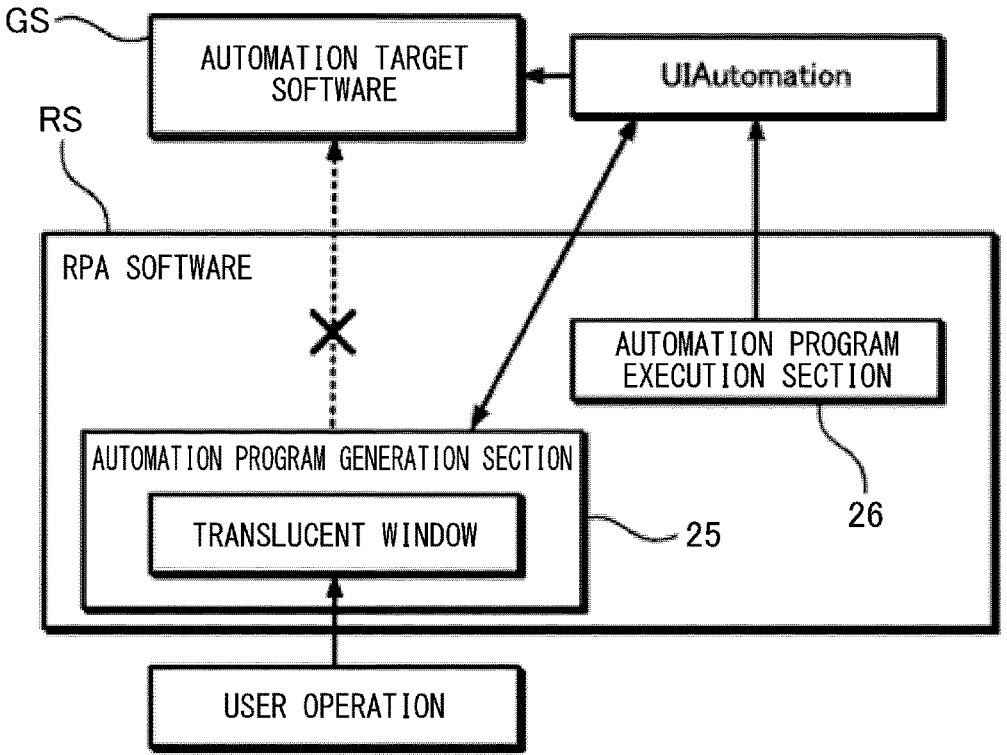
FIG. 7 is a schematic diagram illustrating an example of transmission and reception between the automation program creation program and automation target software.

FIG. 7 illustrates a relationship between the RPA software RS and the automation target software GS that automates an operation by the function of the operation recording setting section 48. The RPA software RS and the automation target software GS performs transmission and reception via UIAutomation. UIAutomation is a library provided by Microsoft Corporation. When an automation program is created, the automation program generation section 25 receives an operation performed by the user regarding an operation of the automation target software GS. More specifically, the automation program displays a translucent window TW that transmits display information of the automation target software GS to such an extent that the display information is visible in front of the automation target software GS. In the computer PC according to the present embodiment, an application corresponding to screen information displayed on the forefront receives an operation, and thus, an operation that the user intends to perform on an application at the rear of the translucent window TW is received as an operation on the translucent window TW. The automation program generation section 25 that receives the operation of the user by a function of the translucent window TW passes a mouse position designated by the received operation of the user to UIAutomation. As a result of passing the mouse position, UIAutomation receives information related to an UI element of a user interface at the mouse position. The information related to the UI element referred to herein includes a position of the UI in the hierarchy and an attribute of the UI (for example, whether data can be input or whether it is a combo box). Based on the information related to the UI element, the automation program generation section 25 displays options for operation contents indicating contents of operations to be performed on the UI element. The automation program generation section 25 receives an operation content selected by the user for the UI element, records the operation content and the UI element in association with each other, returns the operation content and information designating the UI element to UIAutomation, and executes the operation on the automation target software GS.

When the created automation program is executed, information designating a UI element and an operation content associated with the UI element are sent to UIAutomation to execute a predetermined operation on the UI.

Note that, when creation support and execution of an automation program are performed on the automation target software GS by the RPA software RS, a method is not limited to the above-described method using UIAutomation or the like. For example, an API provided in an OS that is an environment in which the automation target software GS and the RPA software RS are executed may be used. As an example, an automation program may be generated by monitoring an operation event sent from the OS to the respective applications using a Win32 API (product or service name) of a Windows (product or service name) OS. In addition, an automation program may be executed by performing an operation content indicated in the automation program via the Win32 API on the automation target software GS.

Figure 8:
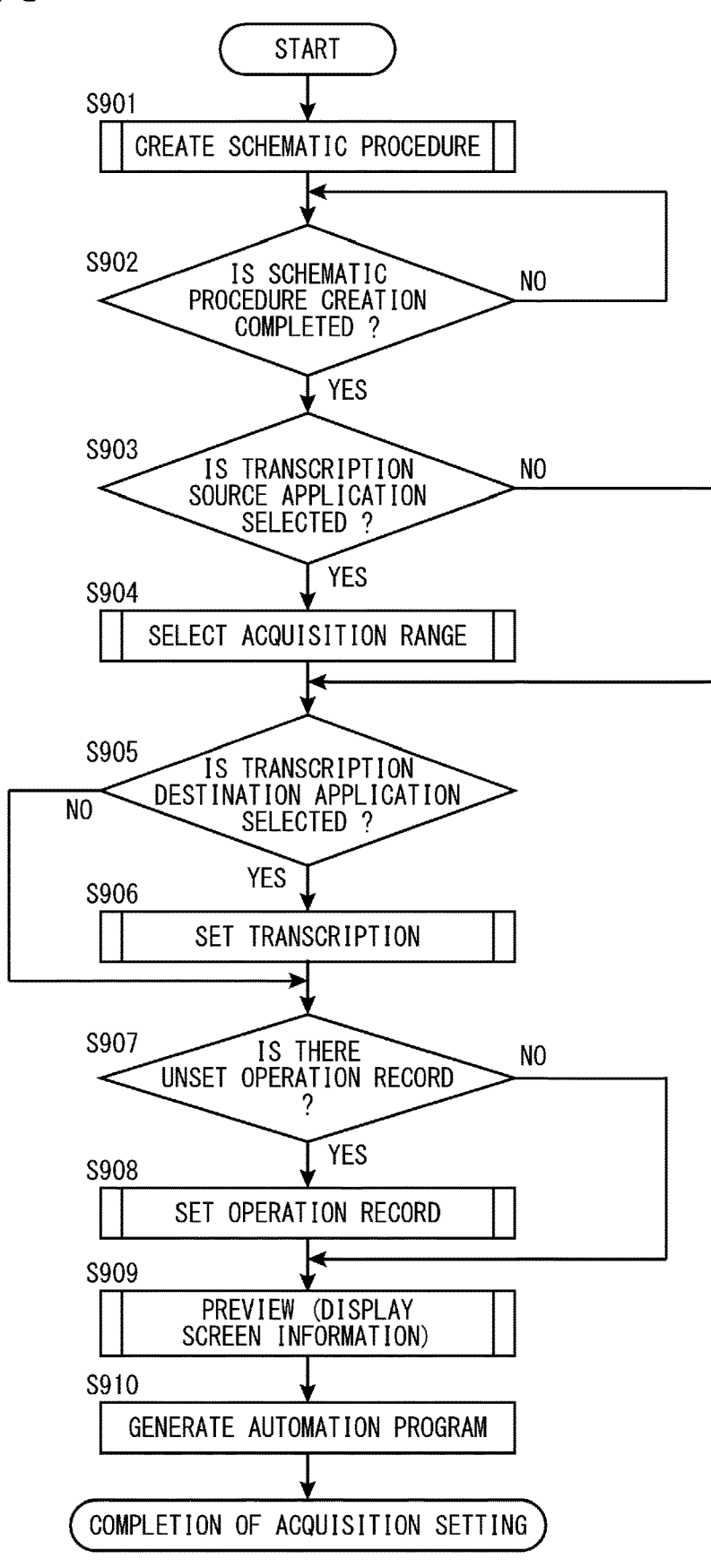
FIG. 8 is a flowchart illustrating a procedure for creating an automation program using RPA software.

The RPA software RS of the present embodiment includes a plurality of modes as modes for creating an automation program. A navigation mode as one of the plurality of modes is a guided mode for creating an automation program while guiding the user through a procedure necessary to create the automation program in accordance with the automation program to be created by the user. FIG. 8 is a flowchart at the time of creating an automation program for executing transcription work by the RPA software RS in the navigation mode.

First, in step S901 of FIG. 8, the schematic procedure creation section 21 displays a schematic procedure creation screen as screen information for the user to create a schematic procedure.

(Schematic Procedure Creation Screen 110)

Figure 9:
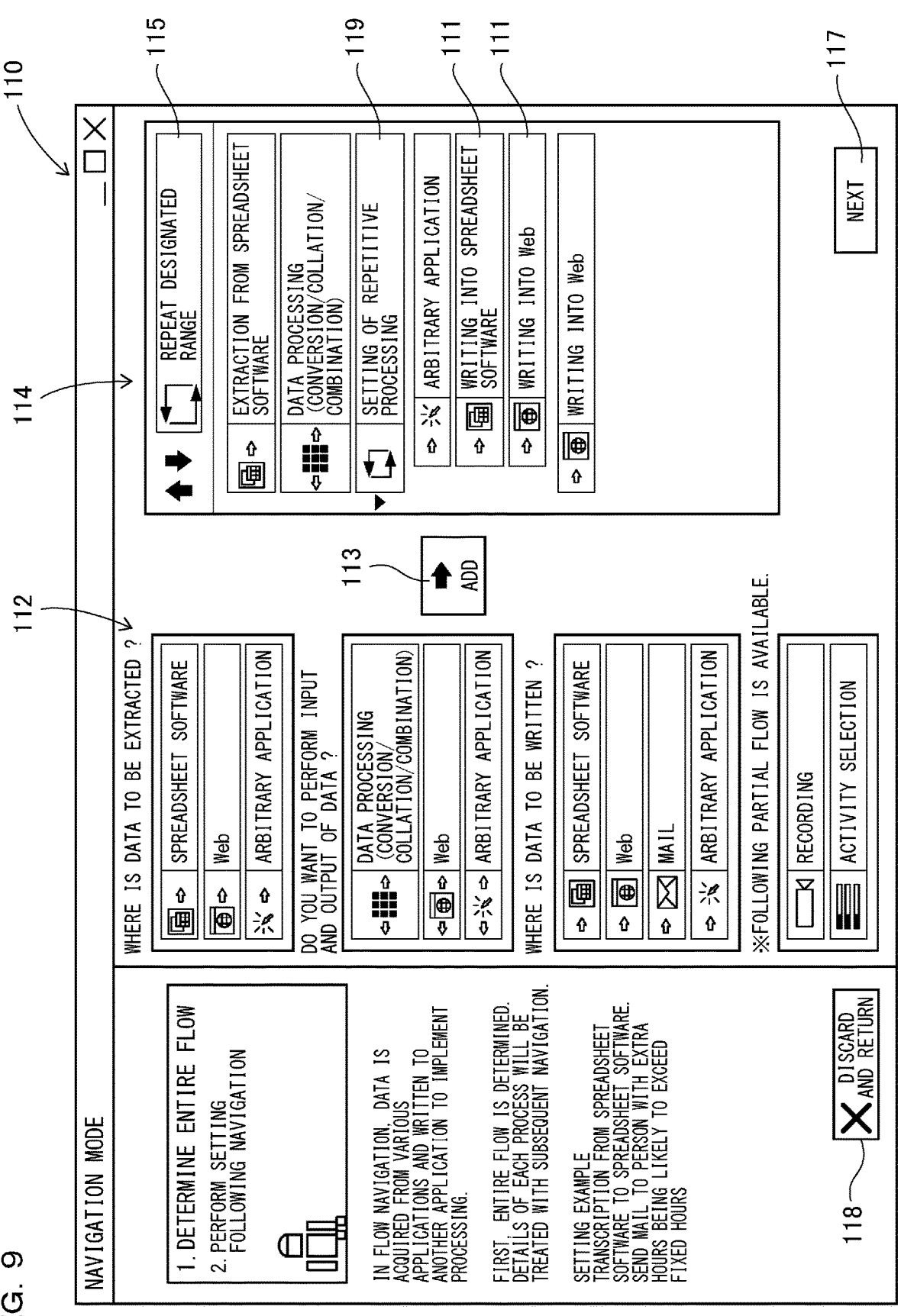
FIG. 9 is a schematic view illustrating a schematic procedure creation screen.

FIG. 9 illustrates an example of a schematic procedure creation screen 110. The user operates the schematic procedure creation screen 110 to generate a schematic procedure.

Here, the schematic procedure generated by the user is a procedure corresponding to transcription work, and the user designates a transcription source application and a transcription destination application. Therefore, even in a case where an option of "extract data from spreadsheet software SS" is displayed and the user selects the option, it can be considered that the spreadsheet software SS is selected as the transcription source application. In this manner, the automation program creation device according to the present embodiment displays an item, which is relatively easy to designate, such as an application to be used in the transcription work, as the option to prompt the user to create the schematic procedure. In addition, screen information for designating information necessary to acquire data from the transcription source application and information necessary to write data to the transcription destination is displayed according to the schematic procedure created as the user selects the application. This reduces difficulty of the user in creating an automation program.

Details of the schematic procedure creation screen 110 will be described with reference to FIG. 9. When a detailed scenario is constructed after constructing a schematic scenario, it is easy to cause the user's task flow to occur in the scenario. Items at the center of the screen are rough operations (activities) that can be selected. It is possible to add an item to be selected to an operation selection list 114 on the right side of the screen by clicking the item among the rough operations listed in an operation candidate list 112 at the center of the screen and then pressing a button 113 of "add". Further, when a button 117 of "next" is pressed in a case where activities are added to the operation selection list 114 on the right side, the screen transitions to a screen for performing a detailed setting of each rough operation in the order of added items. On the other hand, no transition occurs in a case where there is nothing in the operation selection list 114. In addition, when a button 118 of "discard and return" is pressed, the setting of creation navigation is stopped, and ended.

Note that selection of the transcription source application and selection of the transcription destination application are performed when schematic procedure icons 111 in the operation candidate list 112 are added to the operation selection list 114 on the schematic procedure creation screen 110. In the example of FIG. 9, when the schematic procedure icon 111 of "spreadsheet software" in a form of "where is data to be extracted?" is added to the operation selection list 114, the spreadsheet software SS is selected as the transcription source application. An icon of "web" corresponds to the web browser WB, and an icon of "arbitrary application" corresponds to the automation target software GS. In addition, in the example of FIG. 9, when the schematic procedure icon 111 of "spreadsheet software" in a form of "where is data to be written?" is added to the operation selection list 114, the spreadsheet software SS is selected as the transcription destination application.

In addition, the schematic procedure creation screen 110 includes a repetition setting icon 119. The user creates a schematic procedure in combination with the repetition setting icon 119 to create the schematic procedure including a procedure to be repeatedly executed. The repetition setting section 31 displays screen information related to a repetition based on the schematic procedure including the repetition setting icon 119. In FIG. 9, when the user selects a button 115 of "repeat designated range" in a state in which the schematic procedure icons 111 arranged as schematic procedures are selected, the repetition setting icon 119 is inserted above the selected schematic procedure. The selected schematic procedure icons 111 are displayed to be lower than the repetition setting icon 119 by one step to indicate the schematic procedures for which the repetition setting has been set.

Note that, in the example of the first embodiment, the spreadsheet software SS is selected as the transcription source application, and the spreadsheet software SS and the web browser WB are selected as the transcription destination applications. In addition, a part of the operation of writing data in the automation target software GS, the spreadsheet software SS, and the web browser WB as the transcription destination applications is set to be repeatedly performed.

As illustrated in FIG. 8, after the schematic procedure creation screen 110 is displayed in step S901, it is determined in step S902 whether or not creation of a schematic procedure has ended, step S902 is repeated if the creation has not ended, and the processing proceeds to step S903 if the creation has ended.

In step S903, the automation program generation section 25 determines whether or not a transcription source application has been selected in step S901. In a case where the automation program generation section 25 determines that the transcription source application has been selected, a setting of an acquisition range is started according to an application selected as the transcription source application in step S904. After the automation program generation section 25 completes the setting of the acquisition range in step S904, the processing proceeds to step S905. In addition, in a case where the automation program generation section 25 determines that the transcription source application has not been selected in step S903, the processing proceeds to step S905.

(Setting of Acquisition Range for Spreadsheet Software SS)

Figure 10:
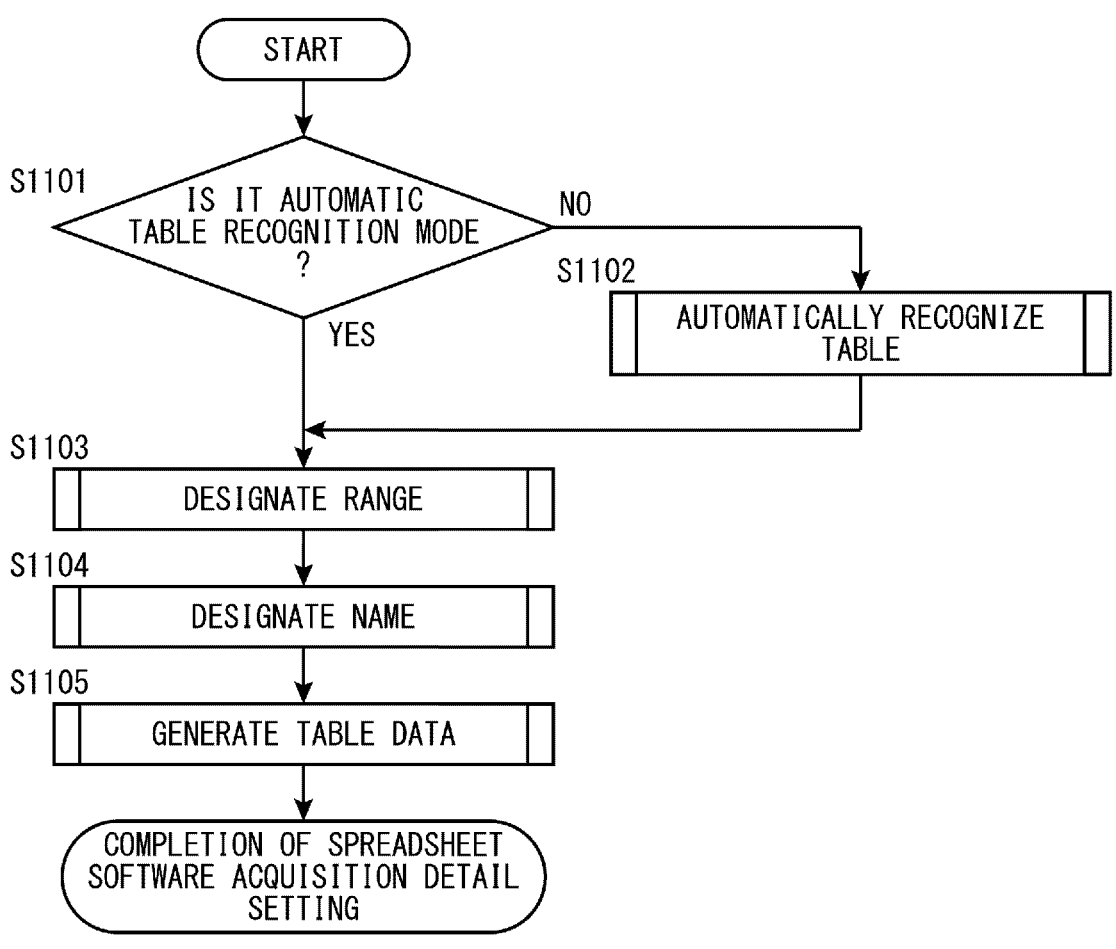
FIG. 10 is a flowchart illustrating a procedure for performing a spreadsheet software acquisition detail setting.

FIG. 10 is a flowchart illustrating details of designation of an acquisition range executed by the acquisition range designation section 22 in a case where the spreadsheet software SS has been selected as a transcription source application. In step S1101, the acquisition range designation section 22 determines whether or not it is an automatic table acquisition mode in which automatic table recognition is performed. In a case where the acquisition range designation section 22 determines that it is the automatic table acquisition mode, the acquisition range designation section 22 performs automatic recognition of a table by a function of the automatic table recognition execution section in step S1102. The automatic recognition of the table is performed to generate a shaped table, and the processing proceeds to step S1103. If the acquisition range designation section 22 determines in step S1101 that it is not the automatic table acquisition mode, the processing proceeds to step S1103. In step S1103, the acquisition range designation section 22 designates a range in which data to be acquired exists in the table shaped by the automatic table recognition execution section or a table displayed in a table format by the spreadsheet software SS. After the acquisition range is designated in step S1103, the acquisition range designation section 22 designates a name of table data to be generated from the data acquired in step S1104. The acquisition range designation section 22 in step S1104 may receive the name of table data from the user, or may designate the name that can be distinguished from other table data already held in the memory section 15. In step S1105, the acquisition range designation section 22 generates table data having the uppermost row of the acquisition range designated in step S1103 as a column item, assigns the name designated in step S1104 to the table data, and causes the memory section 15 to hold the table data.

Figure 11:
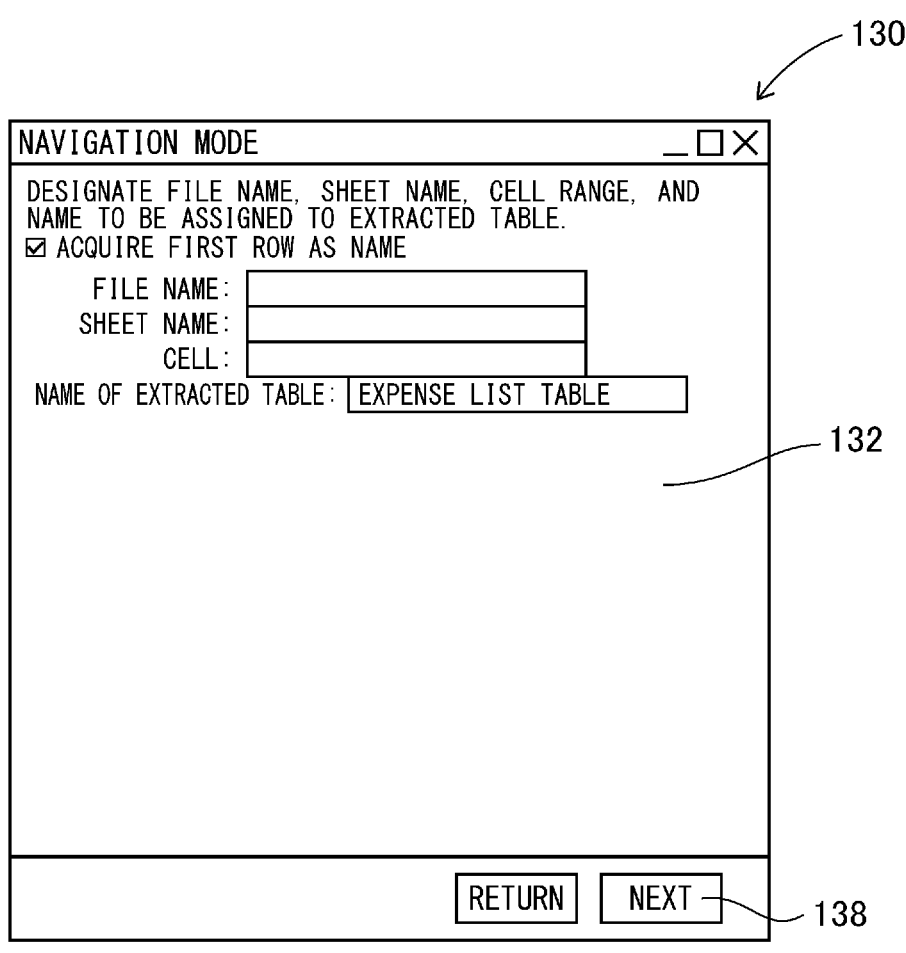
FIG. 11 is a schematic view illustrating a spreadsheet software acquisition range designation screen.

FIG. 11 illustrates a spreadsheet software acquisition range designation screen 130 displayed by the acquisition range designation section 22 when it is not the automatic table acquisition mode. This drawing is a screen for receiving an operation of the user in steps S1103 and S1104 in FIG. 10 described above. In FIG. 11, forms labeled with "file name", "sheet name", and "cell" are displayed in order to receive the designation of the range of the table executed in step S1103. In addition, in FIG. 11, a form labeled with "name of extracted table" is displayed in order to receive the designation of the name executed in step S1104. In the example of FIG. 11, a name of "expense list table" is designated. Further, a trigger button 138 configured for execution of step S1105 is provided in FIG. 11. Note that the name of the table data designated in step S1104 is a variable name for calling the table data from the memory section 15 in the RPA software RS.

As illustrated in FIG. 8, the automation program generation section 25 determines in step S905 whether or not a transcription destination application has been selected in step S901 after completion of the designation of the acquisition range. In a case where the automation program generation section 25 determines that the transcription destination application has been selected, a transcription setting is executed in step S906. After completion of the transcription setting in step S906, the automation program generation section 25 proceeds to step S907. In step S905, when the automation program generation section 25 determines that the transcription destination application has not been selected, the automation program proceeds to step 907.

Figure 12:
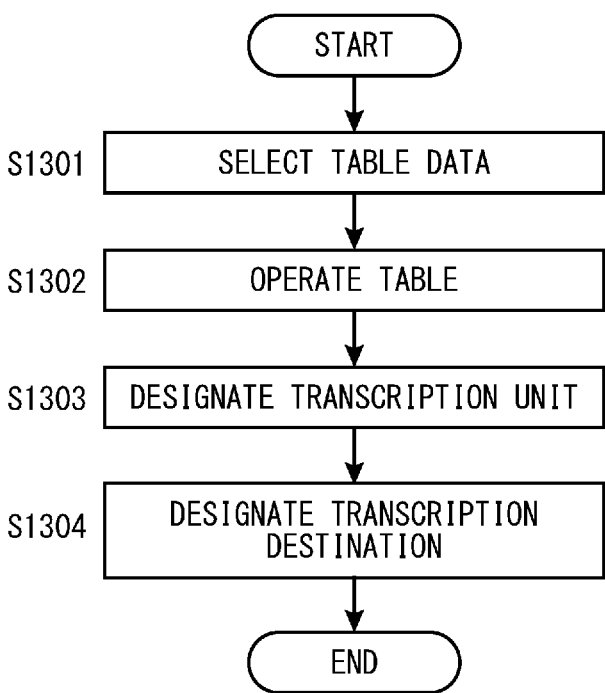
FIG. 12 is a flowchart illustrating a transcription setting procedure.

FIG. 12 is a flowchart illustrating details of a setting related to transcription executed by the transcription designation section 23 in a case where an arbitrary application is selected as the transcription destination application. In step S1301, table data to be called from the memory section 15 is selected. In step S1302, an operation on the table data selected in step S1301 is received as a function of the table operation section 23c, and the table data is edited according to the operation. In step S1303, as a function of the transcription unit designation section 23b, a unit of transcription to the transcription destination application is designated for the table data called in step S1301 or the table data edited in step S1302. After the designation of the unit of transcription is received in step S1303, a form in which data is to be transcribed in the transcription destination application is designated as a function of the transcription destination designation section 23a in step S1304.

In step S1304, the transcription destination designation section 23a displays screen information for receiving designation of the form of the transcription destination from the user according to the transcription destination application. When the transcription destination application is the spreadsheet software SS, designation of a file, a sheet, a cell, and the like of the transcription destination is received. When the transcription destination application is the web browser WB, the web browser WB is started, an operation of the user on the web browser WB is acquired by the extended function of the web browser WB, and a form selected by the user is specified on the web browser WB. When the transcription destination application is the automation target software GS, a form is specified by a function of the operation recording setting section 48.

Figure 13:
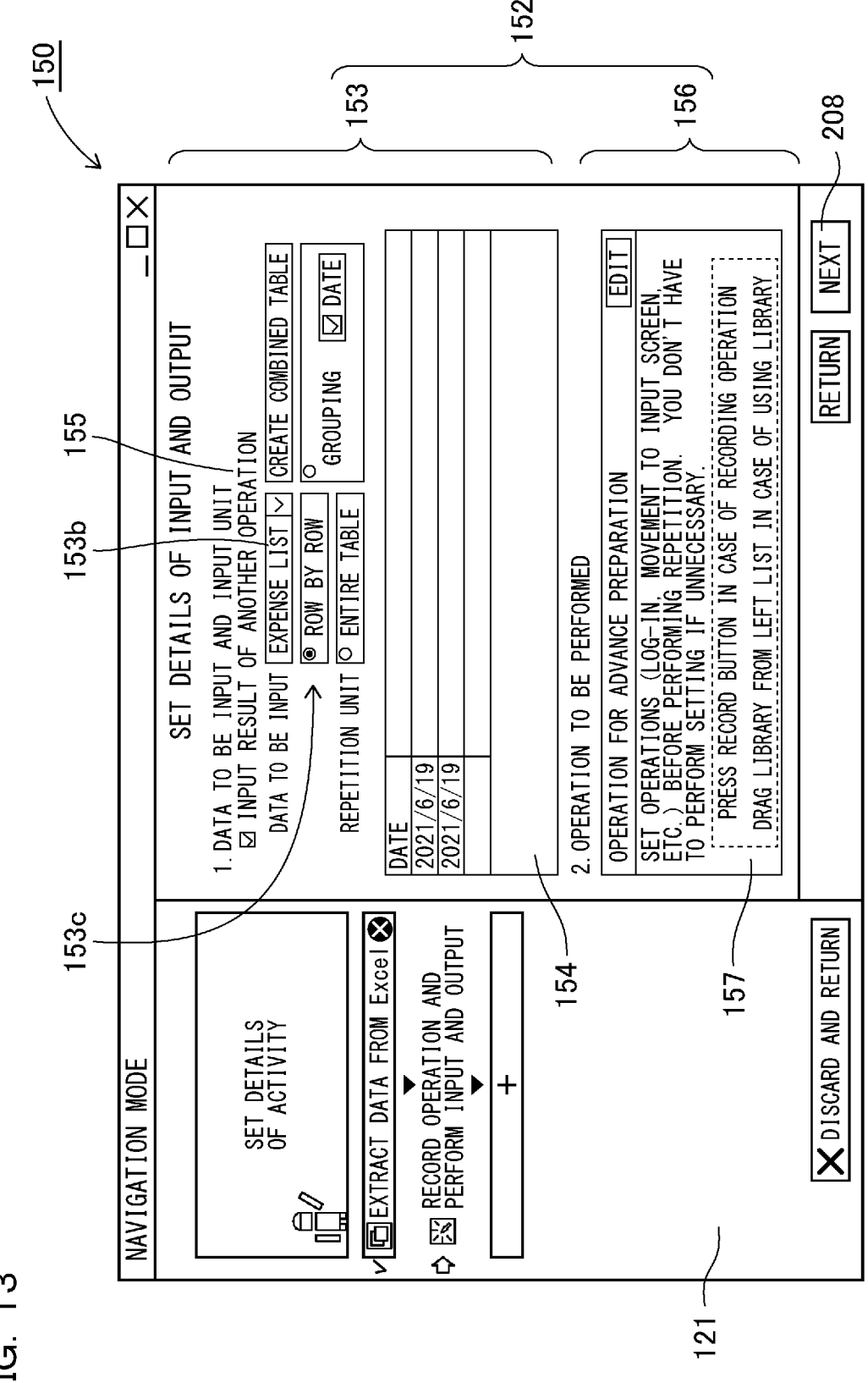
FIG. 13 is a schematic diagram illustrating a general transcription detail setting screen.

FIG. 13 illustrates a general transcription detail setting screen 150 displayed as one aspect of the transcription setting of step S906. The general transcription detail setting screen 150 illustrated in this drawing illustrates one aspect of the transcription designation section 23. On the general transcription detail setting screen 150, details of data transcription are set. In the example of FIG. 13, in the general transcription detail setting screen 150, an activity display field 121 is displayed on the left of the screen, and a transcription detail designation field 152 is displayed from the center to the right of the screen. In this example, a detail setting screen regarding an activity selected in the activity display field 121, here, "record operation and perform input and output" is displayed on the general transcription detail setting screen 150.

Details of data transcription for transcribing data in a range set by the acquisition range designation section 22 in FIG. 3 as an acquisition source data in a table format are designated in the transcription designation section 23 by the user.

In the transcription detail designation field 152 of FIG. 13, a transcription data designation field 153 and an execution operation determination field 156 are provided as one aspect of the transcription designation section 23. (Transcription Data Designation Field 153)

The transcription data designation field 153 is provided with fields respectively corresponding to the table data selection executed in step S1301, the table operation executed in step S1302, and the transcription unit designation executed in step S1303 illustrated in the flowchart of FIG. 12. The user can set details of data to be transcribed to a transcription destination application by operating the transcription data designation field 153.

The transcription data designation field 153 includes a table data reference or non-reference designation field 155 and a table data designation field 153b. The user can designate whether or not to reference table data held in the memory section 15 by operating the table data reference or non-reference designation field 155. In the example of FIG. 13, referencing table data has been selected. In addition, the user operates the table data designation field 153b to designate table data that includes data to be transcribed or data for generating data to be transcribed. That is, the transcription data designation field corresponds to step S1301 of the flowchart of FIG. 12 described above. The example of FIG. 13 illustrates that table data having a name of "expense list" is selected.

Figure 20:
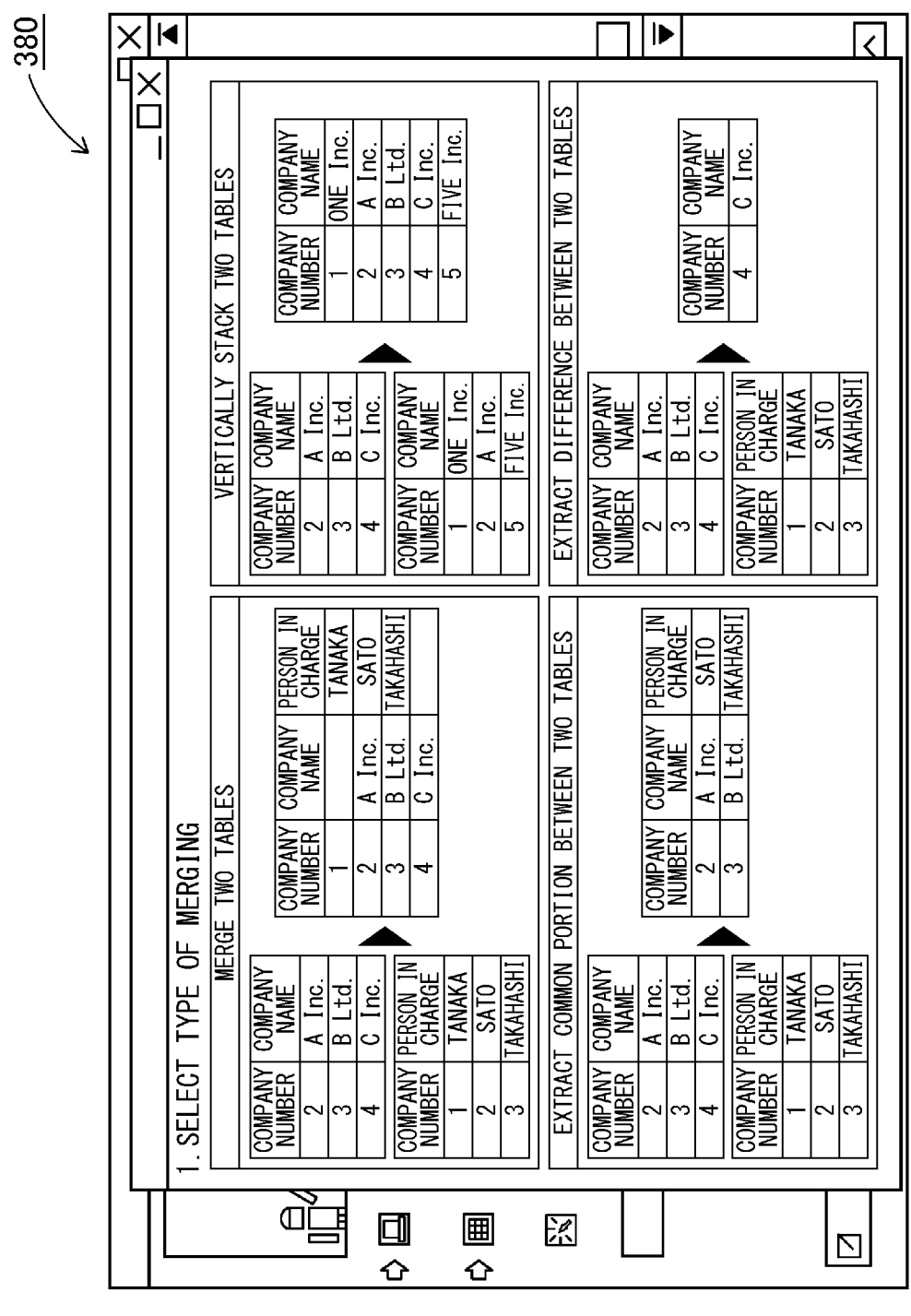
FIG. 20 is a schematic view illustrating a table navigation screen.

The transcription data designation field 153 further includes a transcription unit preview field 154 as one aspect of the transcription unit preview section 24. The transcription unit preview field 154 displays an aspect of data to be transcribed based on a detailed setting of transcription data set as the user operates the transcription data designation field 153. In addition, the transcription unit preview field 154 is also a member configured allow the user to edit the table data in step S1302 of the flowchart of FIG. 12 described above. When the user operates the transcription unit preview field 154, a table navigation screen 380 of FIG. 20 is displayed, and the table operation of the user is received.

The transcription data designation field 153 includes a transcription unit designation field 153c as one aspect of the transcription unit designation section 23b. The user operates the transcription unit designation field 153c to designate a target to be transcribed in one data transcription with respect to the transcription destination application. That is, the transcription unit designation field 153c corresponds to step S1303 of the flowchart of FIG. 12. "Row by row", "entire table", and "grouping" can be selected as transcription units from table data designated by the table data designation field 153b. When "row by row" is selected, table data of a variable name selected in a table data designation field 153b is transcribed row by row by one transcription. In addition, when the "entire table" is selected, the entire table data is transcribed by one transcription. Further, when "grouping" is selected, pieces of data of rows having the same column value of the table data are input. Therefore, in "grouping", it is possible to select a column item included in the table data of the variable name selected in the table data designation field 153b. In the example of FIG. 13, a column item of "date" is illustrated together with the option of "grouping". In this case, pieces of data having the same value in the column having the name of "date" out of the table data having the variable name selected in the table data designation field 153b are transcribed by one transcription.

(Execution Operation Determination Field 156)

Further, the execution operation determination field 156 is provided below the transcription data designation field 153 in the transcription detail designation field 152 of FIG. 13. The execution operation determination field 156 is a member configured to allow the user to designate the form as the data transcription destination in step S1304 of the flowchart of FIG. 12 described above.

The execution operation determination field 156 is displayed when the automation target software GS is designated as the transcription destination application. The user starts operation recording by the function of the operation recording setting section 48 from the execution operation determination field 156 in order to designate the form in the automation target software GS. The execution operation determination field 156 illustrated in FIG. 13 is a member configured to determine a non-repetitive operation in execution of the automation program, but an execution operation determination field configured to determine a repetitive operation may be separately provided. In this case, it is preferable that the execution operation determination field configured to determine the non-repetitive operation and the execution operation determination field configured to determine the repetitive operation be displayed on the same screen. The expression "displayed on the same screen" referred to herein includes an arrangement in which the two execution operation determination fields can be displayed by a scroll operation. This enables the user to set both the repetitive operation and the non-repetitive operation from the same screen, and thus, it is possible to easily generate an automation program related to work in which the repetitive operation and the non-repetitive operation are mixed.

(Operation Recording Screen 160)

Figure 14:
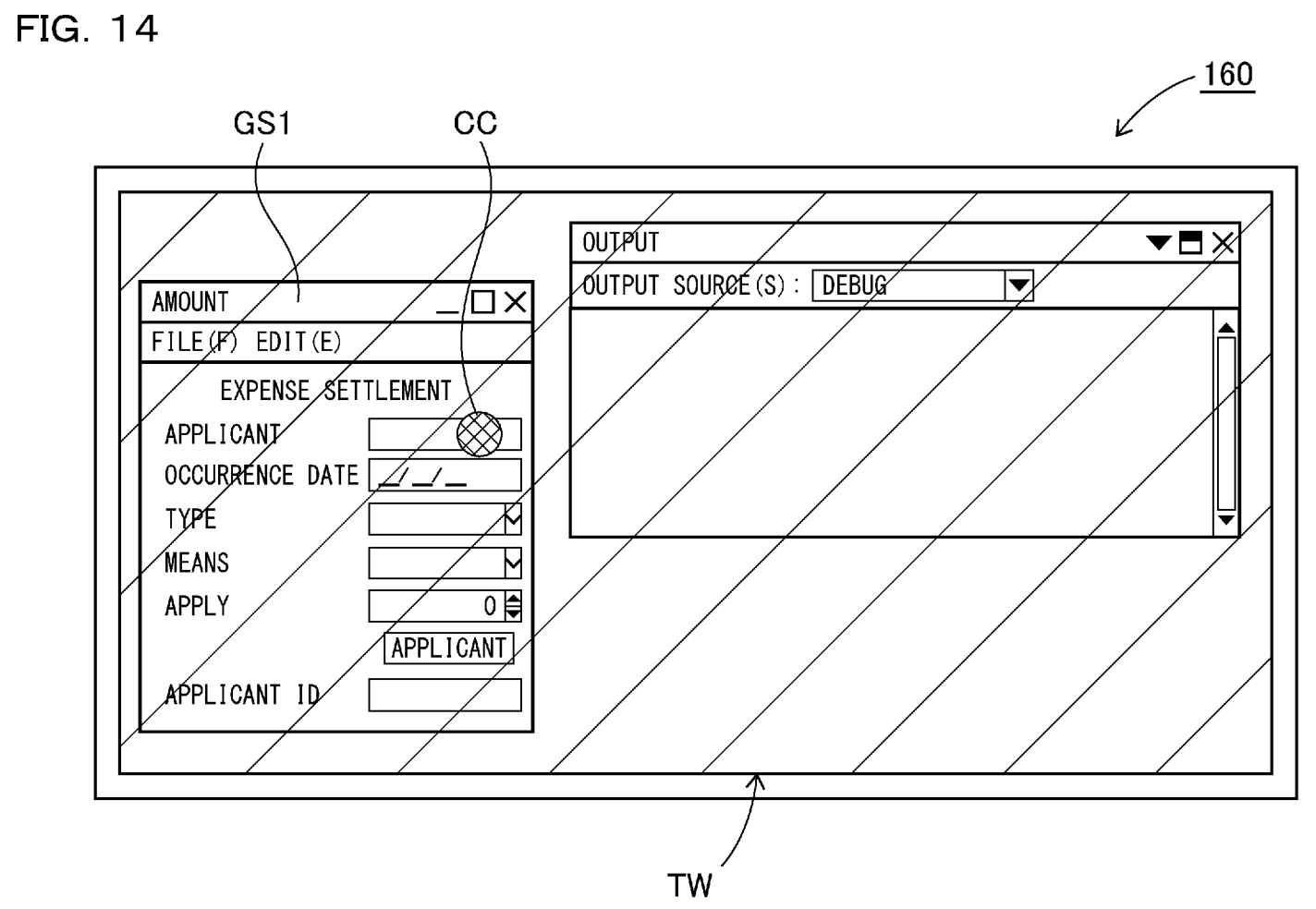

FIG. 14 illustrates an aspect of a display screen including screen information displayed by the function of the operation recording setting section 48. A form GS1 of "expense settlement" displayed by an expense settlement application as the automation target software GS is displayed on an operation recording screen 160 illustrated in FIG. 14. The operation recording setting section 48 displays the translucent window TW in front of the screen information generated by the automation target software GS. It is sufficient for the translucent window TW to be transparent to such an extent that the screen information, which overlaps the translucent window TW and is located behind the translucent window TW, is visible, and thus, a transparent window may be used. Since the user can recognize that some screen information is displayed to be superimposed on the screen information generated by the automation target software GS by displaying the translucent window, it is preferable that the translucent window TW not be transparent to such an extent that the screen information generated by the automation target software GS is visible to the user. Note that, in FIG. 14, there is a frame of the translucent window TW inside a frame of FIG. 14 in order to clarify the translucent window TW on the drawing, but the translucent window TW is practically displayed on the entire screen.

The user executes an operation on the operation recording screen 160 to designate a form of the transcription destination. The operation recording setting section 48 receives, in the translucent window TW, the operation of the user to designate a predetermined form included in the form GS1 across the translucent window TW, and specifies the form in the form GS1 designated by the user. As a result, a transcription destination designation section 23a specifies the form in which data is to be written in the transcription destination application. In the example of FIG. 14, a form with a description of "applicant" is selected in the form GS1 of "expense settlement" of the automation target software. A position of a mouse cursor is indicated by a circle for easy understanding of an operation.

After a form in which data is to be written is specified, the operation recording setting section 48 displays screen information for allowing the user to select data to be written in the form based on table data called from the memory section 15 by the transcription designation section 23. When the table data is edited by the table operation section 23c, the screen information may be displayed based on the edited table data. In addition, the screen information may be displayed based on a unit designated by the transcription unit designation section 23b.

The user selects the data that needs to be written in the form from options of pieces of data to be written displayed by the operation recording setting section 48. The operation recording setting section 48 receives user's selection and associates the specified form with data to be written in the form. As a result, the transcription destination designation section 23a designates the form to which data is to be written in the transfer destination application and the data to be written in the form.

Note that the operation recording setting section 48 writes the data selected by the user in the specified form. As a result, the operation is executed by the automation target software immediately after being selected through the operation recording screen, so that the user can confirm whether or not the selected data can be written in the specified form without an error, and debugging work is also facilitated.

As illustrated in FIG. 8, the automation program generation section 25 proceeds to step S907 and determines whether or not there is an operation recording procedure that has not been set in detail. The operation recording procedure for which the presence or absence is determined herein is not a procedure of operation recording included in the setting of the acquisition range of the transcription source application in step S904 or the setting of transcription to the transcription destination application in step S906, but is set as a procedure corresponding to operations of the user performed before and after the procedure of transcribing data in the transcription work. When it is determined in step S907 that there is an unset operation recording procedure, the processing proceeds to step S908, and an operation recording setting is executed. In step S908, the translucent window TW is displayed by the function of the operation recording setting section 48, and an operation of the user performed on the translucent window TW is recorded. When the recording of the operation of the user in step S908 is completed, the processing proceeds to step S909, and screen information indicating contents of the automation program is generated based on contents set in at least any step out of steps S901, S904, S906, and S908. When it is determined in step S907 that there is no unset operation recording procedure, the processing proceeds to step S908, and screen information indicating contents of the automation program is generated based on contents set in at least any step out of steps S901, S904, and S906.

(Activity List Screen 220)

Figure 15:
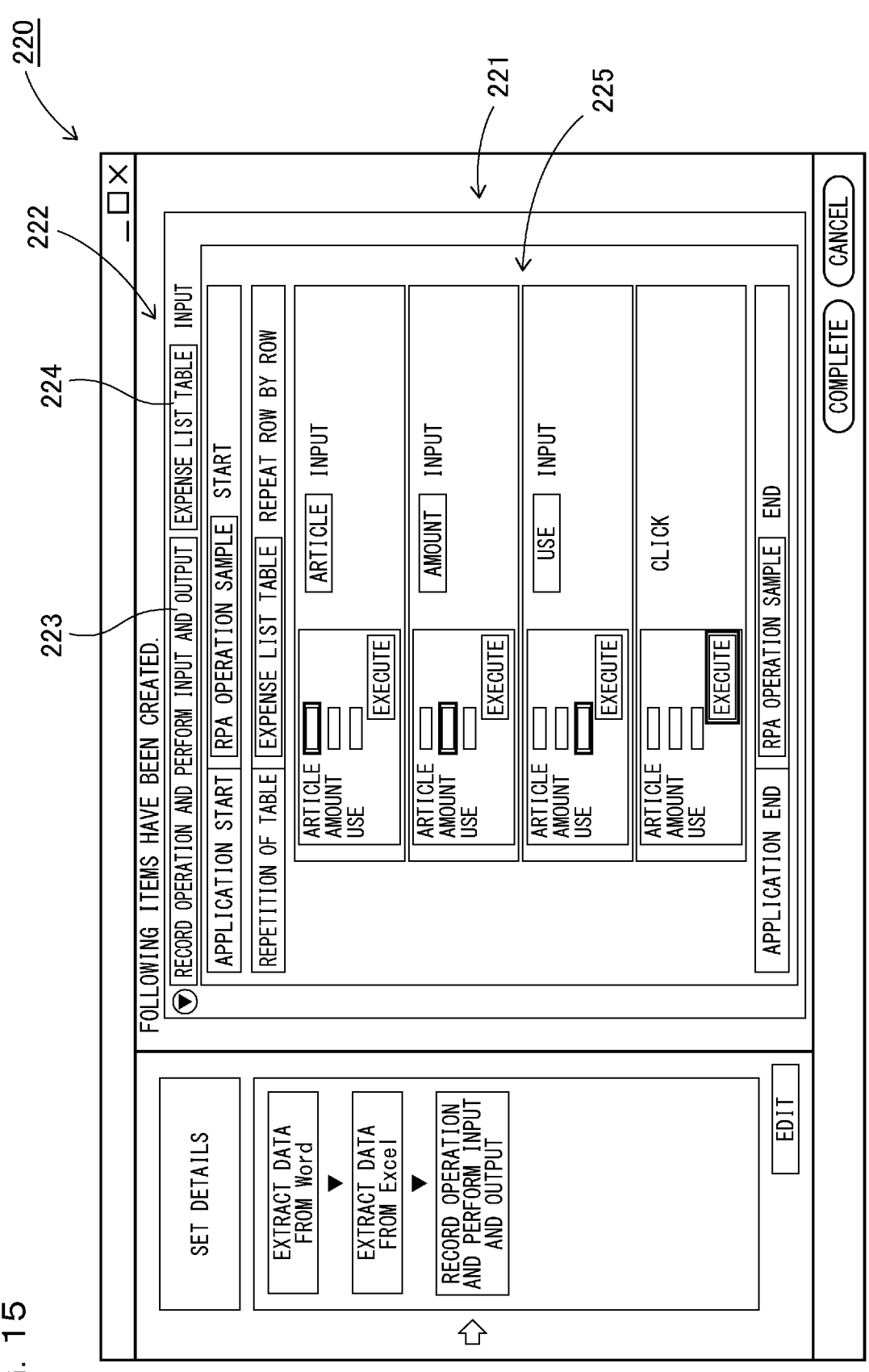
FIG. 15 is a schematic view illustrating an activity list screen.

FIG. 15 illustrates an activity list screen 220 that illustrates contents of an automation program to be created and is displayed in step S909. On the activity list screen 220, created procedures are collectively displayed in a schematic activity unit set in step S901. In the activity list screen 220, a schematic activity display field 221 is provided on the left side of the screen. In the schematic activity display field 221, created activities are collectively displayed in a schematic activity unit. On the activity list screen 220 of FIG. 15, variables are displayed in orange. Since table data itself is treated as a variable in the generated automation program in the present embodiment, a name given to the table data itself is treated as a variable name. In addition, each column item included in the table data is also referenced at the time of transcription, and thus, is treated as a variable name.

The activity list screen 220 of FIG. 15 illustrates a state in which detailed settings for acquiring various types of data and settings for operations to perform transcription are completed. A portion of "record operation and perform input and output" in this drawing is a schematic activity headline portion 222, and displays a schematic activity corresponding to the flow. In addition, a schematic activity detail display area 225 is provided below the schematic activity headline portion 222. In the schematic activity detail display area 225, "start application", "repeat table", and "end application" are displayed to list specific operations, that is, activities constituting the schematic activity of "record operation and perform input and output". The schematic activity unit when various settings are completed corresponds to the schematic procedure created in FIG. 9. Here, in the schematic activity headline portion 222, the display of "record operation and perform input and output" is manually input by the user as a schematic name 223, and a schematic label 224 of "input expense list table" on the right thereof is automatically generated.

After the activity list screen 220 is displayed in step S909, the automation program creation section creates the automation program in step S910 as illustrated in FIG. 8. The automation program is generated based on contents set in at least any of steps S901, S904, S906, and S908.

Second Embodiment (Operation Recording Screen 280)

Figure 16:
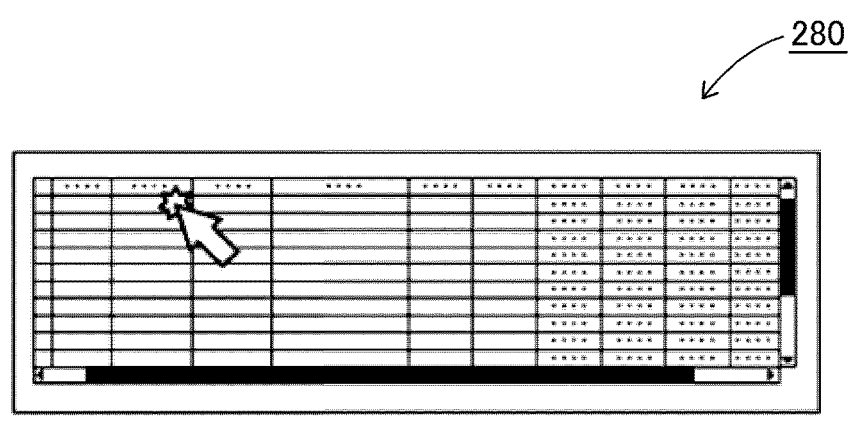
FIG. 16 is a schematic view illustrating a screen for setting an operation recording screen.

FIG. 16 illustrates an operation recording screen 280 when a form of a transcription destination application designated by a user by a function of the transcription destination designation section 23a is a table UI displayed in a table format. Note that a translucent window is not displayed for the sake of the description in this drawing.

Figure 17:
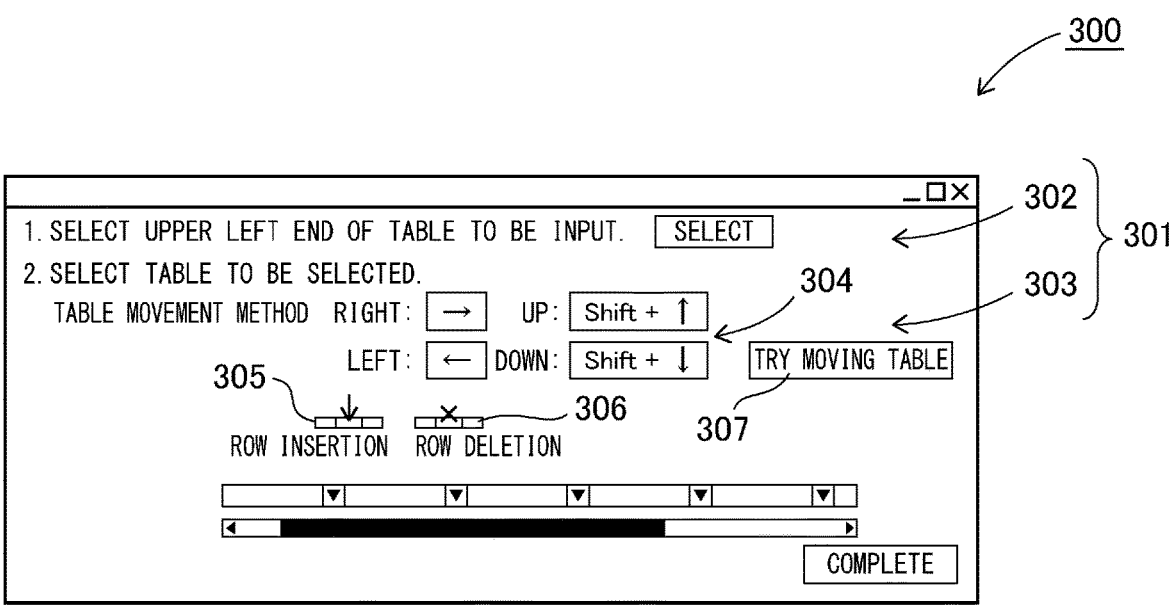
FIG. 17 is a schematic view illustrating an example of a table data transcription output detail setting screen.
Figure 18:
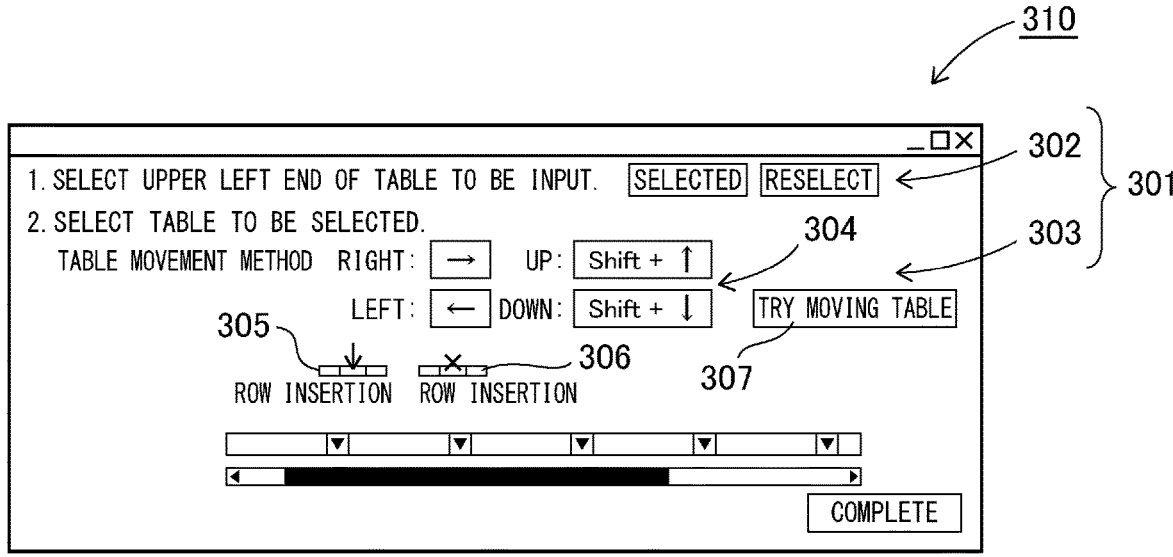
FIG. 18 is a schematic view illustrating a state in which a cell at an upper left end of the table in FIG. 17 is selected.

When it is detected that the user has selected the table UI with the mouse on the operation recording screen 280 of FIG. 16, a table data transcription detail setting window 301 configured to set details of transcription of table data to the table UI is displayed as illustrated in the operation recording screen 300 of FIG. 17. The table data transcription detail setting window 301 includes a table input position designation field 302 and a table selection field 303. First, the user is asked to select a cell at an upper left end of a table in the table input position designation field 302 in order to specify the table UI as an output destination. After detecting the selection of the user and specifying the upper left cell of the table UI, an operation of selecting the upper left of the table UI is reflected in the table UI. In FIG. 18, a daily report management application, which is the automation target software GS, displays the cell selected in the table UI in a blue frame. In addition, "selected" is displayed in the table input position designation field 302 to indicate that the selection of the upper left cell in the table has ended.

Next, table selection is performed. In the table data transcription detail setting window 301 of FIG. 18, the table selection field 303 is provided with a table movement direction designation field 304, a row insertion designation field 305, a row deletion designation field 306, and a button 307 of "try moving table". When the button 307 of "try moving table" is pressed, it is possible to confirm whether the table UI has been correctly selected. In this confirmation, it is possible to confirm whether RPA software receives the operation of the user through a corresponding keyboard such as "right: →" and a selected point moves on the table UI in such a manner as the keyboard is operated.

Figure 19:
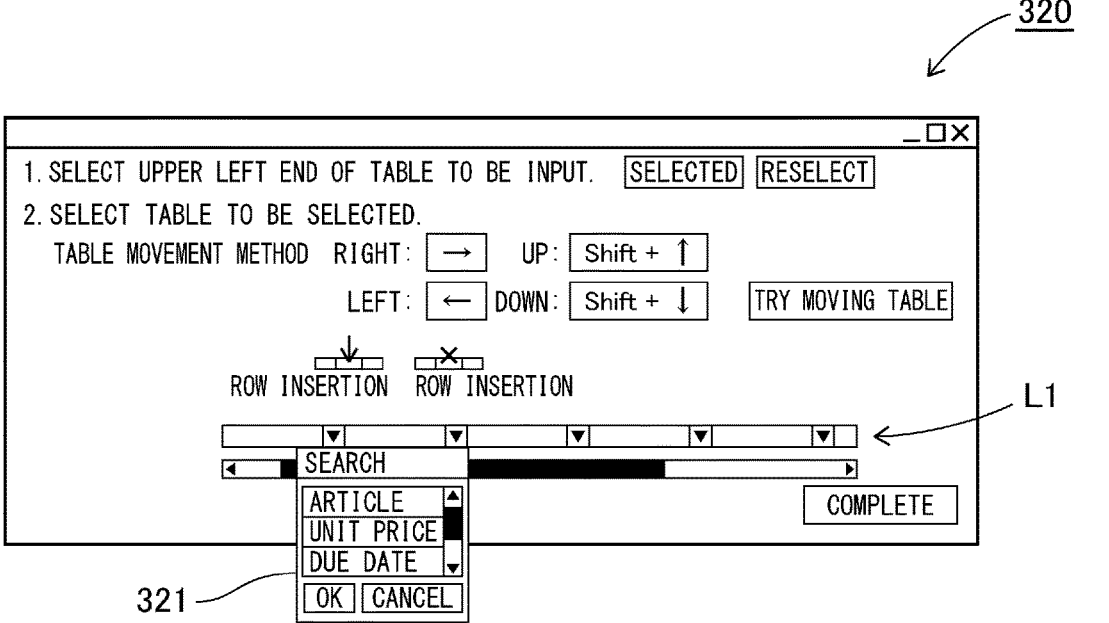
FIG. 19 is a schematic view illustrating a state in which column name options are displayed.

A table displayed on the RPA software corresponds to a table UI of the automation target software, that is, the table UI of the daily report management application as a transcription destination application. As an example, a state in which data to be transcribed to the second column from the left of the table UI is selected in a case where it is desired to transcribe data to the column is illustrated in an operation recording screen 320 of FIG. 19. On the operation recording screen 320, it is possible to confirm how each column of the table UI of the automation target software GS is associated with each column of table data, acquired to create an RPA program in the RPA software, and an aspect of a setting screen at that time. In the drawing, the table UI of the automation target software GS is reflected on the setting screen of the RPA software RS in a portion L1 indicated by a horizontally long rod. In addition, in column name options 321 below the portion L1, names of column items of the acquired table data are displayed as options. The column name option 321 selects a column name corresponding to table data to be transcribed into the automation target software GS when the RPA software RS is executed. For example, if "article" is selected and set among the column name options 321 displayed by the pull-down in the second column from the left of L1, "article" of the acquired table data is transcribed to the second column from the left of the automation target software GS when the RPA software RS is executed. With this setting, data in the table data to be written in a specific column of the table UI displayed in the automation target software GS is designated.

(Table Operation)

Next, details of editing of table data executable by the table operation section 23c will be described. A function of editing the table data held in the memory section 15 is referred to as "table navigation". For example, on the general transcription detail setting screen 150 of FIG. 13, a table operation can be called to edit the table data.

In addition, it is also possible to select and execute a type corresponding to a desired table operation from the table navigation screen 380 of FIG. 20. Table data after the execution of the operation is held in the memory section 15. At this time, the table data to be held in the memory section may be held in the memory section 15 with a name designated by the user, or may be held in the memory section 15 with a name that can be distinguishable from table data already held in the memory section 15.

Figure 21:
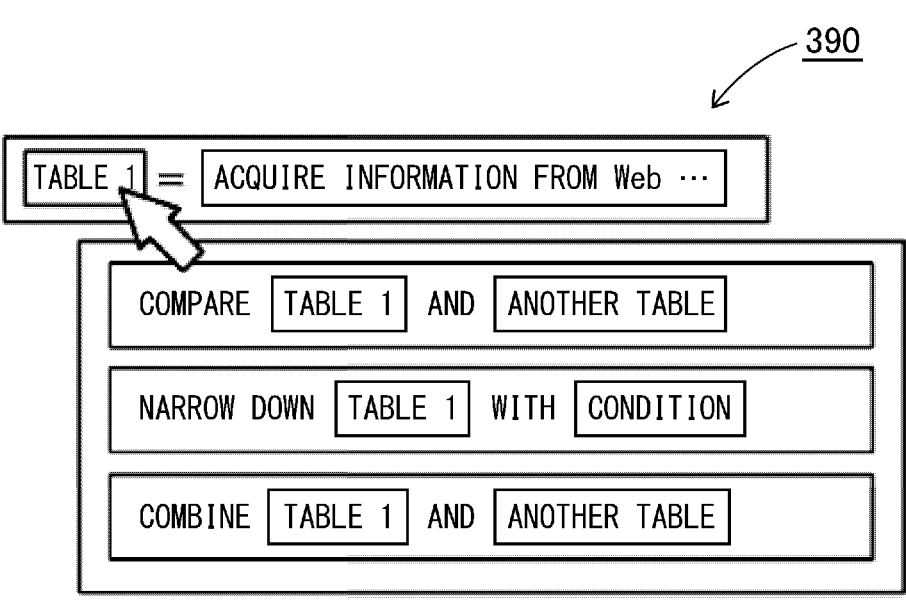
FIG. 21 is a schematic view illustrating a table operation screen.

In addition, when a plurality of pieces of table data are held in the memory section 15 and a plurality of pieces of table data are selected by the table data selection in step S1301 in the flow illustrated in FIG. 12, the plurality of pieces of table data can be combined, or a difference between the plurality of pieces of table data can be extracted. FIG. 21 is another example of FIG. 20. For example, in a case where an expense list table as illustrated in FIG. 22A is generated as Table 1 in a table operation screen 390 of FIG. 21, "narrow down Table 1 with condition" is generated as an activity if "narrow down table with condition" is selected.

Here, for example, in the case of creating a scenario in which an application is made only when expense is 1000 yen or more, the expense list table in FIG. 22A is narrowed down so that a table as illustrated in FIG. 22B is generated if a setting of "narrowing down an expense list table by amount >1000" is performed. The table newly generated in this manner can also be treated as a variable. For example, if the table of FIG. 22B is assigned with a name of an application target expense list table, a table named the application target expense list table can also be used for another activity.

In addition, branch processing designation can be also substituted by using this table navigation function. For example, in typical branch processing, it is necessary for the user to perform an operation of specifying a point that needs to branch from code and inserting branch processing at an appropriate position regarding processing of the branch processing such as an if statement ("amount>1000" in this case), which is troublesome. When the table navigation function is used, however, a branch can be also treated as one table, and thus, it is possible to perform an operation corresponding to the branch even if the user does not insert the branch processing by using the function together with repetitive processing of the creation navigation.

(Table Operation Function)

In addition, various operations, such as combining, stacking, difference extraction, common portion extraction, table narrowing-down, column addition, and column deletion, can be performed on a plurality of tables. Such table operation functions are executed by the table operation section 23c in FIG. 3. Here, as an example of the table operation functions, first, a table combining function of combining a plurality of tables will be described with reference to FIGS. 23 to 24.

(Table Combining Function)

In the table combining function, for a plurality of tables, the tables can be combined based on a name of a specific column. For example, when there are two tables as illustrated in FIG. 23, a table in FIG. 24 can be generated by combining the tables based on the name of the specific column, here, "customer code."

In this manner, it is possible to generate an automation program related to transcription work that treats data in pieces of table data, held as different pieces of table data, as associated data by combining the pieces of table data. In the example of FIG. 23, table data having "customer name" and table data having "email address" are held as different pieces of table data. Through the table combining function, an automation program related to transcription work of transcribing "customer names" and "mail addresses" related to the "customer names" to a plurality of forms existing on the same screen is generated.

(Table Vertical Stacking Function)

In addition, in a table vertical stacking function, a plurality of tables defining the same items can be connected in the column direction. For example, the table vertical stacking function can be executed for two tables having common items (here, three items of "customer name", "customer code", and "state") as illustrated in FIG. 25 to be put together as one table as illustrated in FIG. 26. Note that, when the table vertical stacking function is executed on tables in which non-common items exist as illustrated in FIG. 23 described above, empty cells are generated for the non-common items as illustrated in FIG. 27.

In this manner, it is possible to generate an automation program related to transcription work that treats pieces of data of the same type, which have been held as different pieces of table data, as data held in the same table data by vertically stacking the pieces of table data. Since all the column items of the two tables are common in the example of FIG. 25, pieces of data of each row are the same type of data. Since these two tables are treated as the single table data as illustrated in FIG. 26 by the table vertical stacking function, an automation program related to transcription work of performing similar transcription on a plurality of pieces of table data is generated by performing transcription designation by the transcription designation section 23 on the table data.

(Difference Extraction Function)

Further, a difference extraction function for obtaining a difference between a plurality of tables will be described. In the difference extraction function, a row, which does not exist in a specific column of another table, of a specific column of one table is left regarding the plurality of tables. For example, an example is considered in which there are two tables as illustrated in FIG. 28, and a customer names, a customer code, and a state are recorded as item names in Table 1 on the left, and a customer code and a mail address are recorded in Table 2 on the right. Regarding these tables, the difference extraction function is used to extract only a customer whose e-mail address does not exist. Here, out of the customer code, which is a specific column of Table 1, a row in which the customer code in Table 2 does not exist is extracted from Table 1. As a result, a table in which "kana bank" whose customer code does not exist in Table 2 and whose e-mail address does not exist is listed is created as illustrated in FIG. 29.

In this manner, it is possible to generate an automation program related to transcription work of transcribing data, obtained as a result of narrowing down data of certain table data with another table data as a condition, by extracting a difference from a plurality of pieces of table data. In the example of FIG. 28, the left table is narrowed down with the right table as a condition. As a result, it is possible to generate an automation program that transcribes data having no "customer code" corresponding to table data on the right side out of table data on the left side.

(Common Portion Extraction Function)

Further, a common portion extraction function of extracting a common portion of tables will be described. In the common portion extraction function, only a row, which exists in a specific column of another table, of a specific column of one table is left regarding the plurality of tables. For example, an example is considered in which only a customer whose e-mail address exists is extracted from the tables of FIG. 28. Here, out of the customer code, which is the specific column of Table 1, a row in which the customer code in Table 2 exists is extracted from Table 1. As a result, a table in which the customer code exists in and "Kana manufacturing" whose customer code exists in Table 2 and whose mail address exists is listed is created as illustrated in FIG. 30.

In this manner, it is possible to generate an automation program related to transcription work of transcribing data, obtained as a result of narrowing down data of certain table data with another table data as a condition, by extracting a common portion from a plurality of pieces of table data, which is similar to the difference extraction function. In the example of FIG. 28, the left table is narrowed down with the right table as a condition. As a result, it is possible to generate an automation program that transcribes data having the "customer code" corresponding to table data on the right side out of table data on the left side.

Note that an example in which two tables are arranged in the horizontal direction, that is, the row direction is illustrated in the above-described examples of FIGS. 23, 25, and 28, but the present invention is not limited thereto, and it is a matter of course that the respective table operation functions, such as the table combining function, the table vertical stacking function, and the difference extraction function, can be executed for a plurality of tables arranged at any positions in the vertical direction, the oblique direction, or the like.

(Table Narrowing-Down Function)

In a table narrowing-down function for narrowing down a table, filtering is performed with a specific column. A plurality of columns can be set as a condition.

(Column Addition Function)

In a column addition function for adding a column, it is possible to add a column of spreadsheet software including a mathematical formula.

(Column Deletion Function)

A column deletion function is a function for deleting an unnecessary column.

Note that the above-described various operations on a column in table data can be configured as the operations on a row, and conversely, an operation on a row can be replaced with the operation on a column.

Fourth Embodiment: Web Scraping (Web Acquisition Detail Setting)

The acquisition range designation section 22 displays a web data acquisition setting screen 540 after element data to be acquired from the web browser WB is designated. On the web data acquisition setting screen, it is selected whether or not to acquire element data of the same hierarchy as element data designated by a user. In addition, when the element data of the same hierarchy is acquired, a setting as to whether the element data of the same hierarchy is arrayed in the same column or in the same row is received. With these settings, data acquired from the web browser WB is held in the memory section 15 as table data.

Figures 33, 34:
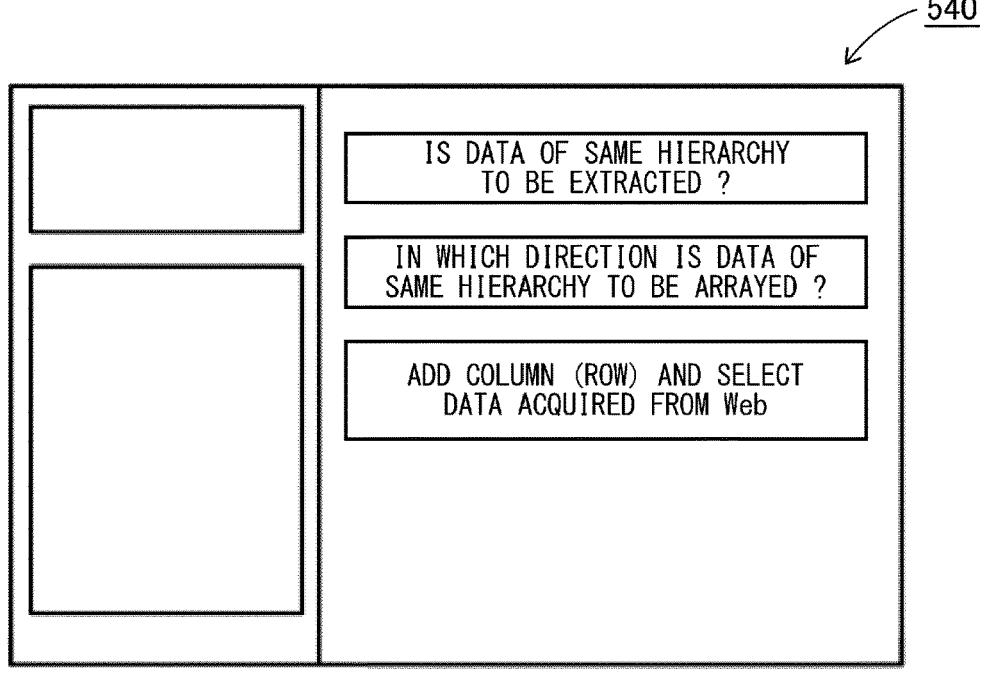
FIG. 33 is a schematic view illustrating an example of an output detail setting screen.
FIG. 34 is a schematic view illustrating an example of a web scraping extraction preview display displayed in a web scraping extraction preview display field on the output detail setting screen of FIG. 33.

FIG. 32 is a screen in a case where acquisition of element data of the same hierarchy as the element data designated by the user is selected in FIG. 33. In the case where it is selected to acquire the element data of the same hierarchy, the acquisition range designation section 22 creates a search formula capable of extracting the element data of the same hierarchy based on a path of the element data designated by the user. In FIG. 32, element data corresponding to the path extracted by the search formula is highlighted.

Figure 36:
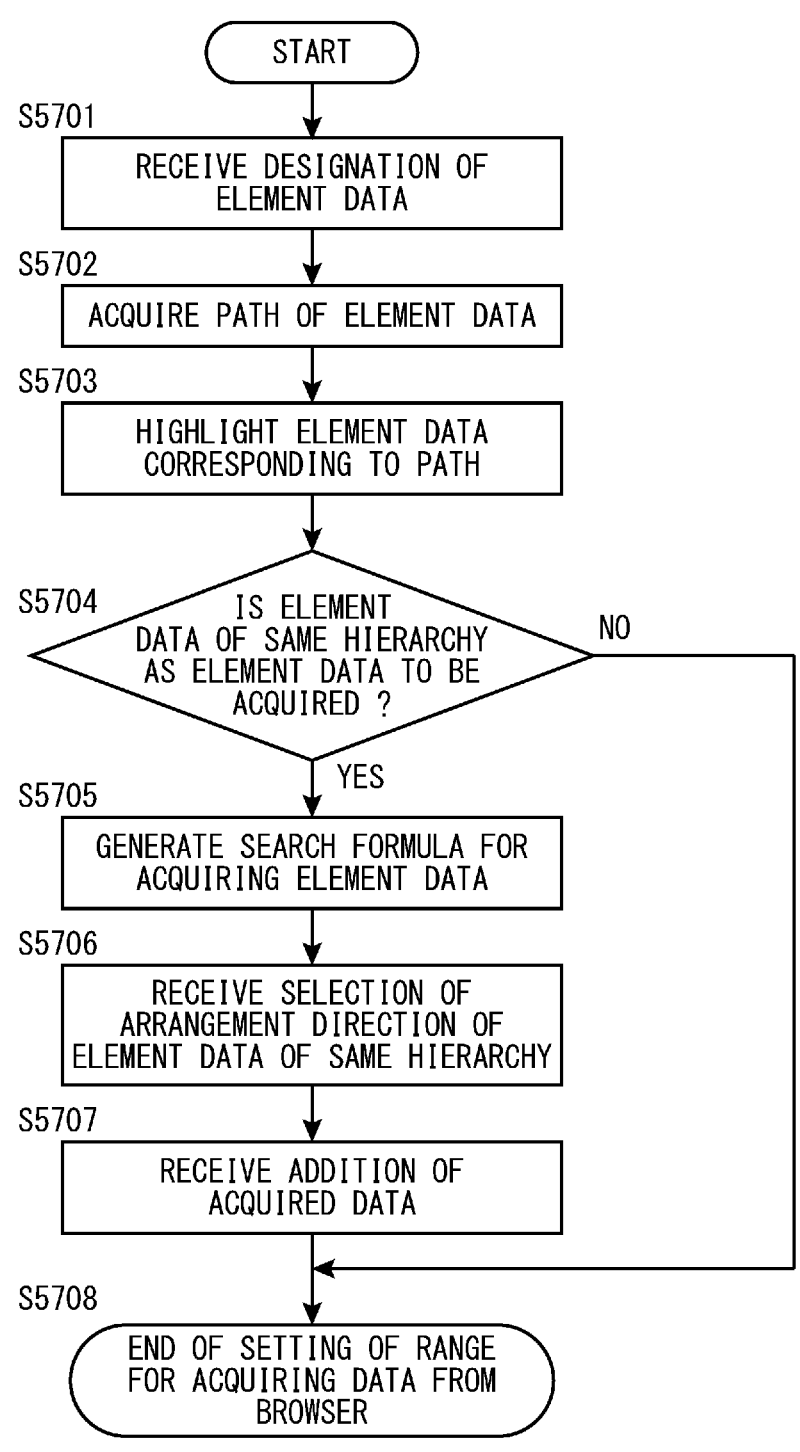
FIG. 36 is a preceding stage of a flowchart illustrating a procedure for performing a web acquisition detail setting.

FIG. 36 is a flowchart executed by the acquisition range setting section at the time of setting an acquisition range by the acquisition range setting section in step S904 of FIG. 8 when the web browser WB is designated as a transcription source application. Note that this flowchart illustrates a flowchart executed by the acquisition range setting section from a state in which a target page from which data is to be acquired is displayed in the web browser WB. Starting the web browser WB and displaying the target page from which data is to be acquired may be separately set by the operation recording setting section 48.

In step S5701, the acquisition range setting section receives designation of element data to be displayed on the web browser WB. In step S5702, the acquisition range setting section acquires a path of the element data designated by the user on the web browser WB by an extended function of the web browser WB. In step S5703, the acquisition range setting section highlights the element data corresponding to the path based on the acquired path. FIG. 31 illustrates a state in which the element data designated by the user is highlighted in step S5703. The user can identify the element data designated by himself/herself.

In step S5704, the acquisition range setting section determines whether or not to acquire element data of the same hierarchy as the element data designated by the user in step S5701. When element data of the same hierarchy as the element data designated by the user is to be acquired, a search formula using Xpath for acquiring the element data of the same hierarchy as the element data designated by the user in step S5701 is generated in step S5705 based on the path acquired in step S5702. In the present embodiment, the search formula is generated in step S5705 based on the path acquired in step S5702, but the search formula may be generated based on a plurality of paths as the path. For example, a search formula may be generated based on paths of a plurality of pieces of element data by receiving designation of the pieces of element data recognized as the element data of the same hierarchy as the element data designated by the user in step S5701. In this case, the accuracy with which the search formula from which element data of the same hierarchy can be extracted for the user's intention is generated is improved. FIG. 32 illustrates a state in which element data extracted by the search formula generated in step S5705 is highlighted. When it is determined in step S5704 not to acquire the element data of the same hierarchy as the element data designated by the user, the processing proceeds to step S5708, and the setting of the range for acquiring data from the web browser WB is ended.

When step S5705 is completed, the acquisition range setting section receives selection of an arrangement direction of the element data of the same hierarchy in step S5706. The arrangement direction of the element data selected in step S5706 is reflected in whether the element data of the same hierarchy is arranged in the same column or arranged in the same row when the data acquired from the web browser WB is held as the table data in the memory section 15. FIG. 34 illustrates an aspect of the table data held in the memory section 15 in a case where the element data of the same hierarchy is set to be arranged in the same column in step S5706. When the selection in step S5706 is completed, the acquisition range setting section receives addition of data acquired in step S5707. The data designated in step S5707 is arranged according to the arrangement selected in step S5706 when being held in the memory section 15 as the table data. For example, when the arrangement of the element data of the same hierarchical hierarchy in the same column is selected in step S5706, the data designated in step S5707 is acquired as data to be arranged in a new column. FIG. 35 illustrates an aspect of the table data held in the memory section 15 in a case where the element data of the same hierarchy is set to be arranged in the same column in step S5706 and two types of data are added in step S5707. Note that the aspects of the table data illustrated in FIGS. 34 and 35 may be displayed as previews of data to be acquired in accordance with the setting in each step.

After the addition of data in step S5707 is completed, the processing proceeds to step S5708, and the setting of the range for acquiring data from the web browser WB is ended.

As described above, it is possible to easily create the automation program by guiding the user such that a data group that can be acquired as table data can be acquired as the table data according to the present invention of each of the embodiments. In particular, if the automation target software is spreadsheet software, such as Excel, the automatic recognition and table range setting can be performed. In addition, if the automation target software is a web browser, it is possible to easily set a repetition direction at the time of web scraping. Further, if the automation target software is another general-purpose program, table data can be assigned with a name to be referenceable by displaying a screen on which a variable name can be set when "data acquisition" is selected as the operation content, so that it is possible to obtain an advantage that the automation program can be easily created.

Third Embodiment

In the present embodiment, a description will be given regarding a configuration in which an entity value of a variable referenced in a scenario is accessed when a user manages the scenario which is an automation program created according to the above-described embodiments.

Figure 37:
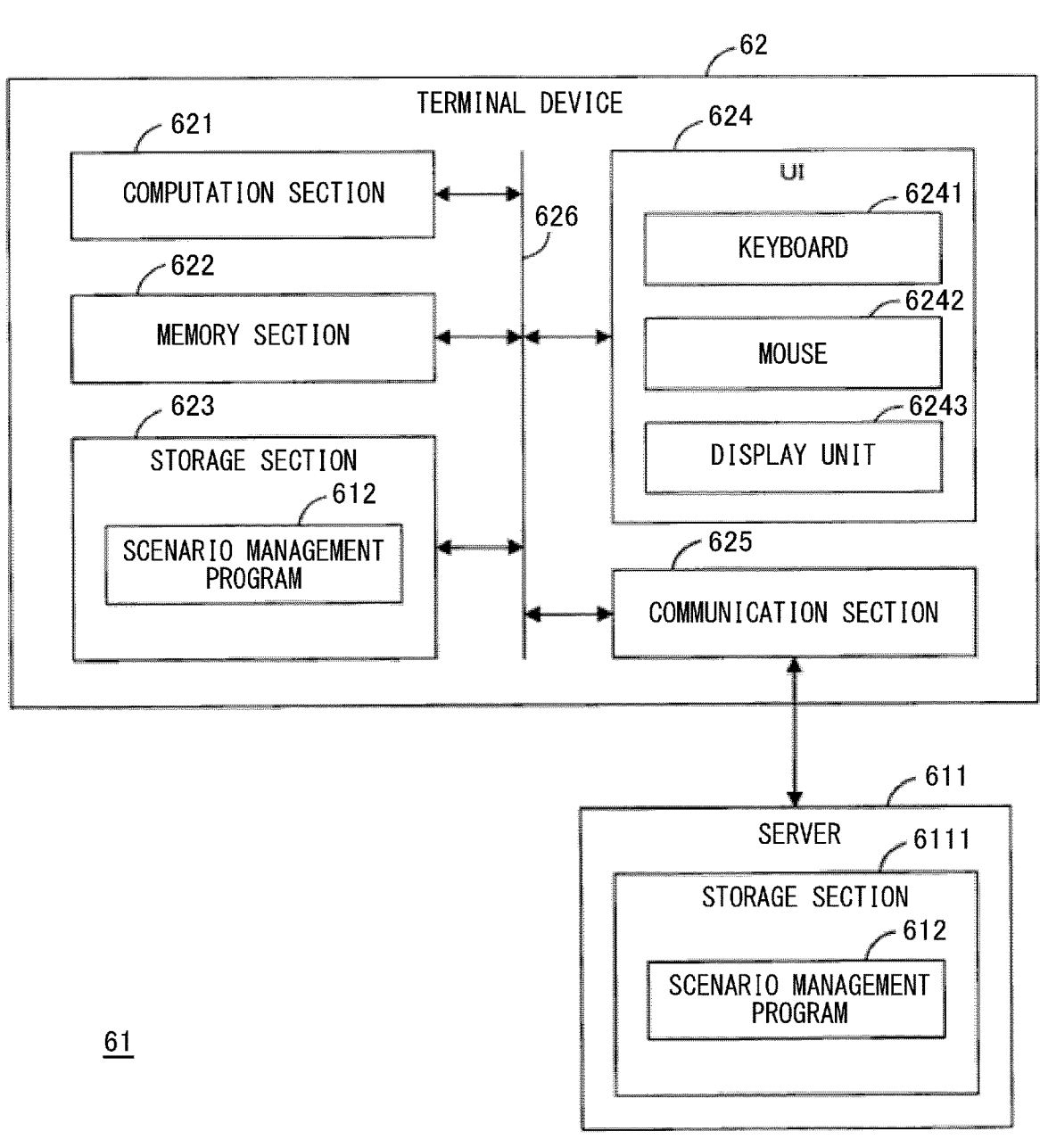
FIG. 37 is a block diagram illustrating an example of a scenario management system including a scenario management device according to the present invention.

FIG. 37 is a block diagram illustrating an example of a scenario management system including a scenario management device according to the present invention. A scenario management system 61 includes a server 611 and a terminal device 62 that functions as a client of the server 611. The server 611 is a computer and includes a storage section 6111 configured by a hard disk drive (HDD), a solid state drive (SSD), or the like, and a scenario management program 612 is saved in the storage section 6111.

The terminal device 62 is a computer configured to manage a scenario used in an RPA. The terminal device 62 includes a computation section 621, a memory section 622, a storage section 623, a user interface (UI) 6624, a communication section 625, and a bus 626, and transmission and reception of signals between the computation section 621, the memory section 622, the storage section 623, the UI 624, and the communication section 625 are executed via the bus 626.

The computation section 621 is a processor such as a central processing unit (CPU), and controls the memory section 622, the storage section 623, the UI 624, and the communication section 625. The memory section 622 includes a main memory, a cache memory, and the like, and volatilely stores data based on an instruction from the computation section 621, and the computation section 621 executes computation using data read from the memory section 622.

The storage section 623 includes an HDD, an SSD, and the like, and stores data in a nonvolatile manner. The UI 624 includes input instruments such as a keyboard 6241 and a mouse 6242, and an output instrument such as a display unit 6243. Therefore, the user can execute an input operation on the terminal device 62 by operating the keyboard 6241 and the mouse 6242, and can confirm various types of data stored in the memory section 622 and the storage section 623 by confirming a display of the display unit 6243. Note that the input instrument and the output instrument do not need to be separately configured, and may be integrated as a touch panel display. In addition, the communication section 625 executes communication with the server 611. The communication section 625 downloads the scenario management program 612 from the server 611, and the storage section 623 saves the scenario management program 612. In addition, when the computation section 621 executes the scenario management program 612, each functional section of FIG. 38 configured to execute scenario management is configured in the computation section 621.

Note that an aspect of providing the scenario management program 612 to the terminal device 62 is not limited to the download from the server 611. Therefore, the scenario management program 612 may be provided using other recording media including an optical disk such as a digital versatile disc (DVD), a universal serial bus (USB) memory, and the like The terminal device 62 can save the scenario management program 612 read from these recording media in the storage section 623.

Note that the scenario used in the RPA managed by the terminal device 62 in the present embodiment is a scenario for automating an operation executed by the user of the terminal device 62 or another human on an application program other than the scenario management program 612. The operation includes an operation of acquiring a value from an application program other than the scenario management program 612, an operation of processing a value, and an operation of inputting a value to an application program other than the scenario management program 612. The operation of acquiring a value from an application program other than the scenario management program 612 includes that a human operates the application program other than the scenario management program 612 in order to cause information to be referenced to be output from the output instrument such as the display unit 6243. In addition, the operation of inputting a value to an application program other than the scenario management program 612 includes an operation performed by a human to input a value to the application program other than the scenario management program 612 using the input instrument such as the keyboard 6241 or the mouse 6242. For example, direct input of a value using the keyboard 6241 and selection of a value that needs to be input from options displayed by the application program using the input instrument are included.

Figure 38:
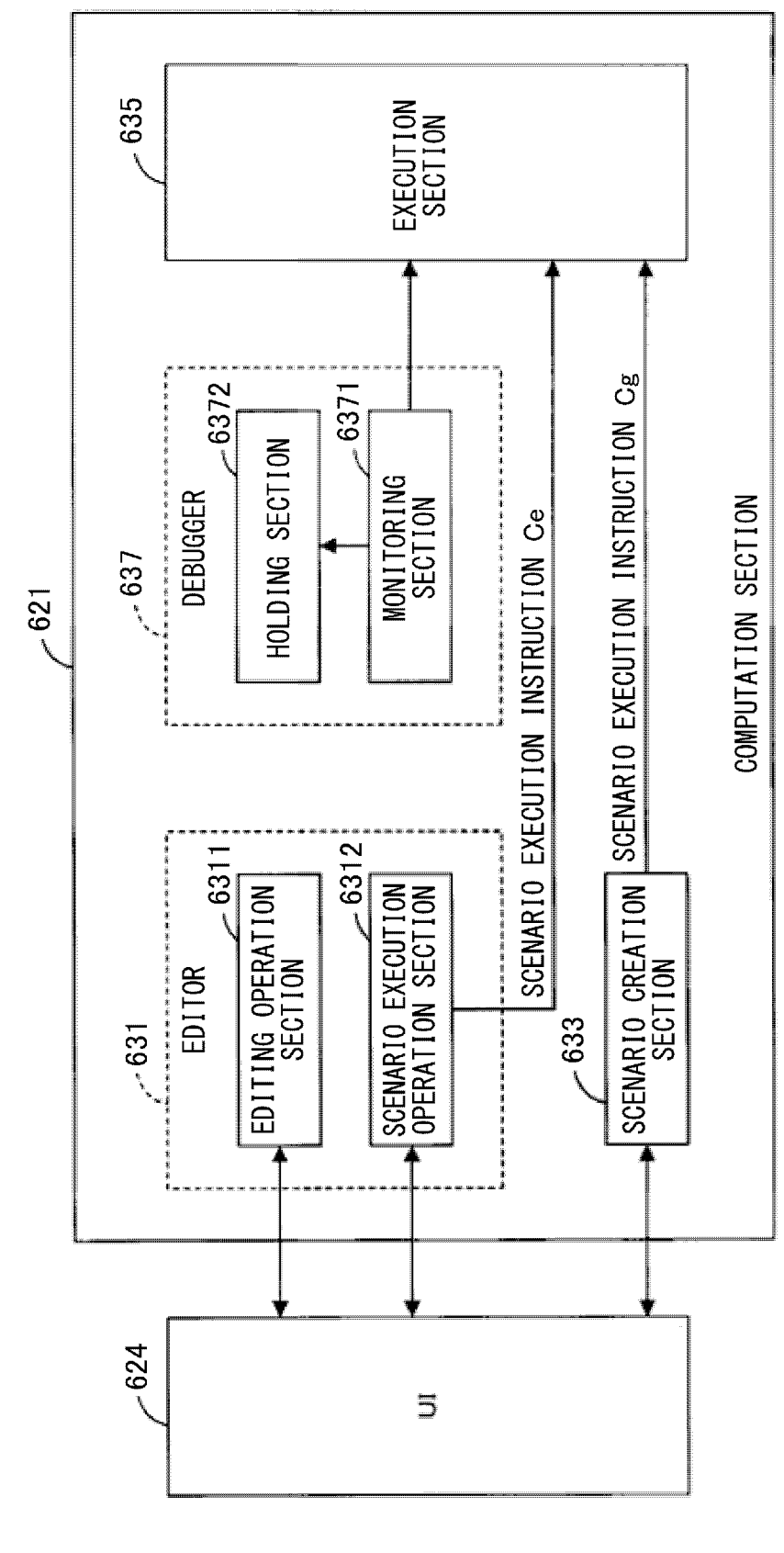
FIG. 38 is a block diagram illustrating each functional section configured in a computation section for scenario management.

FIG. 38 is a block diagram illustrating an example of each functional section configured in the computation section for scenario management. As illustrated in FIG. 38, an editor 631, a scenario creation section 633, an execution section 635, and a debugger 637 are configured in the computation section 621 as the computation section 621 executes the scenario management program 612.

The editor 631 manages a scenario. In the present embodiment, the scenario managed by the editor 631 includes a plurality of activities Act (not illustrated), which are computer operations corresponding to various human operations for an application program other than the scenario management program 612, and the editor 631 manages the plurality of activities Act. The editor 631 receives an operation of the user on the UI 624 for scenario management. The editor 631 includes an editing operation section 6311 and a scenario execution operation section 6312. For the scenario management by the user, the editing operation section 6311 displays a scenario management screen 64 (FIG. 39 and the like) indicating contents of operations automated in the scenario on the display unit 6243 of the UI 624, and receives an operation of the user on the scenario management screen 64. The scenario execution operation section 6312 receives an operation of instructing execution of the scenario from the user. The user selects some activities Act or all the activities Act included in the scenario as the operation of instructing the execution of the scenario. The scenario execution operation section 6312 receives the selection of the activities Act and sends a scenario execution instruction Ce indicating the execution of the scenario according to the selected activities Act to the execution section 635.

The scenario creation section 633 creates a scenario in accordance with an operation of the user on the scenario management screen 64. More specifically, settings related to contents of various human operations, which are automated by the activities Act, is received as settings for the activities Act through the operation of the user, and the activities Act are generated based on the settings. In addition, the scenario creation section 633 sends a scenario execution instruction Cg to the execution section 635 based on the generated activity Act. In the present embodiment, every time an activity Act is generated, the scenario creation section 633 sends the generated scenario execution instruction Cg indicating the execution of the activity Act to the execution section 635. Note that the scenario execution instruction Cg may be sent to the execution section 635 every time a predetermined number of activities Act are generated, or may be sent to the execution section 635 in response to execution of an operation of requesting the execution of the generated activity Act on the scenario management screen 64. In addition, the scenario creation section 633 may send the scenario execution instruction Cg not including an activity Act as a target to the execution section 635 in accordance with a type of the activity Act.

The execution section 635 executes a part or whole of a scenario based on the scenario execution instruction Ce from the editor 631 or the scenario execution instruction Cg from the scenario creation section 633. The debugger 637 manages a variable used by the execution section 635 to execute a scenario when the execution section 635 executes the scenario. The debugger 637 includes a monitoring section 6371 and a holding section 6372. The monitoring section 6371 monitors acquisition of an entity value of the variable by the execution section 635. The holding section 6372 holds the entity value acquired by the execution section 635 based on an instruction from the monitoring section 6371.

Figure 39:
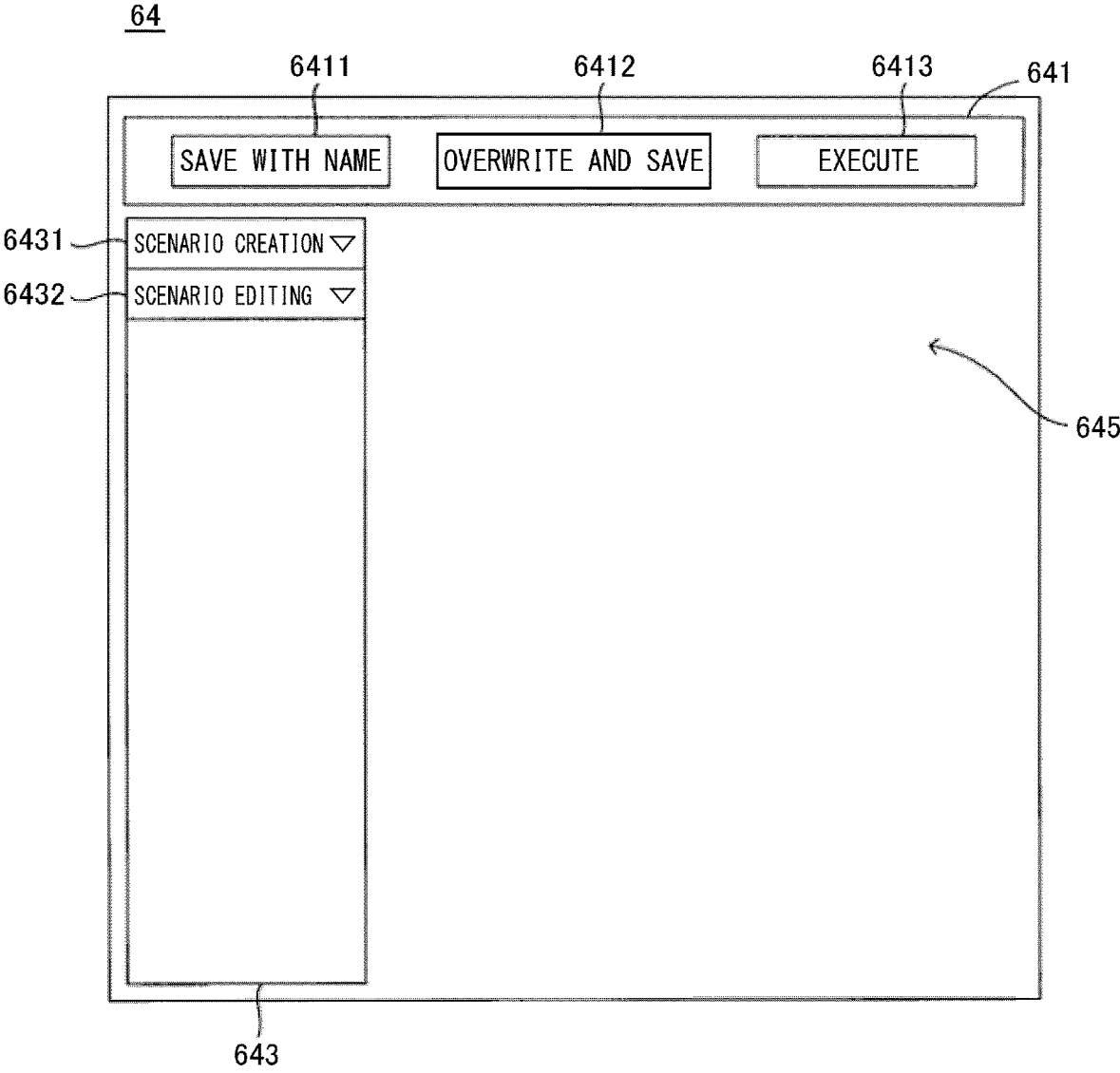
FIG. 39 is a schematic view illustrating an example of the scenario management screen displayed on the display unit.

FIG. 39 is a view schematically illustrating an example of the scenario management screen displayed on the display unit. Note that the scenario management screen 64 illustrated in FIG. 39 is merely an example, and various changes can be made. In addition, the scenario management screens 64 illustrated in the following drawings can be similarly changed. As illustrated in FIG. 39, the scenario management screen 64 includes a utility operation field 641, a mode selection field 643, and a scenario display field 645. The utility operation field 641 includes a button 6411 configured to save a newly created scenario with a name, a button 6412 configured to overwrite and save an edited scenario, and a button 6413 configured to execute a part or whole of a scenario.

The mode selection field 643 receives an operation of selecting one of a scenario creation mode and a scenario editing mode. That is, the user can select the scenario creation mode by operating (clicking) an expand/collapse button provided in a scenario creation field 6431 of the mode selection field 643 to expand the scenario creation field 6431. In addition, the user can select the scenario editing mode by operating (clicking) an expand/collapse button provided in a scenario editing field 6432 of the mode selection field 643 to expand the scenario editing field 6432.

FIGS. 40A to 40G are views schematically illustrating examples of operations that can be executed on the scenario management screen in the scenario creation mode. In these drawings, the scenario creation field 6431 is expanded, and the scenario editing field 6432 collapses. In the scenario creation mode, icons indicating various activities Act that can be used to create a scenario are displayed in the scenario creation field 6431. Various specific examples of the activity Act include:

an activity indicating acquisition of a table described in a Comma-Separated Values (CSV) format or the like;

an activity of narrowing down values of the table with a predetermined condition;

an activity of extracting a value from the table;

an activity of outputting the value to an output destination (table, web page, mail address, or the like);

an activity of accessing a predetermined web page;

an activity of acquiring an image or a sentence from the web page;

and the like. Then, the user can select activities Act constituting the scenario by arranging the activities Act of the scenario creation field 6431 into the scenario display field 645. In this manner, the scenario including the respective activities Act arranged in the scenario display field 645 can be created. Note that the user can arrange an activity Act of the scenario creation field 6431 into the scenario display field by various operations such as dragging the activity Act of the scenario creation field 6431 to the scenario display field 645 and double-clicking the activity Act of the scenario creation field.

In addition, activities Act are unitized as units U in accordance with work purposes, such as table editing and web scraping, in the scenario creation mode. Therefore, the user can create a scenario including activities Act constituting a unit U by arranging (dragging) the unit U in accordance with a work purpose into the scenario display field 645. As a result, burden on the user required for the scenario creation can be reduced. However, it is not essential that the activities Act are unitized in the scenario creation mode.

An operation in which the user arranges the activity Act into the scenario display field 645 in the scenario creation mode and an operation of determining a content (for example, a variable V to be used) of the activity Act are input to the scenario creation section 633 (FIG. 38). Then, the scenario creation section 633 receives the operations and creates the scenario. As a result, the scenario for executing the respective activities Act according to an array order of the activities Act in the scenario display field 645 is created.

In addition, the scenario creation section 633 sends the scenario execution instruction Cg indicating execution of an activity Act arranged in the scenario display field 45 to the execution section 635, and the execution section 635 executes the activity Act. That is, the activity Act included in the scenario is executed in parallel with the scenario creation in the scenario creation mode. Therefore, the user can determine the activity Act constituting the scenario while confirming an operation of the activity Act arranged in the scenario display field 645. In particular, an entity value E of the variable V used in the activity Act is acquired with execution of the activity Act. In the present embodiment, the acquisition of the entity value with the execution of the activity indicates that the entity value is held in a predetermined storage area so as to be referenceable when an activity other than the activity is executed. As a result, the user can create the scenario while confirming the entity value E of the variable V. The acquisition of the entity value E will be specifically described with reference to the examples of FIGS. 40A to 40G. Note that, regarding the execution of the activity Act in the scenario creation mode, it may be configured to receive an instruction on whether to execute the activity from the user. For example, it may be configured to cause the user to select whether or not to execute an activity that has an influence on a task when being executed at the stage of the scenario creation, such as writing data to another file or transmitting a mail.

Figure 40A:
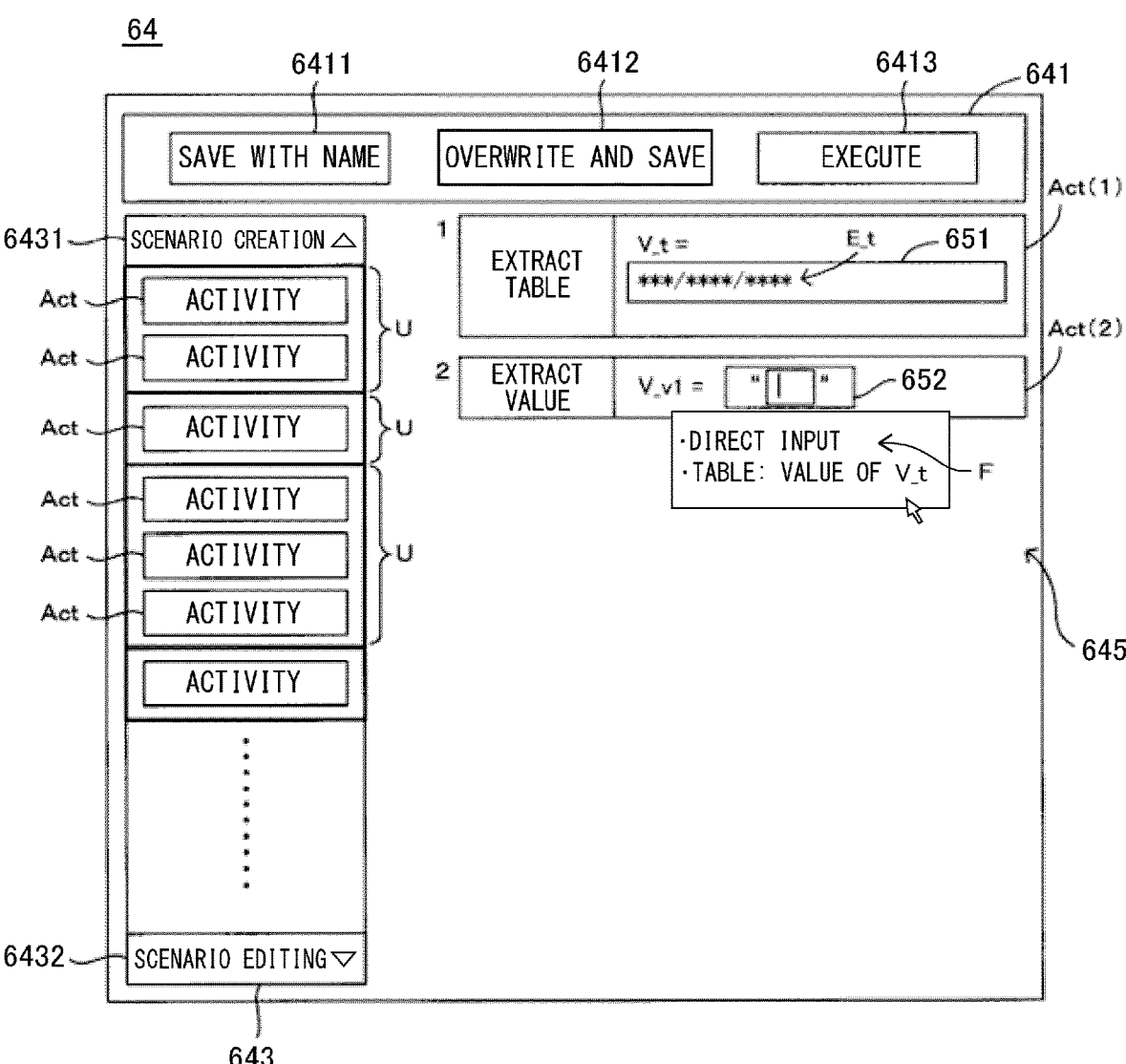
FIGS. 40A to 40G are schematic views illustrating examples of operations that can be excuted on a shenario management screen in a schnario creation mode.

In FIG. 40A, an activity Act(1) of extracting a table and an activity Act(2) of extracting a value from the table are selected as the activities Act constituting the scenario (that is, arrayed in the scenario display field 645). In the activity Act(1), a variable V_t is declared. The user can input a path of a table (data) that needs to be acquired as an entity value E_t of the variable V_t to an input field 651. Then, when the path is input in the input field 651, the activity Act(1) of acquiring a table of the path as the entity value E_t of the variable V_t is set. When the activity Act(1) is set in this manner, the scenario creation section 633 sends the scenario execution instruction Cg indicating execution of the activity Act(1) to the execution section 635. Then, the execution section 635 executes the activity Act(1) to acquire the entity value E_t of the variable V_t. At this time, variable management for storing the entity value of the variable acquired by the execution section 635 in the memory section 622 is executed, and details of the variable management will be described later.

In the activity Act(2), a variable V_v1 is declared, and an entity value E_v1 of the variable V_v1 is acquired. The user can input and set the acquisition of the entity value E_v1 of the variable V_v1 in the input field 652. In the present embodiment, when the user selects (clicks) the input field 652, the user can select either direct input to the input field 652 or input to the input field 652 through designation from options. In the present embodiment, the user selects one from two options of "•direct input" and "•table: value of V_t". The user can perform the direct input to the input field 652 when selecting "•direct input". In addition, when selecting "table: value of V_t", the user can designate acquisition of the entity value E_v1 using an arbitrary variable as an argument and use of the variable V_t as the argument by the selection. In particular, a candidate F of the variable that can be used as the argument in the activity Act(2) is displayed in the present embodiment. The variable displayed as the candidate F is, for example, a variable whose entity value has been acquired at the time of executing the activity when the scenario is executed. In the present embodiment, since the activity Act(1) is already executed at the time of executing the activity Act(2), the variable V_t of which the entity value E_t is acquired by executing the activity Act(1) is displayed as the candidate F. Note that the variable displayed as the candidate F may be displayed in accordance with a type of the input field 652.

Figure 40B:
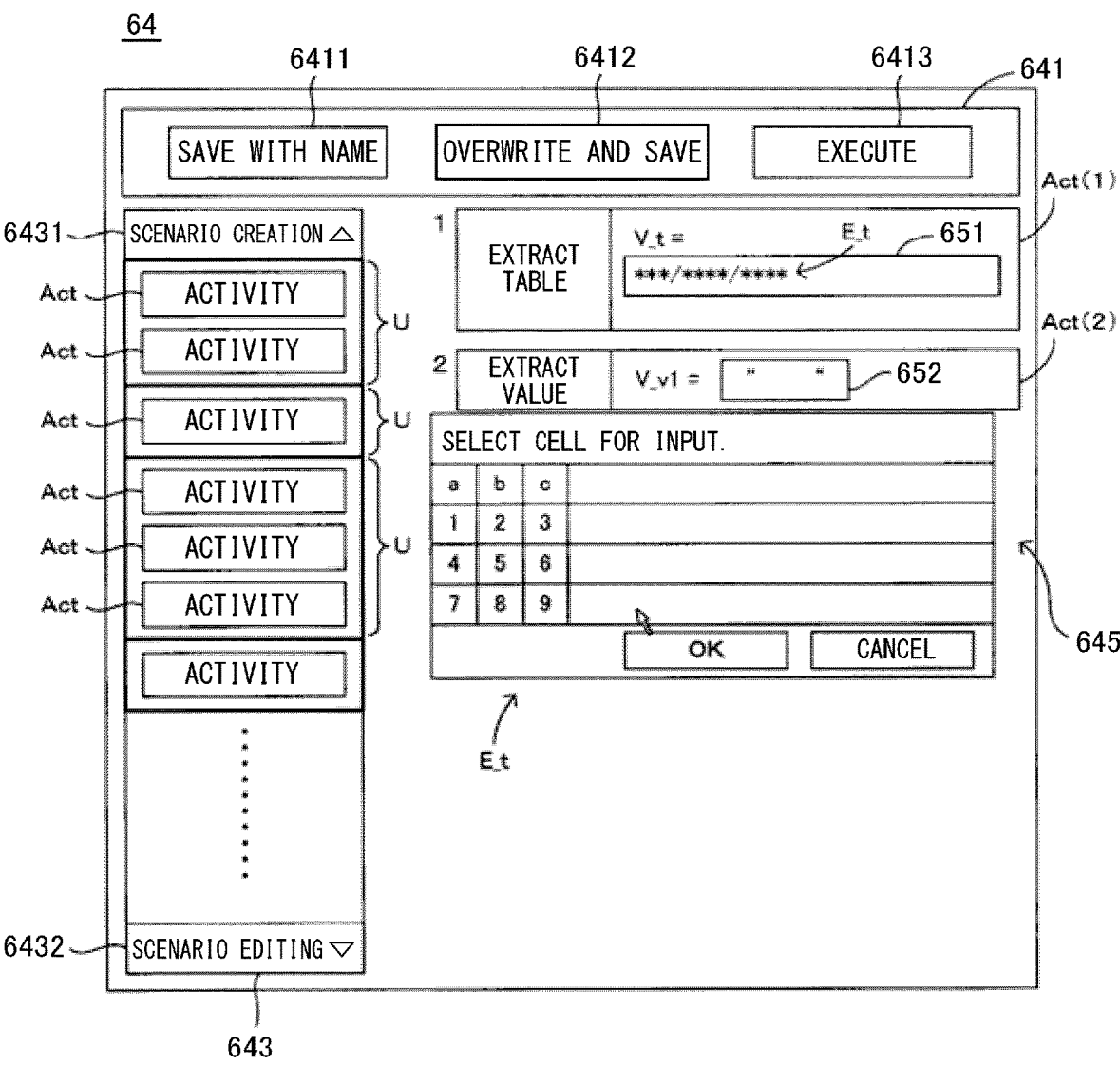
Figure 40C:
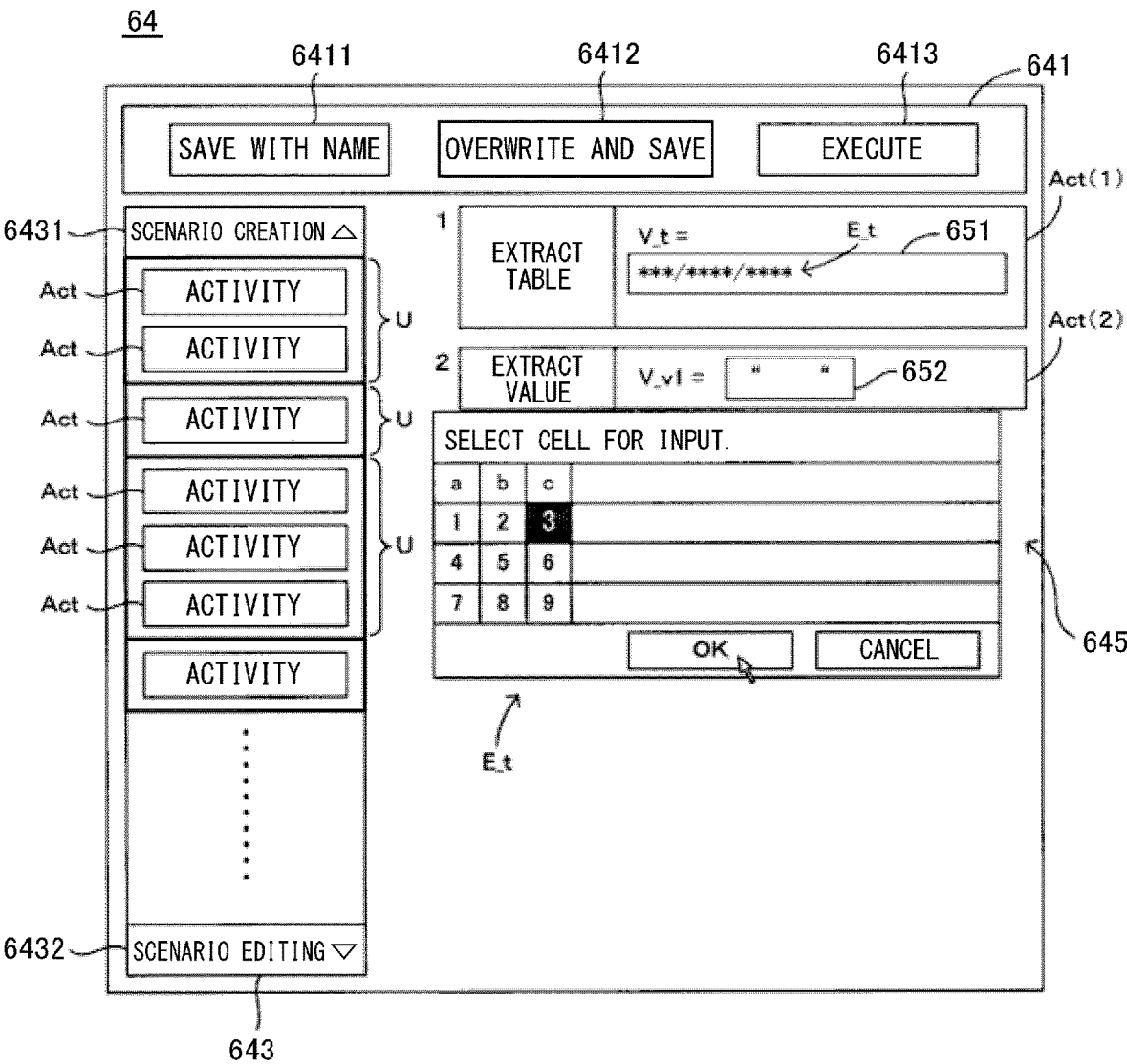
Figure 40D:
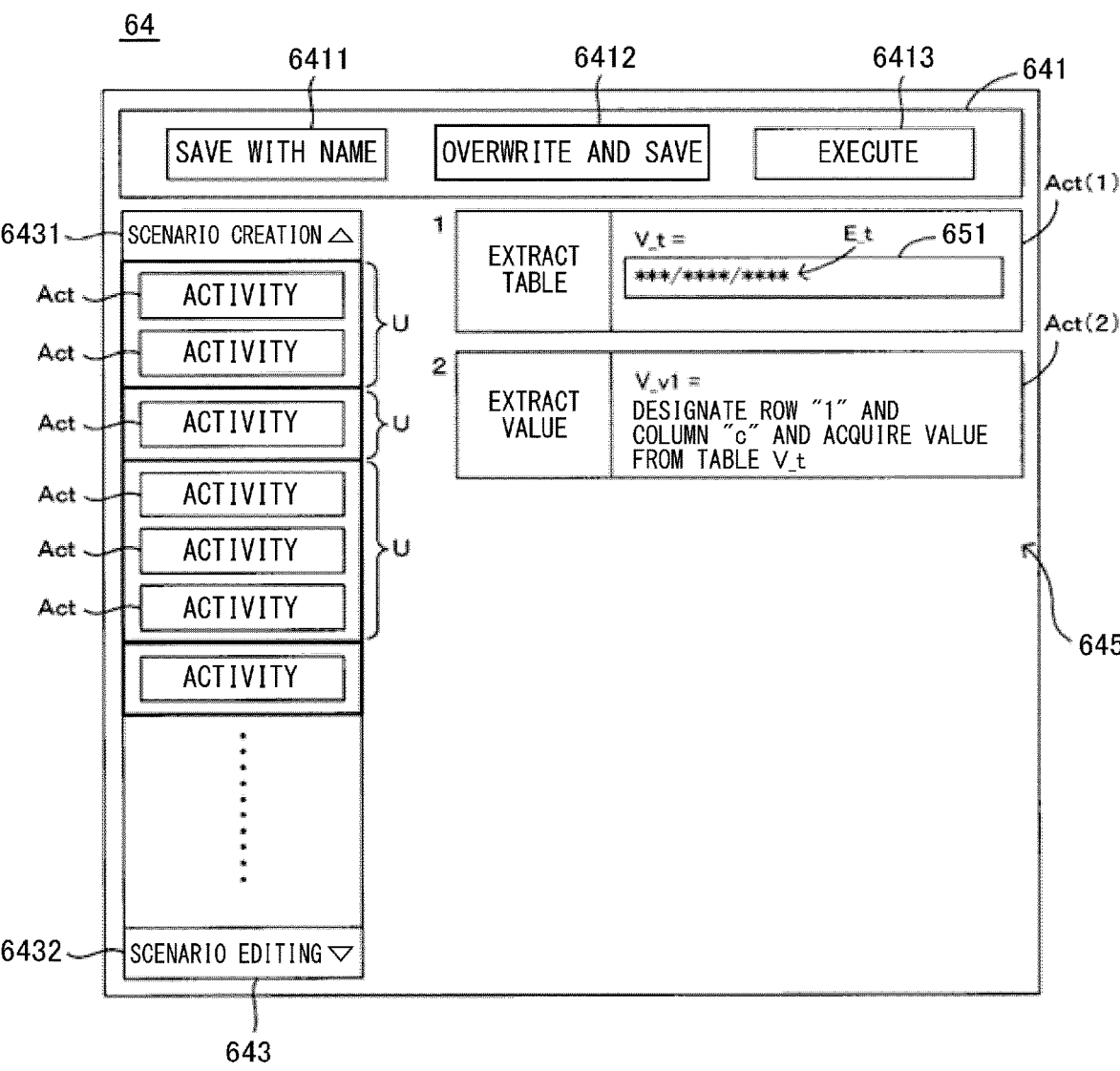

FIG. 40B illustrates a case where the option "•table: value of V_t" is selected, that is, a case where the entity value E_v1 is acquired using an argument and the variable V_t (table) is selected from among the candidates F of variables that can be used as the argument. In the present embodiment, the table is acquired as the entity value E_t in the activity Act(1), and thus, the case where it is selected to acquire a value included in the variable V_t (table) as the entity value E_v1 is illustrated. That is, the entity value E_t (table) of the variable V_t selected from the plurality of candidates F is displayed on the scenario management screen 64 in FIG. 40B. Therefore, the user can confirm that the candidate F selected as the argument of the activity Act(2) is a variable for acquiring what kind of entity value E_t. In addition, the variable V_t in the present embodiment is the table. Therefore, the user can designate one of cells included in the entity value E_t (table) to be displayed to set the input field 652 to acquire the entity value E_v1 of the variable V_v1 from the cell included in the variable V_t (table). FIG. 40C illustrates a case where the user has designated a cell including "3" in the first row and a column c from among the entity values E_t of the variables V_t. When an OK button is operated (clicked) in this state, the activity Act(2) of acquiring a value in the first row and the column c as the entity value E_v1 of the variable V_v1 from among pieces of data (entity data) acquired as the entity values E_t of the variables V_t is set (FIG. 40D). When the activity Act(2) is set in this manner, the scenario creation section 633 sends the scenario execution instruction Cg indicating execution of the activity Act(2) to the execution section 635. Then, the execution section 635 executes the activity Act(2) to acquire the entity value E_v1 of the variable V_v1. Note that the entity value E_t of the variable V_t is displayed in the present embodiment, but it may be configured such that the entity value E_t is displayed in accordance with a type received by the input field 652. For example, the activity Act(2) in the present embodiment is the activity Act of extracting a value, and the input field 652 receives input that causes extraction of the value included in the variable V_t, and thus, the entity values E_t are displayed such that the user can easily designate an extraction source among the variables V_t. In a case where the activity Act(2) is an activity of outputting data acquired as the entity value E_t of the variable V_t to an arbitrary file without particularly performing processing, there is no need to necessarily confirm the entity value E_t since it is sufficient if the input field 652 receives input for correct designation of the data to be output. In this manner, it may be configured such that whether or not the entity value E_t is displayed and a display aspect when the display is performed change in accordance with a reception manner in the input field 652.

Figure 40E:
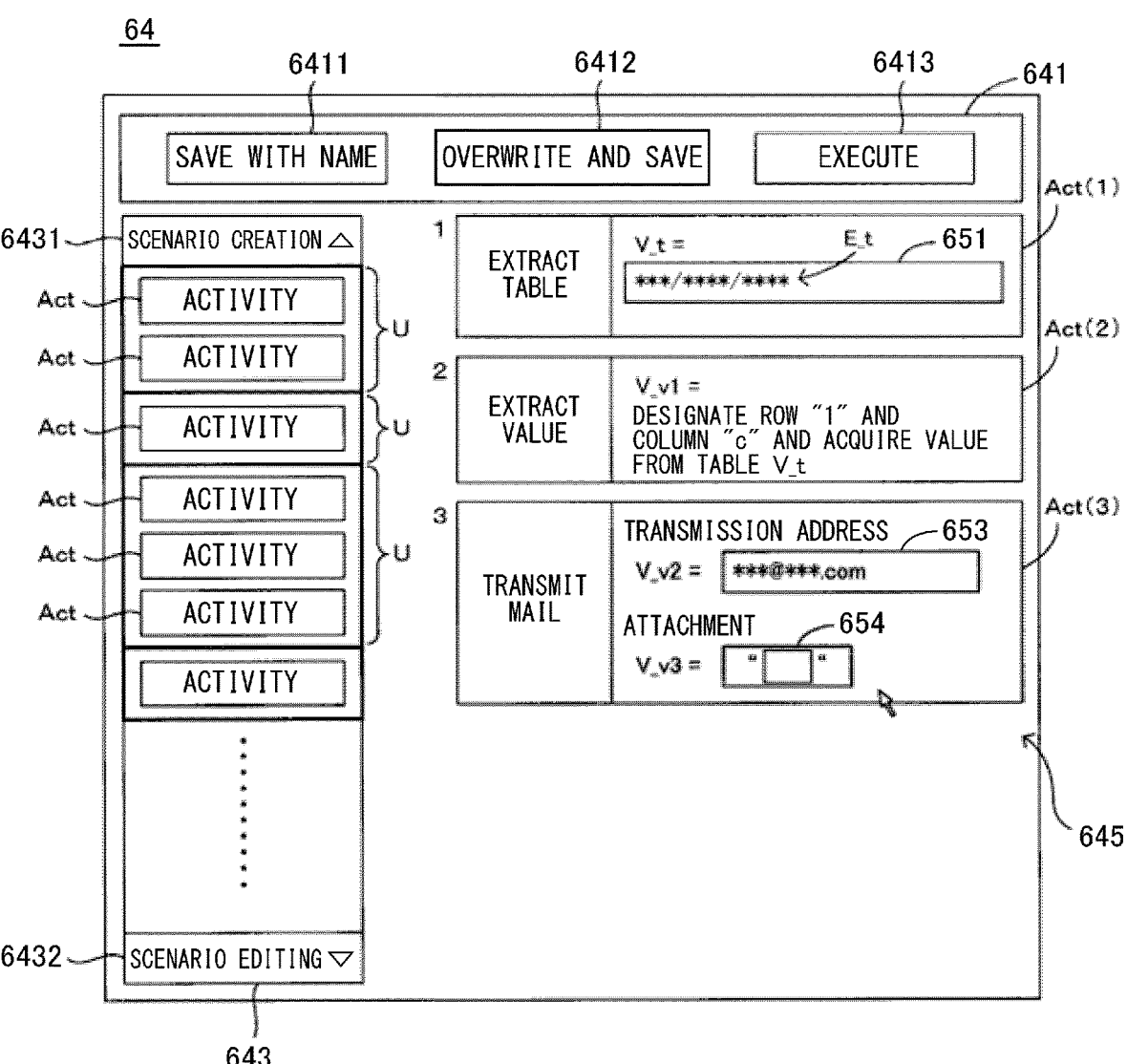
Figure 40F:
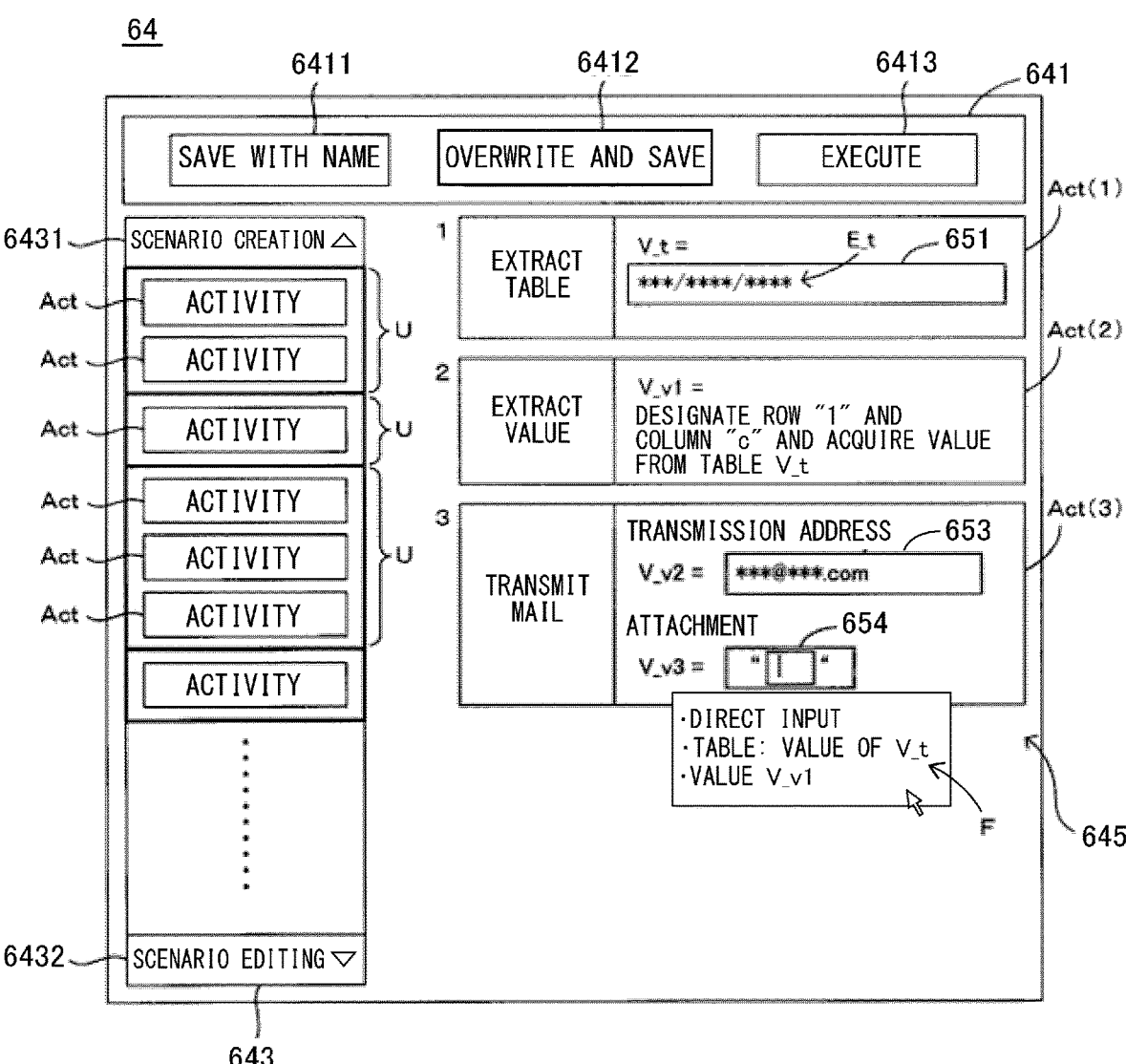
Figure 40G:
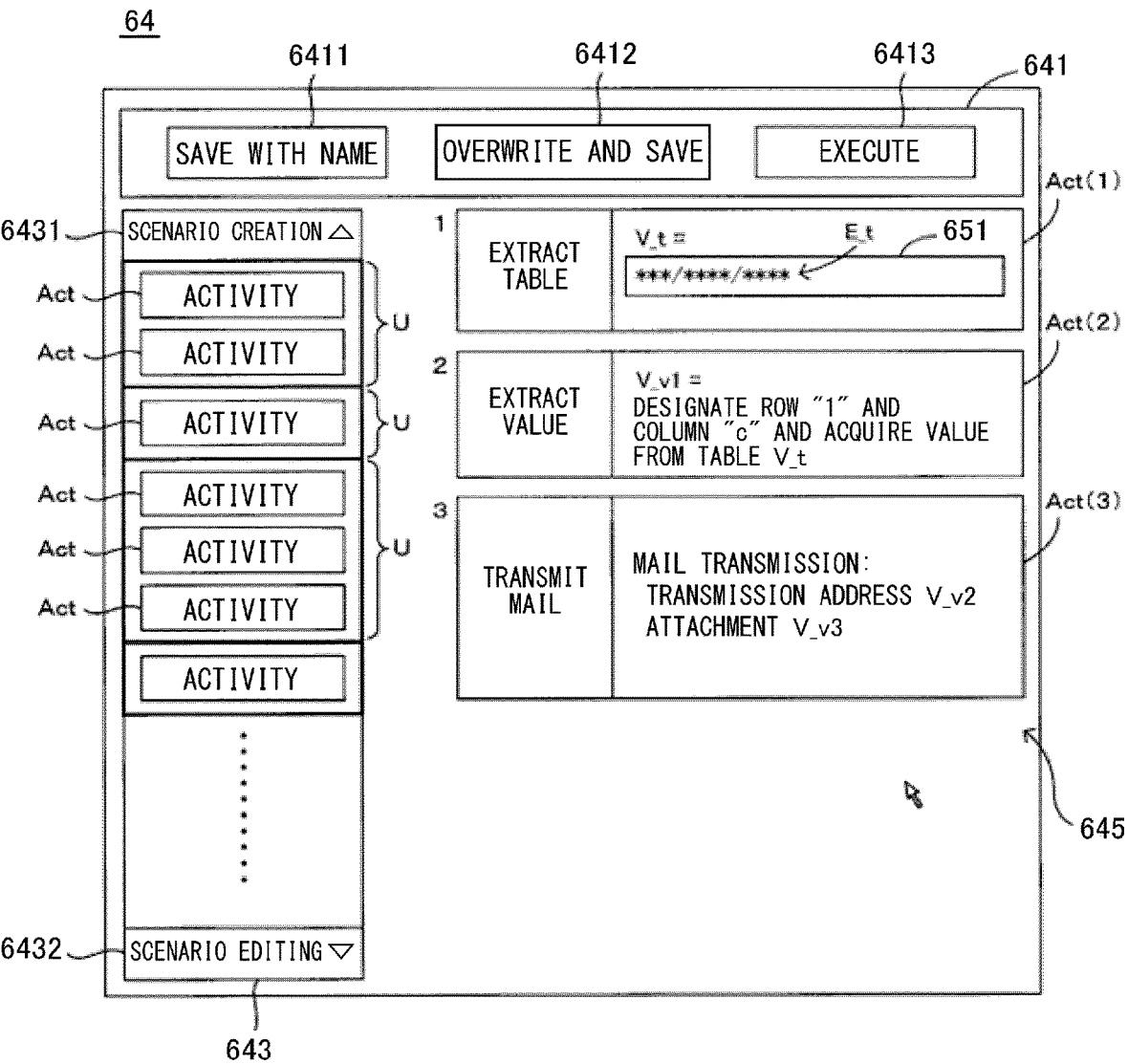

In FIG. 40E, an activity Act(3) of sending an email is selected as the activity Act constituting the scenario in addition to the activities Act(1) and Act(2). In the example illustrated in FIG. 40E, a mail address and a reference destination of attached data are designated as variables, and declaration of the respective variables and transmission of a mail using the variables as arguments are set as the user sets the activity Act(3). In the activity Act(3), a variable V_v2 as the mail address is declared, and the user can set acquisition of an entity value E_v2 of the variable V_v2 by input to the input field 653. Further, a variable V_v3 as a file path of the attached data is declared, and acquisition of an entity value E_v3 of the variable V_v3 can be set by input to an input field 654. In particular, when the user selects (clicks) the input field 654, the candidates F that can be acquired as the entity value E_v3 of the variable V_v3 are displayed as illustrated in FIG. 40F. Specifically, a value included in the variable V_t (table) and the variable V_v1 are displayed as the candidates F. Then, when input is performed in each of the input fields 653 and 54 and acquisition of the entity value E_v2 of the variable V_v2 and acquisition of the entity value E_v3 of the variable V_v3 are set, the respective entity values E_v2 and E_v3 are acquired, and the activity Act(3) of sending a mail to which the attached data indicated by the entity value E_v3 has been attached to the mail address E_v2 indicated by the entity value E_v2 is set (FIG. 40G). On the other hand, the scenario creation section 633 sends the scenario execution instruction Cg indicating execution of the activity Act(3) to the execution section 635. Then, the execution section 635 executes the activity Act(3) to acquire the entity values E_v2 and E_v3 of the variables V_v2 and V_v3. Note that the transmission of the mail is not necessarily performed when the activity Act(3) is executed in the scenario creation mode. As a result, it is possible to avoid transmission of an unnecessary mail.

Figure 41:
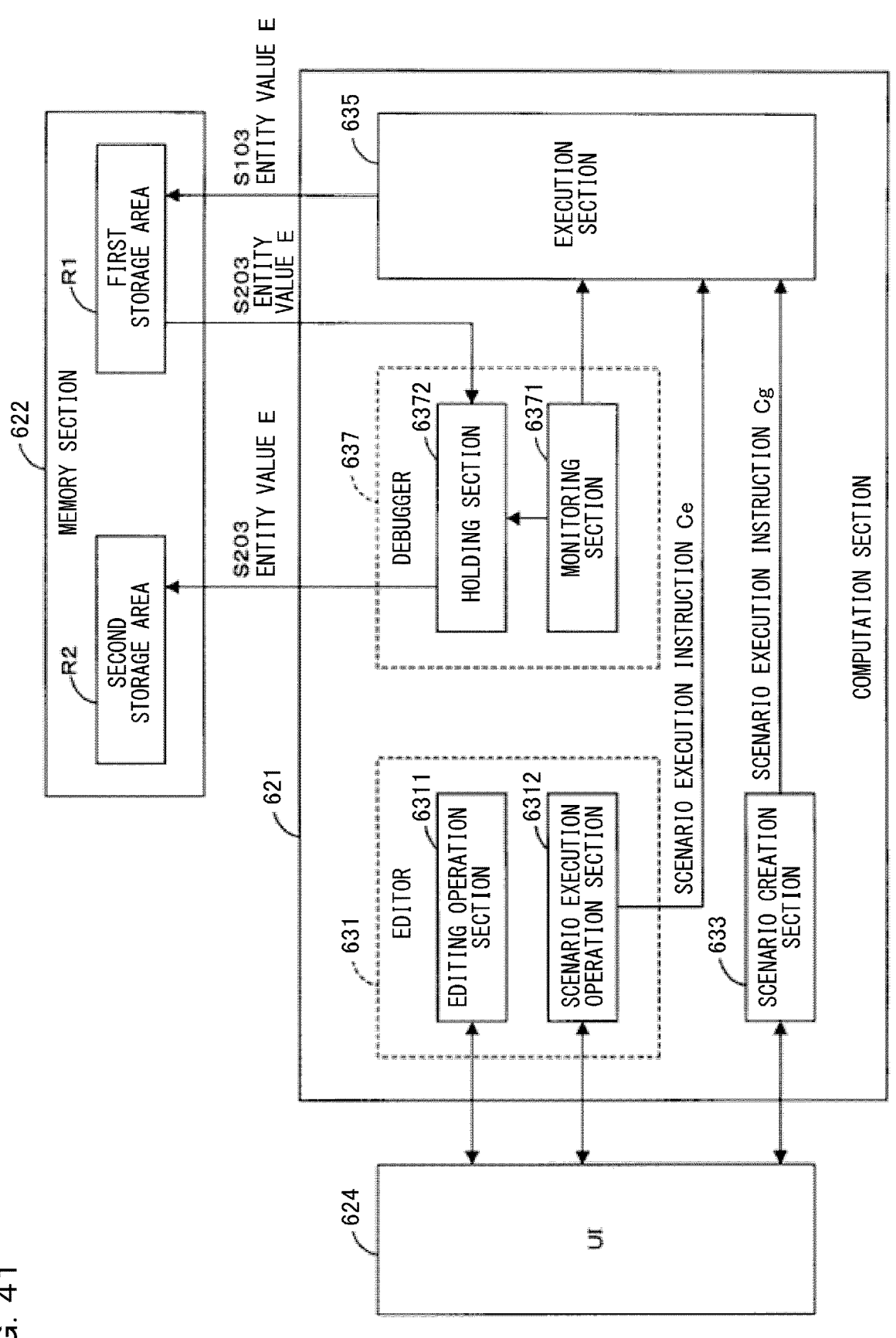
FIG. 41 is a block diagram illustrating operations of respective functional sections of a computation section when variable management is executed.
Figure 42:
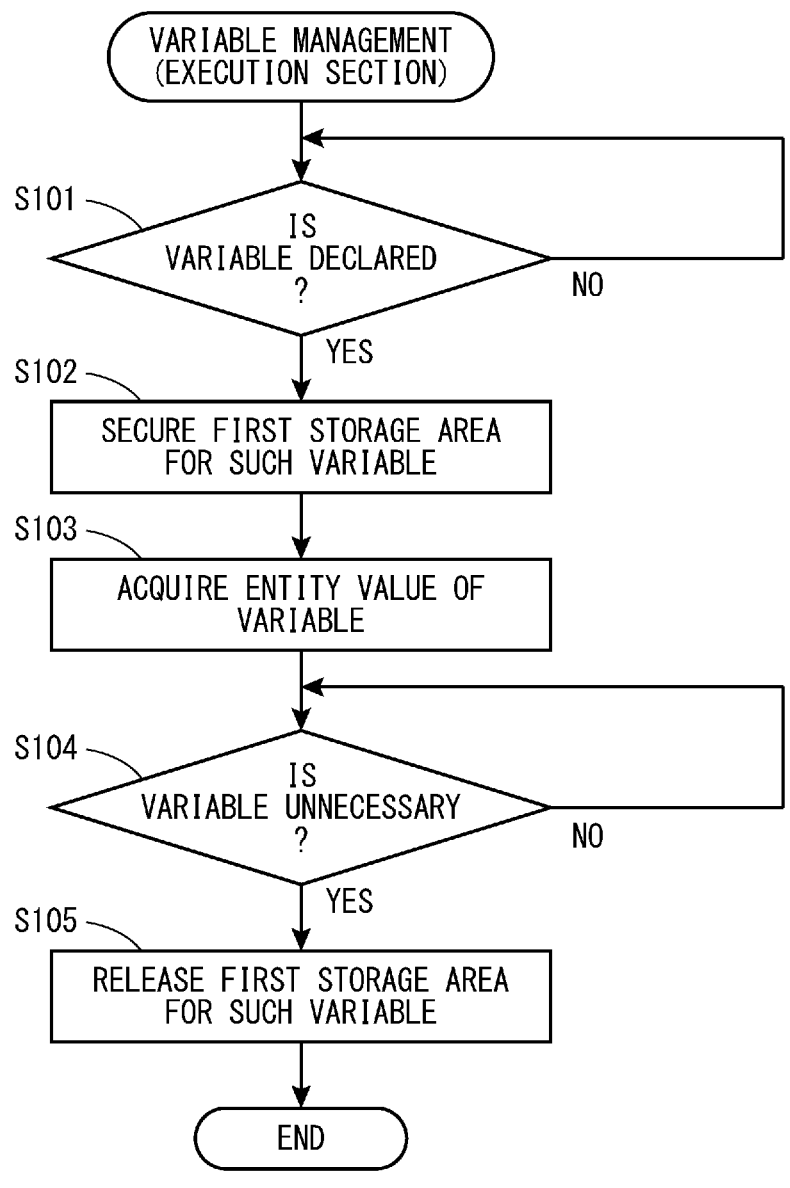
FIG. 42 is a flowchart illustrating an example of control executed by an execution section for variable management.
Figure 43:
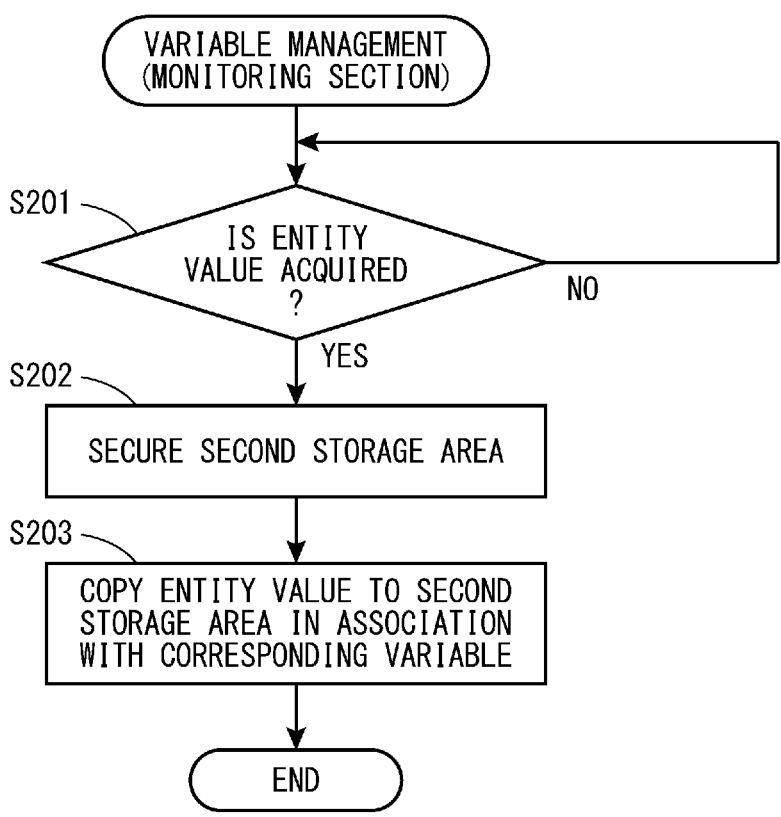
FIG. 43 is a flowchart illustrating an example of control executed by a monitoring section for variable management.

Meanwhile, the variable management for managing the entity value E of the acquired variable V is executed in parallel with the execution of the scenario creation mode as described above. Next, this variable management will be described with reference to FIGS. 41, 42, and 43. Here, FIG. 41 is a block diagram illustrating operations of the respective functional sections of the computation section when the variable management is executed; FIG. 42 is a flowchart illustrating an example of control executed by the execution section for the variable management; and FIG. 43 is a flowchart illustrating an example of control executed by the monitoring section for the variable management.

As illustrated in FIG. 41, a first storage area R1 and a second storage area R2 are secured in the memory section 622 in the scenario creation mode.

The first storage area R1 is an area accessible by the execution section 635. The execution section 635 executes the activity Act to hold the entity value E of the variable V in the first storage area R1. At this time, the entity value E held in the first storage area R1 is referenced when the execution section 635 executes the activity including the variable V. That is, the entity value E held in the first storage area R1 by executing one activity Act (for example, the activity Act(1)) is held to be referenceable when another activity Act (for example, the activity Act(2)) is executed. The first storage area R1 is secured in the memory section 622 as an area that can be accessed when the execution section 635 executes a scenario, and thus, is secured for a period corresponding to a timing when the execution section 635 executes the scenario, and is released when the period ends. Since the scenario execution instruction Cg is sent from the scenario creation section 633 to the execution section 635 as needed in the scenario creation mode, the first storage area R1 may be secured in the memory section 622 during the scenario creation mode. In addition, when the execution section 635 executes the scenario based on the scenario execution instruction Ce sent from the scenario execution operation section 6312, the first storage area R1 may be secured in the memory section 622 from the start of execution of an activity indicated by the scenario execution instruction Ce to the completion of execution of all activities indicated by the scenario execution instruction Ce by the execution section 635.

The debugger 637 can also access the first storage area R1. As described above, the debugger 637 includes the monitoring section 6371 and the holding section 6372. The monitoring section 6371 monitors that the entity value E of the variable V is acquired by the execution section 635, that is, the entity value E of the variable V is held in the first storage area R1. Then, the holding section 6372 accesses the first storage area R1 and the second storage area R2 based on an instruction generated by the monitoring section 6371 depending on a monitoring result, and causes the second storage area R2 to hold the entity value E held in the first storage area R1.

The second storage area R2 is an area secured in the memory section 622, that is, a predetermined area of a volatile storage element, and is an area that can be accessed by the holding section 6372 of the debugger 637. The entity value E held in the second storage area R2 is associated with the variable V that references the entity value E. More specifically, the second storage area R2 holds an entity value E, referenced as a variable V included in an activity Act when the execution section 635 executes the activity Act, in association with the variable V. The second storage area R2 is secured in the memory section 622 as an area that can be accessed by the holding section 6372 that holds the entity value E as the entity value E of the variable V is held in the first storage area R1, and thus, is secured in the memory section 622 at least for a period during which the first storage area R1 is secured in the memory section 622. In addition, the second storage area R2 is also an area accessible by the editor 631 as will be described later, and thus, is secured in the memory section 622 for a period other than the period during which the first storage area R1 is secured in the memory section 622.

When the scenario creation mode is started, the execution section 635 confirms whether a variable has been declared in the activity Act (step S101) as illustrated in FIG. 42. Then, when the declaration of a variable V is confirmed ("YES" in step S101), the execution section 635 secures the first storage area R1 in the memory section 622 for the declared variable V (step S102). Subsequently, the execution section 635 acquires an entity value E of the variable V in the first storage area R1 (step S103). That is, the entity value E of the variable V is held in the first storage area R1 so as to be referenceable by the execution section 635. The entity value E is held in the first storage area R1 until the variable V becomes unnecessary. On the other hand, when the variable V becomes unnecessary ("YES" in step S104), the execution section 635 releases the first storage area R1, and the entity value E is erased from the memory section 622. Note that a timing at which the variable V declared in the scenario creation mode becomes unnecessary is typically a timing at which the execution section 635 leaves the scenario creation mode as the user performs an operation of ending the scenario creation mode.

In addition, when the scenario creation mode is started, the monitoring section 6371 monitors the acquisition of the entity value E of the variable V by the execution section 635 (step S201) as illustrated in FIG. 43. When the acquisition of the entity value E of the variable V by the execution section 635 is confirmed ("YES" in step S201), the monitoring section 6371 causes the holding section 6372 to execute steps S202 and S203. That is, the holding section 6372 secures the second storage area R2 in the memory section 622 (step S202), and copies the entity value E of the first storage area R1 to the second storage area R2 (step S203). As a result, the entity value E is held in the second storage area R2 in association with the variable V.

FIG. 44 is a view schematically illustrating operations of the variable management executed based on the flowcharts of FIGS. 42 and 43. The above-described operations are organized in time series with reference to FIG. 44. When the variable V is declared in the activity Act included in the scenario being created, the execution section 635 secures the first storage area R1 corresponding to the variable V in the memory section 622 (step S102), and acquires the entity value E of the variable V in the first storage area R1 (step S103). In addition, when confirming the acquisition of the entity value E, the monitoring section 6371 causes the holding section 6372 to secure the second storage area R2 in the memory section 622 (step S202) and copy the entity value E from the first storage area R1 to the second storage area R2 (step S203). As a result, the entity value E is held in the second storage area R2 in association with the variable V. In step S105, the first storage area R1 is released as the variable V becomes unnecessary. Even after the release of the first storage area R1, the entity value E is held in the second storage area R2.

Note that the flowcharts of FIGS. 42 and 43 are executed for each of a plurality of variables V in a case where the plurality of variables V is declared in the scenario creation mode. That is, in the examples illustrated in FIGS. 40A to 40E, the flowcharts in FIGS. 42 and 43 are executed for each of the variable V_t, the variable V_v1, the variable V_v2, and the variable V_v3. As a result, the entity value E illustrated in FIG. 45 is held in the memory section 622. Here, FIG. 45 is a view schematically illustrating examples of entity values held in the memory section. When the flowcharts of FIGS. 42 and 43 are executed for the examples of FIGS. 40A to 40E, the entity values E_t, E_v1, E_v2, and E_v3 are held in second storage areas R2(1), R2(2), R2(3), and R2(4) in association with the variables V_t, V_v1, V_v2, and V_v3, respectively, as illustrated in FIG. 45.

Meanwhile, the scenario editing mode other than the scenario creation mode can be selected in the mode selection field 643 of the scenario management screen 64 as described with reference to FIG. 39. Then, the scenario created by the scenario creation mode in the above-described procedure can be edited by selecting the scenario editing mode.

FIGS. 46A to 46E are views schematically illustrating examples of operations that can be executed on the scenario management screen in the scenario editing mode. In these drawings, the scenario editing field 6432 is expanded, and the scenario creation field 6431 collapses. In addition, FIG. 47 is a block diagram illustrating operations of the respective functional sections of the computation section when the scenario editing mode is executed.

Figure 47:
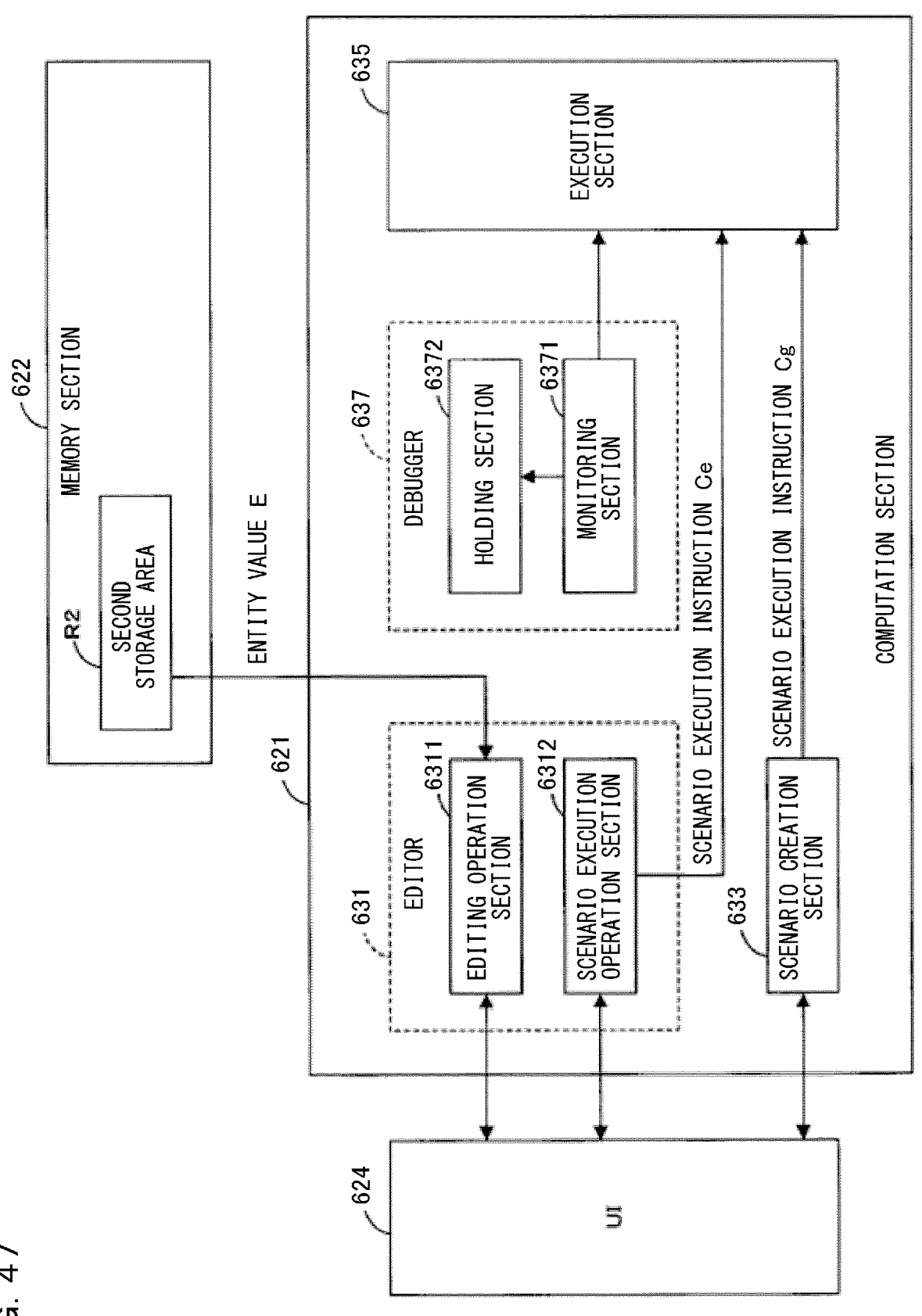
FIG. 47 is a block diagram illustrating operations of a respective functional sections of a computation section when a scenario editing mode is executed.

As illustrated in FIG. 47, the second storage area R2 is secured in the memory section in the scenario editing mode. FIG. 47 illustrates the operations of the respective functional sections of the computation section at the time of shifting to the scenario editing mode after the scenario creation mode ends. As compared with FIG. 41 illustrating the operations of the respective functional sections of the computation section in the scenario creation mode, the first storage area R1 is released and disappears from the memory section 622, and the second storage area R2 is continuously secured in the memory section 622. The second storage area R2 is continuously secured in the memory section 622 by the holding section 6372. As a result, the entity value E held in association with the variable V when the execution section 635 executes the activity Act is continuously held in the second storage area R2.

The second storage area R2 is an area that can be accessed by the editor 631 in addition to the holding section 6372 described above. The editor 631 accesses the second storage area R2 and references the entity value E held in association with the variable V. As illustrated in FIG. 47, the editor 631 accesses the second storage area R2 without passing through the execution section 635. Therefore, the editor 631 can reference the entity value E held in association with the variable V in parallel with the execution of the scenario by the execution section 635. In addition, the editor 631 can reference the entity value E held in association with the variable V for a period other than a period during which the scenario is executed by the execution section 635. Since the second storage area R2 is accessed by the editor 631 configured to manage the scenario, the second storage area R2 is secured in the memory section 622 at least from the start of the execution of the activity Act by the execution section 635 to the end of a period during which an operation for managing the scenario is received by the editor 631. In the present embodiment, the second storage area R2 is secured in the memory section 622 when execution of the scenario management program 612 by the computation section 621 is started, and is released when the execution of the scenario management program 612 by the computation section 621 ends.

An operation in which the user arranges the activity Act into the scenario display field 645 in the scenario creation mode and an operation of editing a content of the activity Act are input to the editing operation section 6311 (FIG. 47). Then, the editing operation section 6311 receives an operation on the scenario display field 645 and edits the scenario according to the operation.

Figure 46A:
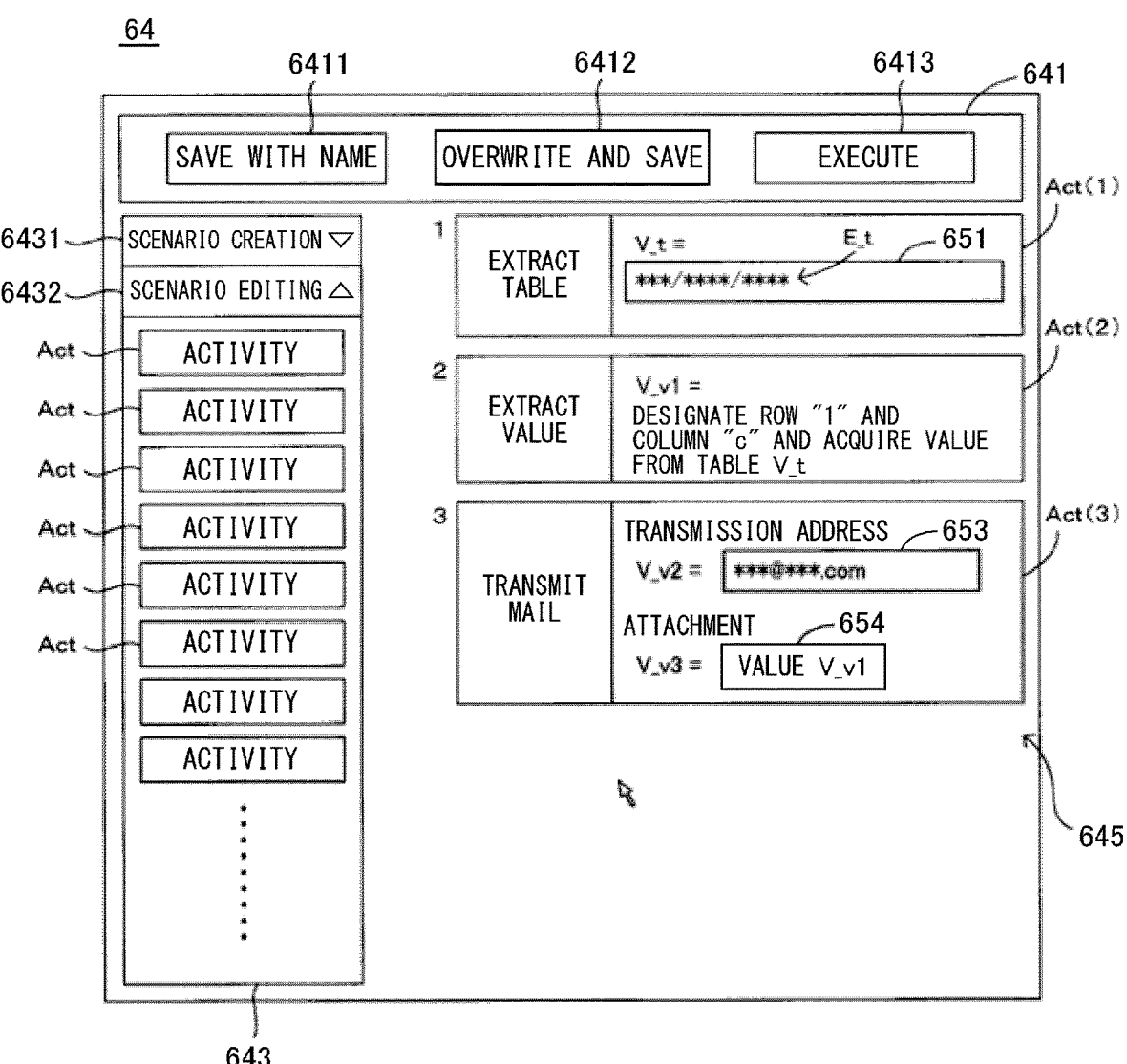
FIGS. 46A to 46E are schematic views illustrating examples of operations that can be executed on a scenario management screen in a scenario editing mode.

In FIG. 46A, the scenario created in the scenario creation mode illustrated in FIGS. 40A to 40E is selected as an editing target and displayed in the scenario display field 645. In addition, icons indicating various activities Act that can be added to the scenario are displayed in the scenario editing field 6432.

Figure 46B:
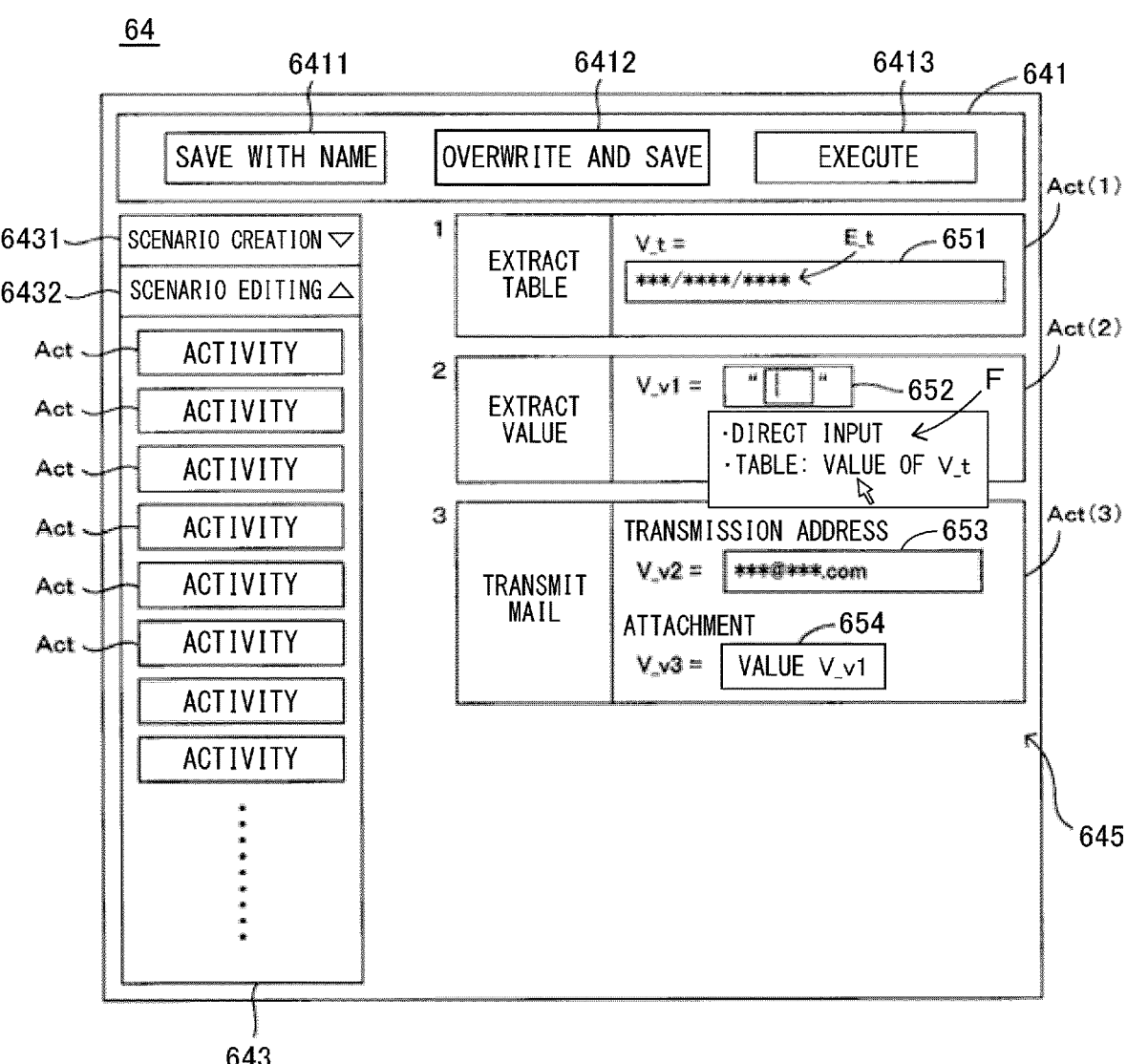

FIG. 46B illustrates an editing operation with respect to the activity Act(2) among the plurality of activities Act(1) to Act(3) included in the scenario. Specifically, data related to the acquisition of the entity value E_v1 of the variable V_v1 declared in the activity Act(2) is edited. In particular, candidates F that can be used as an argument in the activity Act(2) are displayed by selection (clicking) of the input field 652 by the user.

Figure 46C:
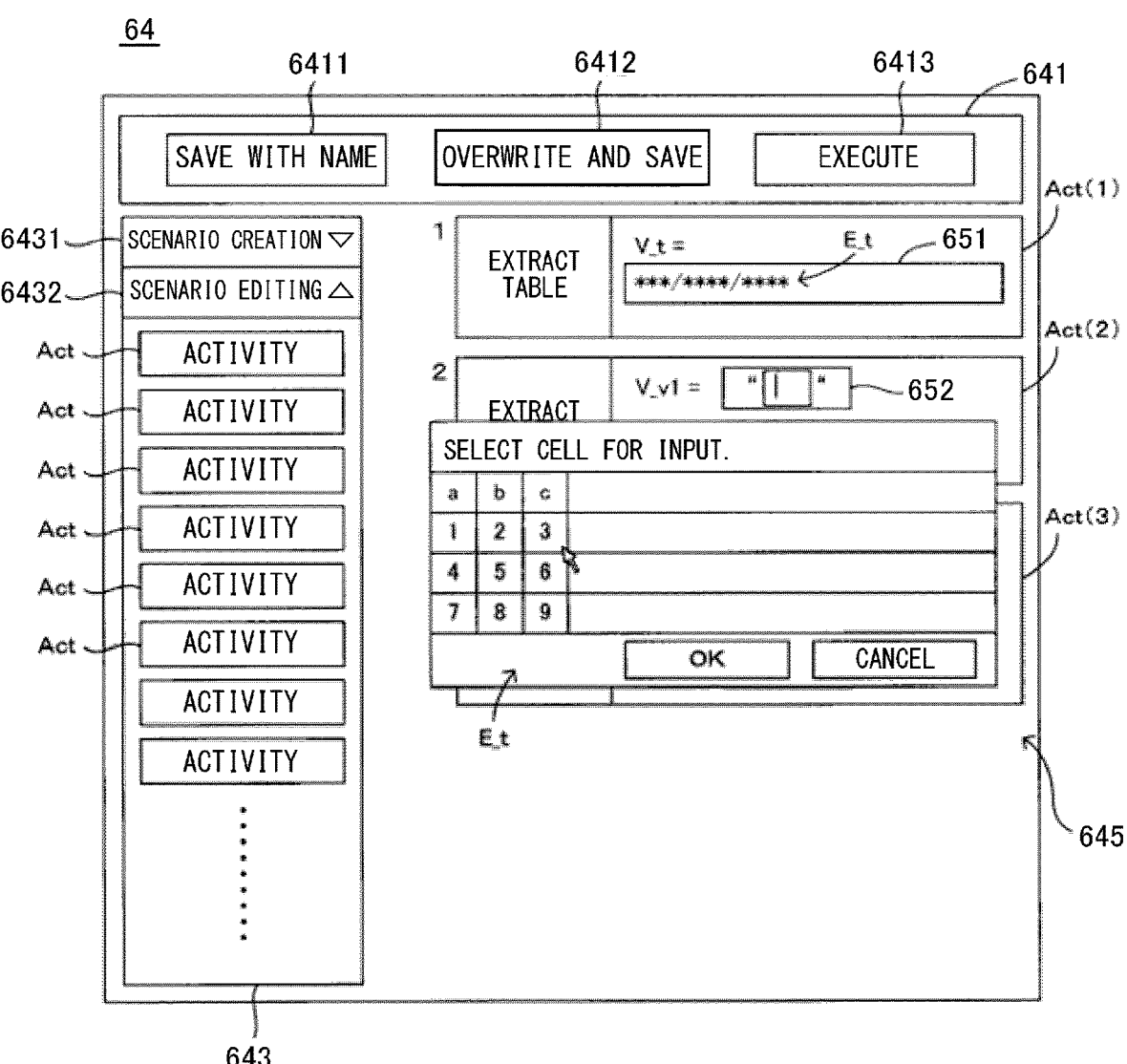

FIG. 46C illustrates a case where the entity value E_v1 is acquired using the argument and the variable V_t is selected from the candidate F as the argument. That is, the entity value E_t of the variable V_t selected from the candidates F is displayed on the scenario management screen 64 in FIG. 46C. That is, the variable V_t is designated as a display target by selecting the variable V_t from the candidates F. Since the variable V_t references the entity value E_t, which is a table including a plurality of values, the plurality of values included in the table are displayed as the display of the entity value E_t. At this time, the editing operation section 6311 (FIG. 47) reads the entity value E_t held in the second storage area R2 and displays this entity value E_t on the scenario management screen 64. As a result, it is possible to confirm the entity value E_t by editing the activity Act(2) while omitting the execution of the activity Act(1) for acquiring the entity value E_t.

Figure 46D:
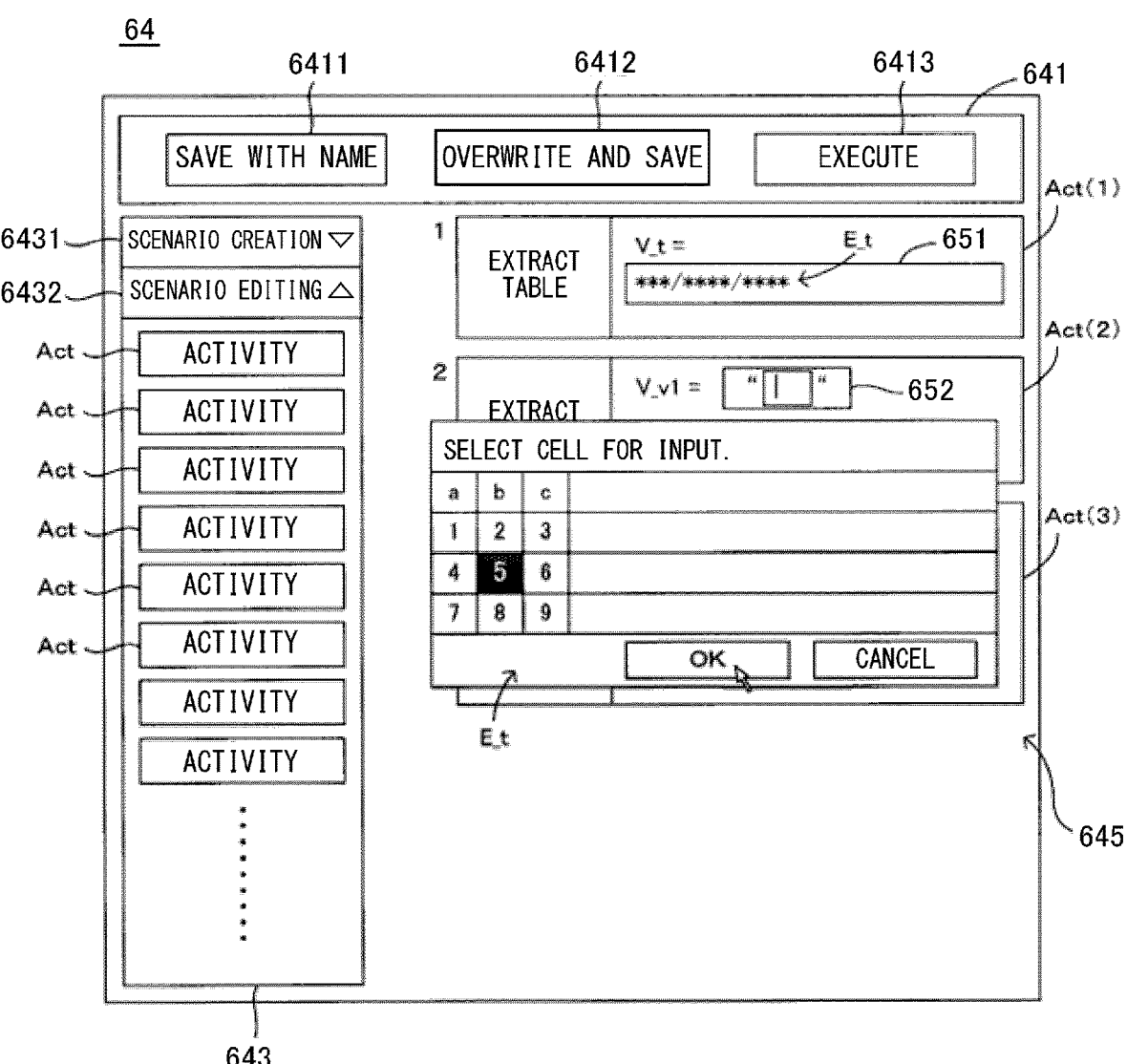
Figure 46E:
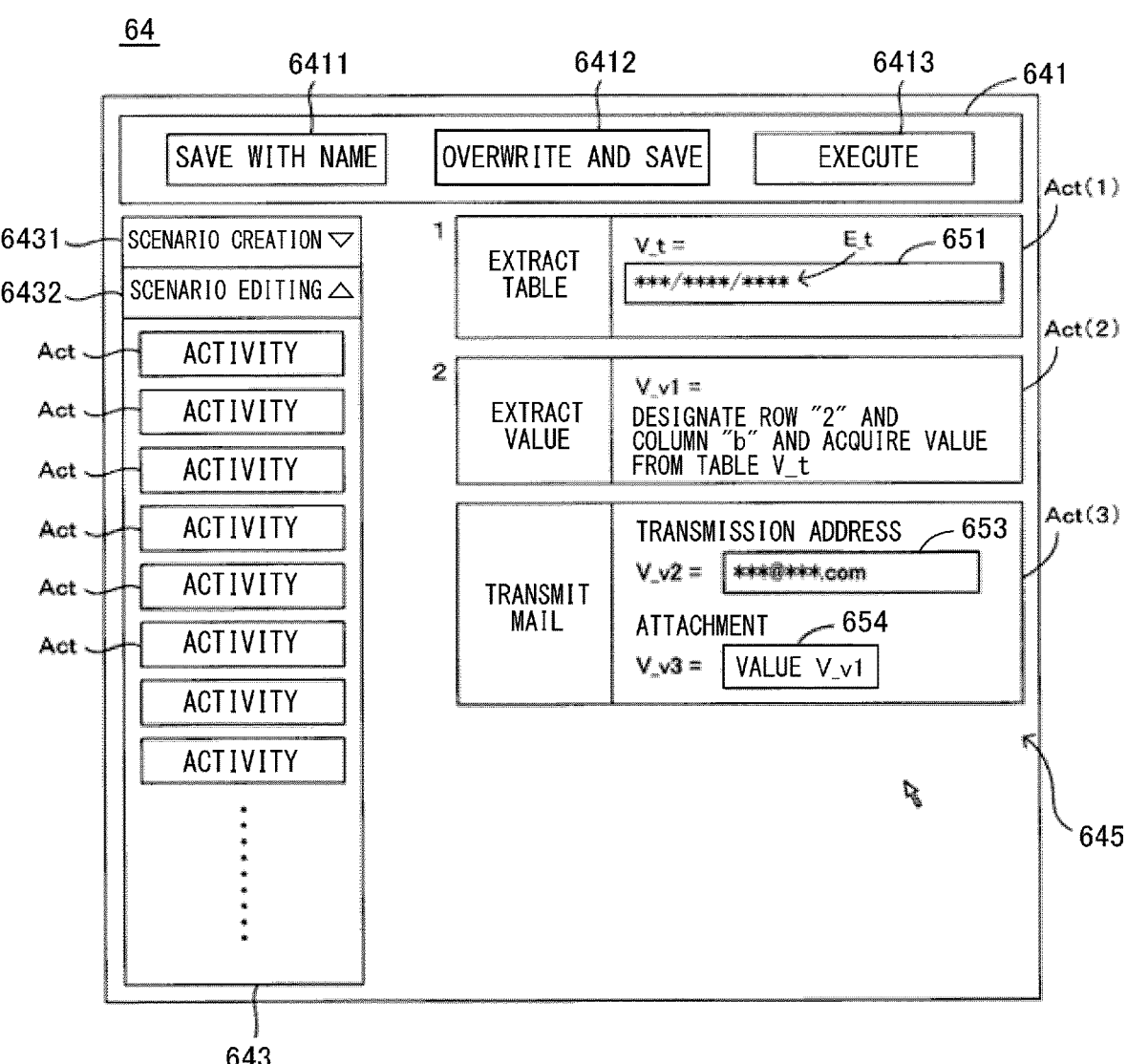

On the scenario management screen 64 illustrated in FIG. 46C, the user performs an operation of designating one of cells included in the table displayed as the entity value E_t as values included in the entity value E_t. When receiving the operation of designating the cell included in the table, the editing operation section 6311 changes a reference destination of the entity value E_v1 of the variable V_v1 based on the operation. That is, an activity of referencing a desired value among the plurality of values included in data of the reference destination of the variable V_t is set by receiving an operation on the display of the entity value E_t including the plurality of values, instead of directly inputting information indicating the reference destination to the input field 652. Specifically, FIG. 46D illustrates a case where "5" in the second row and a column b is selected out of the entity value E_t of the variable V_t. In this state, when the OK button is operated (clicked), a content of the activity Act(2) is changed so as to acquire, as the entity value E_v1 of the variable V_v1, the value in the second row and the column b from among the plurality of values constituting the entity value E_t acquired as the variable V_t (FIG. 46E). Thus, the data acquired as the entity value E_v1 of the variable V_v1 when the activity Act(2) is executed can be changed.

Figure 48:
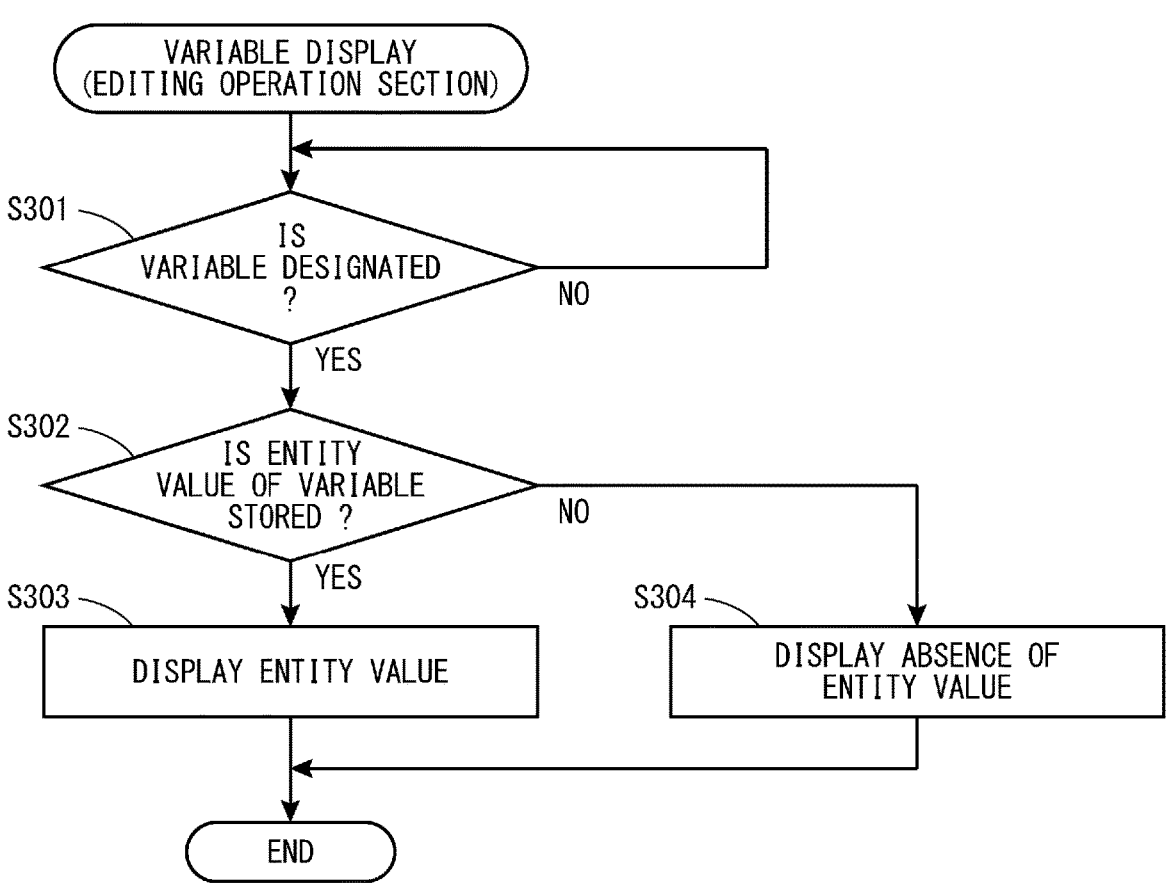
FIG. 48 is a flowchart illustrating an example of variable display executed by an editing operation section in a scenario editing mode.

FIG. 48 is a flowchart illustrating an example of a variable display executed by the editing operation section in scenario editing mode. The display of the entity value E of the variable V illustrated in FIGS. 46B, 46C, and 46D described above is executed according to the flowchart of FIG. 48. In step S301, the editing operation section 6311 confirms whether the variable V requested to be displayed is designated by the user. For example, when the designation operation (operation of selecting the variable from the candidates F) illustrated in FIG. 46B is executed by the user ("YES" in step S301), the editing operation section 6311 confirms whether the entity value E of the designated variable V is stored in the second storage area R2 (step S302). When the entity value is stored ("YES" in step S302), the editing operation section 6311 displays the entity value E of the designated variable V on the display unit 6243 (step S303) as illustrated in FIGS. 46C and 46D. Note that a case where the entity value E of the variable V is not stored in the second storage area R2 in the memory section 622 is also assumed although not illustrated in the examples of FIGS. 46A to 46E. In such a case, the editing operation section 6311 determines "NO" in step S302 and displays that the entity value E of the variable V does not exist on the display unit 6243 (step S304). Note that whether the entity value E of the variable V is stored in the second storage area R2 is confirmed when the variable V is designated in this flowchart, but whether or not the entity value E associated with the variable V is held in the second storage area R2 may be determined for each of the variables V included in the scenario to be displayed before the variable V is designated and the display may be performed according to whether or not the entity value E is stored in the second storage area R2.

In the embodiment described above, the execution section 635 acquires the entity value E of the variable V referenced in the activity Act in the first storage area R1 (step S103) with the execution of the activity Act included in the scenario. That is, the execution section 635 causes the entity value E of the variable V that is referenced in the activity Act to be held in the second storage area R1 so as to be referenceable when another activity Act is executed. In addition, the holding section 6372 causes the entity value E to be held in association with the variable V in the second storage area R2 accessible by the editor 631 configured to manage the scenario (step S203). Therefore, when managing the scenario, the user can access the entity value E of the variable V by the editor 631 without passing through the execution section 635.

In addition, the second storage area R2 holds the entity value E even after the release of the first storage area R1 (step S105 in FIG. 44). In such a configuration, even after the creation of the scenario ends (that is, when the scenario creation mode ends) and the first storage area R1 in which the entity value E is acquired is released, the entity value E of the variable V referenced in the activity Act included in the scenario can be read from the second storage area R2. Therefore, the user can access the entity value E of the variable V that is referenced in the activity Act when managing the scenario even after the first storage area R1 is released.

In addition, the editing operation section 6311 is provided. The editing operation section 6311 displays the entity value E held in the second storage area R2 in association with the variable V for the variable V included in the scenario on the display unit 6243 as a display indicating contents of operations automated by the scenario (FIGS. 46C and 46D). In such a configuration, the user can confirm the contents of the operations automated by the scenario while confirming the entity value E of the variable V included in the scenario as a management target.

In addition, when there is no entity value E held in the second storage area R2 in association with the variable V (when "NO" in step S302), the editing operation section 6311 displays such a fact on the display unit 6243. In such a configuration, the user can easily grasp the presence or absence of the entity value E of the variable V included in the scenario as the management target.

In addition, the scenario creation section 633 that receives a setting of an activity Act included in the scenario and creates the activity Act is provided. In addition, the scenario creation section 633 sends a scenario execution instruction Cg to the execution section 635 based on the created activity Act. In such a configuration, the entity value E of the variable V used in the activity Act can be acquired (step S103) with the execution of the activity Act set to the scenario being created, and held in the second storage area R2 (step S203). The setting of the activity Act includes, for example, determination of a content of the activity Act. Note that the scenario creation section can receive an operation related to the creation of the scenario, such as the arrangement of the activity Act in the scenario display field (setting of a processing order of the created activity Act). At this time, the scenario execution instruction Cg is not limited to one based on the created activity Act, and the scenario execution instruction Cg corresponding to a scenario creation status may be sent.

In addition, when receiving a variable designation operation (step S301) of designating the variable V which is a display target, the editing operation section 6311 reads the entity value E associated with the variable V from the second storage area R2 and displays the entity value E on the display unit 6243. In such a configuration, the user can confirm the entity value E of the variable V by simple work such as executing the variable designation operation on the editing operation section 6311 via the display unit 6243.

In addition, the monitoring section 6371 monitoring that the execution section 635 acquires the entity value E of the variable V in the first storage area R1, that is, that the entity value E is held in the first storage area R1 is provided. When the monitoring section 6371 confirms that the entity value E of the variable V is held in the first storage area R1 by the execution section 635 (step S201), the holding section 6372 causes the entity value E of the first storage area R1 to be held in the second storage area R2 (step S203). In such a configuration, holding of the entity value E of the variable V acquired by the execution section 635 in the second storage area R2 can be reliably executed by a function of the monitoring section 6371.

Incidentally, the functional sections 6311, 6312, 633, 635, 6371, and 6372 configured in the computation section 621 are achieved by individual processes as illustrated in FIG. 41. Specifically, the execution section 635 executes the activity Act as an execution section process (a first process), and the holding section 6372 causes the entity value E acquired in the first storage area R1 to be held in the second storage area R2 in association with the variable V as a holding process (a second process) different from the execution process. In such a configuration, the execution of the activity Act and the holding of the entity value E are executed in separate processes (the execution process and the holding process). Accordingly, the entity value E can be held in the second storage area R2 by the holding section 6372 in parallel with the execution of the activity Act by the execution section 635, and thus, the influence on the execution of the activity Act by the execution section 635 is reduced. Therefore, the entity value E can be held in the second storage area R2 by the holding process even after the execution process is ended with the completion of the execution of the activity Act while suppressing the influence on the execution of the activity Act by the execution section 635. As a result, when managing the scenario, the editor 631 can access the entity value E of the variable V referenced in the scenario.

Meanwhile, a case where the same name is assigned to a plurality of variables V in the scenario is assumed. When variable name management is executed, the plurality of variables V having the same name are distinguished and managed.

Figure 49:
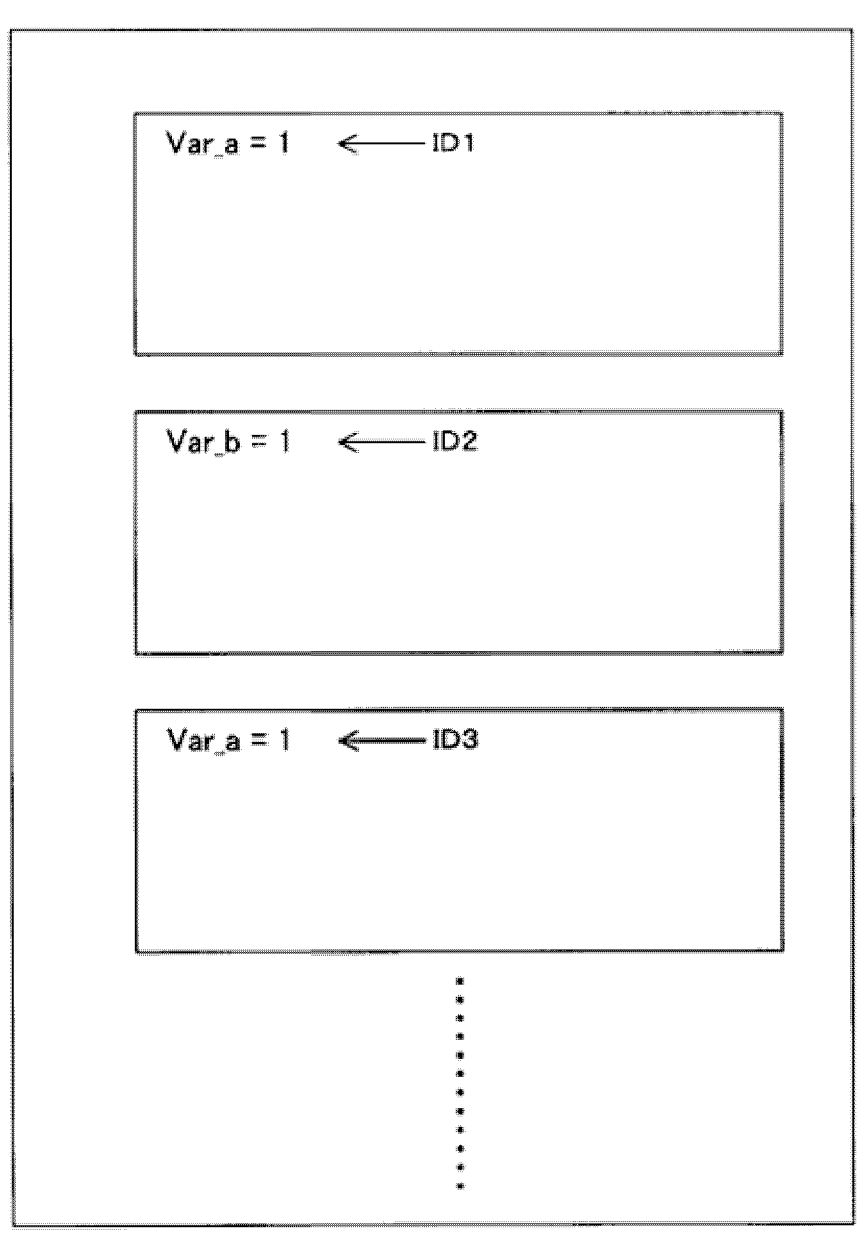
FIG. 49 is a schematic view illustrating contents of variable name management.

FIG. 49 is a diagram schematically illustrating contents of the variable name management. In the example of FIG. 49, a variable Var_a, a variable Var_b, and a variable Var_a are declared in order, and the variable in the first declaration and the variable in the third declaration are the same. Therefore, if a name of the variable itself is associated with an entity value E when the entity value E of each of the variables Var_a is held in the second storage area R2 in association with the variable, the names conflict. Therefore, in the variable name management described herein, every time the variable V is declared, the monitoring section 6371 (and the holding section 6372) assigns different identifiers ID1, ID2, and ID3 to the variables V, associates the identifiers ID1, ID2, and ID3 respectively with the entity values E, and holds the entity values E in the second storage area R2. Such identification of the variable V by the identifiers ID1, ID2, and ID3 corresponds to identification of the variable V based on s scope of the variable V. The scope of the variable V is a valid range of the variable V in the scenario. When the variable V is identified based on the scope of the variable V, variables having the same variable name and being valid in different ranges are distinguished. In addition, holding the entity values E in the second storage area R2 respectively in association with the identifiers ID1, ID2, and ID3 corresponds to holding the entity values E of the variable V in the second storage area R2 respectively in association with the scopes of the variable V.

Figure 50:
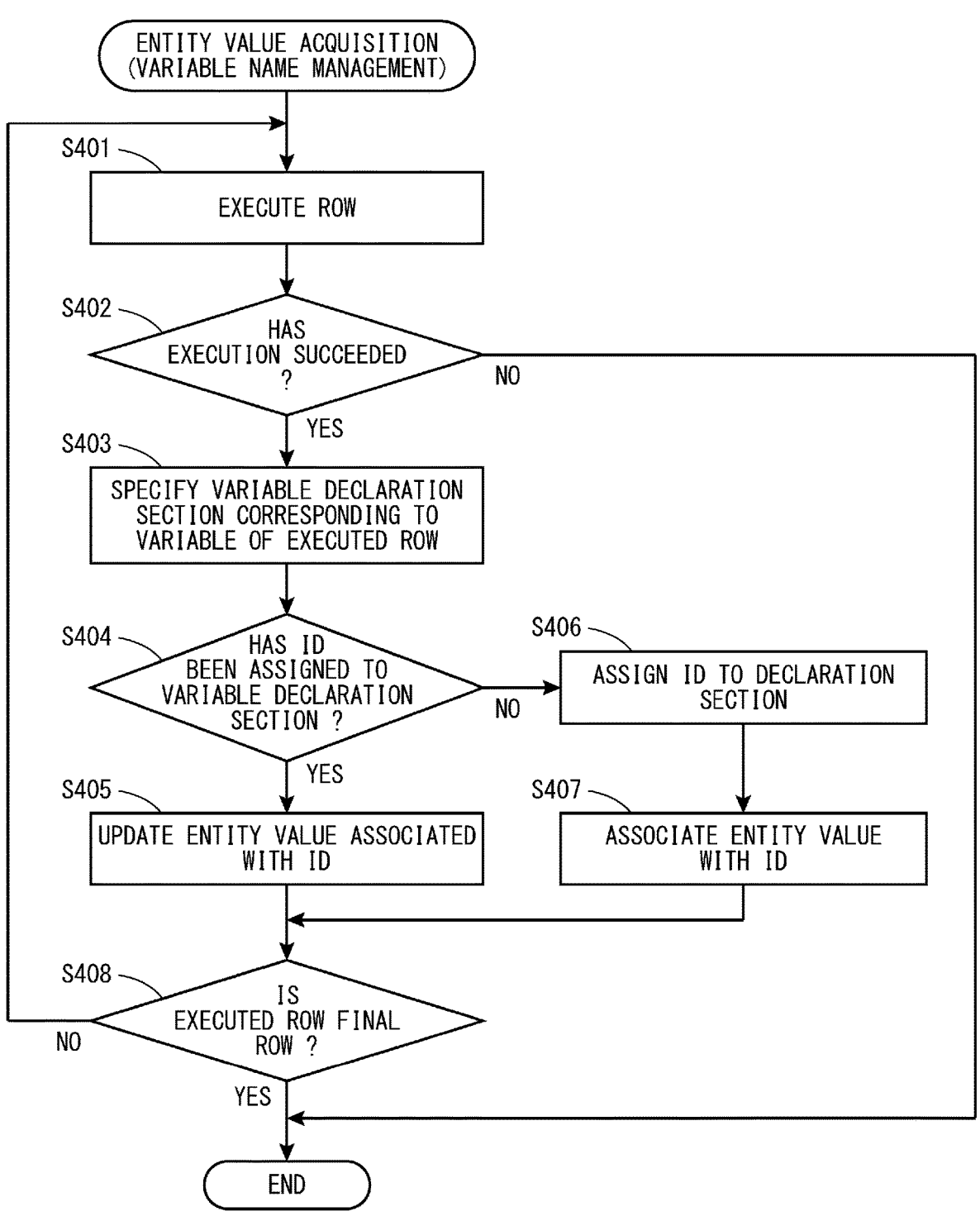
FIG. 50 is a flowchart illustrating an example of variable name management executed with acquisition of an entity value of a variable.

FIG. 50 is a flowchart illustrating an example of the variable name management executed with acquisition of an entity value of a variable. When the execution section 635 executes a row of an activity Act (that is, the row of a program that defines the activity Act) constituting a scenario (step S401), the monitoring section 6371 confirms whether the execution of the row has succeeded (step S402). When the execution of the row fails ("NO" in step S402), the flowchart in FIG. 50 ends. On the other hand, when the execution of the row succeeds ("YES" in step S402), the monitoring section 6371 specifies a variable declaration section that declares a variable V of the row executed in step S401. This corresponds to specifying a node (node in parsing) that declares the variable V.

In step S404, the monitoring section 6371 confirms whether or not an identifier ID has already been assigned to the variable declaration section specified in step S403. When an identifier ID has already been assigned ("YES" in step S404), the holding section 6372 updates an entity value E stored in the second storage area R2 in association with the identifier ID to an entity value E acquired most recently (step S405). On the other hand, when an identifier ID has not been assigned ("NO" in step S404), the monitoring section 6371 assigns an identifier ID to the variable declaration section (step S406), and the holding section 6372 stores the entity value E of the variable V declared by the variable declaration section in the second storage area R2 in association with the identifier ID.

In this manner, the holding section 6372 holds the entity value E in the second storage area R2 in association with the scope of the variable V (steps S405, S406, and S407) in the example illustrated in FIGS. 49 and 50. In such a configuration, even when the same name is assigned to the plurality of variables V, it is possible to identify the entity values E of the variables V based on the scopes associated with the variables V.

In other words, the holding section 6372 associates the scope of the variable V with the entity value E by associating the node (that is, the variable declaration section) declaring the variable V with the entity value E (steps S403 and S406). Since the node of the variable declaration is used in this manner, the scope of the variable V and the entity value E can be accurately associated with each other.

In addition, the second storage area R2 holds the most recent entity value E acquired for the variable V (step S405). In such a configuration, the entity value E of the second storage area R2 is updated every time a new entity value E is acquired, and thus, the user can always confirm the most recent entity value E.

By the way, in the above-described embodiment, the entity value E of the variable V is displayed on the display unit 6243 to assist editing work of the user in the scenario editing mode as an example in which the user manages the scenario. In particular, in the example of FIG. 46B and the like, the candidate F that can be used as the argument is displayed on the display unit 6243 when the user edits the activity Act(2) related to the variable V_v1. At this time, a variable V (the variable V_t in the example of FIG. 46B) including an activity Act as an editing target in a scope is displayed as the candidate F, and an entity value E of the variable V selected from the candidate F is displayed. Next, an example of control that enables such entity value display will be described.

Figure 51:
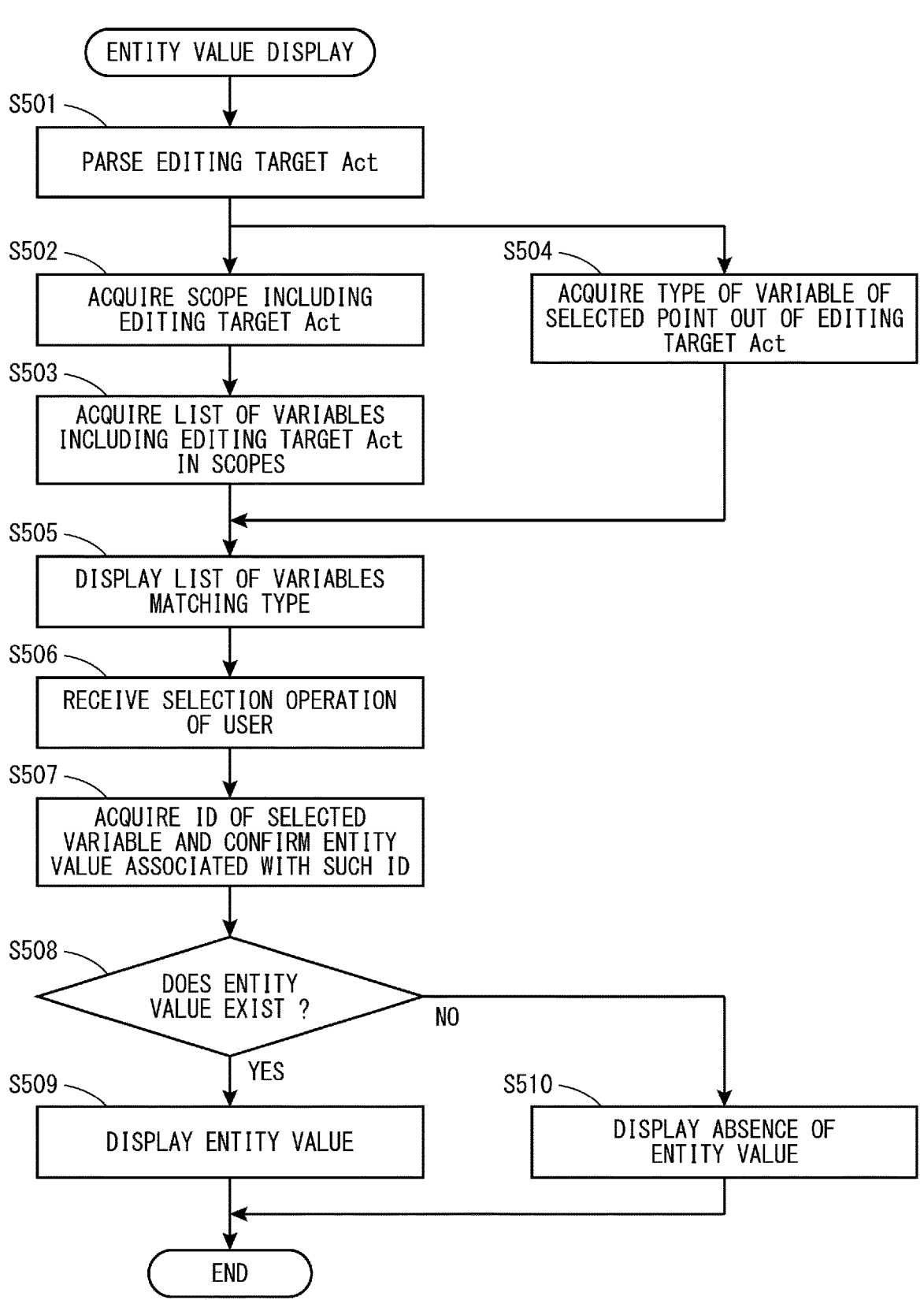
FIG. 51 is a flowchart illustrating an example of control for entity value display in a scenario editing mode.

FIG. 51 is a flowchart illustrating an example of control for the entity value display in the scenario editing mode. In step S501, the editing operation section 6311 parses syntax of the activity Act (editing target activity Act) selected by the user as the editing target. Then, the editing operation section 6311 acquires a scope including the editing target activity Act (step S502) and acquires a list of variables V including the editing target activity Act in scopes (step S503). This corresponds to acquisition of a list of the variables V that can be used in the editing target activity Act.

In addition, the editing operation section 6311 acquires a type of the variable V of a selected point in the editing target activity Act (step S504) in parallel with steps S502 and S503. Specifically, the input field 652 (selected point) is selected out of the editing target activity Act(2) according to the example of FIG. 46B, and thus, the type received in the input field 652 is acquired. Here, the type received in the input field 652 indicates a format of data, such as a numerical value, a character, a date, or a table, treated in the activity Act(2) according to an input content with respect to the input field 652.

In step S505, the editing operation section 6311 creates a list of variables V having the type acquired in step S504 from among the variables acquired in step S503, and displays the list on the display unit 6243. Thus, the candidate F illustrated in FIG. 46B is displayed.

In step S506, the editing operation section 6311 receives a selection operation of the user for selecting one variable V from among the candidates F. Then, the editing operation section 6311 acquires an identifier ID of the selected variable V, and confirms an entity value E held in the second storage area R2 in association with the identifier ID (step S507). When the entity value E exists ("YES" in step S508), the editing operation section 6311 displays the entity value E on the display unit 6243 (step S509). On the other hand, when the entity value E does not exist ("NO" in step S508), the editing operation section 6311 displays the absence of the entity value E on the display unit 6243 (step S510).

Figure 52:
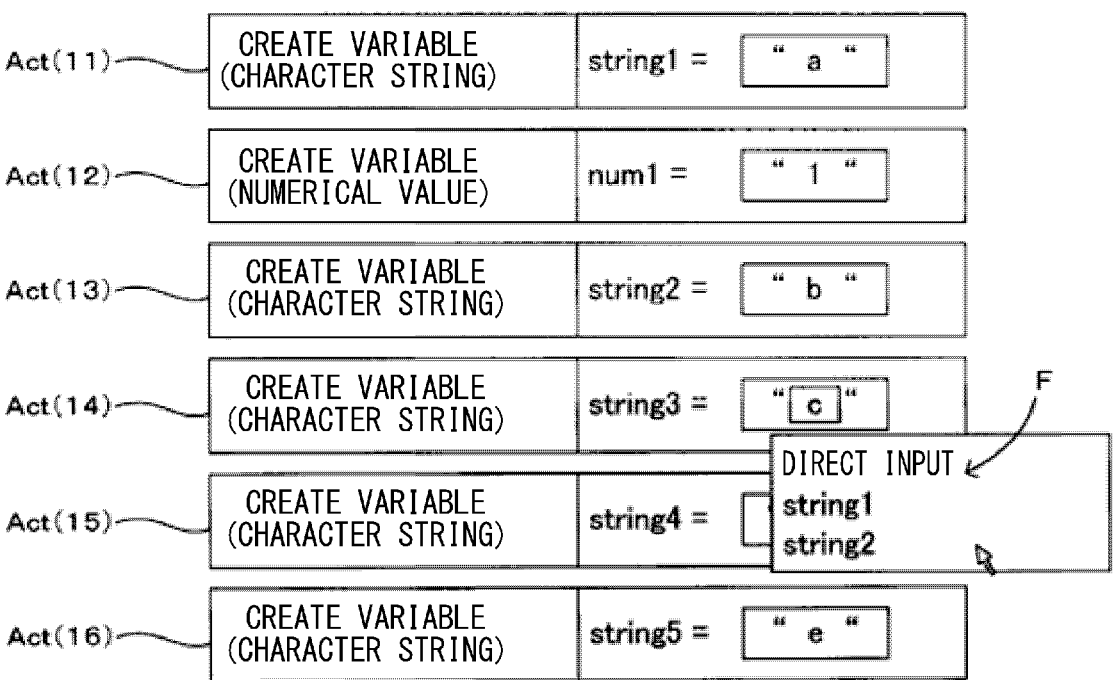
FIG. 52 is a schematic view illustrating an example of a result of control illustrated in FIG. 51.

FIG. 52 is a view schematically illustrating an example of a result of the control illustrated in FIG. 51. The example of FIG. 52 illustrates a scene in which a scenario in which six activities Act(11) to Act(16) respectively declaring variables V are executed in order is edited (the scenario editing mode). Among the activities Act(11) to Act(16), types of the variables V declared in the five activities Act(11) and Act(13) to Act(16) are characters, and a type of the variable V declared in one activity Act(12) is a numerical value. Then, the variable V (string3) declared in the activity Act(14) is selected as an editing point. The variables V including the activity Act(14) in scopes are variables string1, num1, and string2 of the activities Act(11), Act(12), and Act(13). However, the type of the variable V (string3) treated in the activity Act(14) is the character, and thus, the variables string1 and string2 matching the type are displayed as candidates F.

Here, focusing on an activity Act of declaring a variable V whose type is a character, the first activities Act(11), Act(13), Act(15), and Act(16), which are non-editing targets that declare the variables string1, string2, string4, and string5 (first variables), and the second activity Act(14), which is an editing target, are displayed on the display unit 6243 by the editing operation section 6311 in the example of FIG. 52. At this time, among the non-editing target activities Act(11), Act(13), Act(15), and Act(16), the variables string1 and string2 declared in the activities Act(11) and Act(13) include the editing target activity Act(14) in scopes, but the variables string4 and string5 declared in the activities Act(15) and Act(16) do not include the editing target activity Act(14) in scopes. On the other hand, the editing operation section 6311 displays the variables string1 and string2, which include the activity Act(14) in the scopes, as the candidates F of the variable V (string3) used in the editing target activity Act(14), and does not display the variables string4 and string5 which do not include the activity Act(14) in the scopes. In such a configuration, when the user sets the variable V (string3) referenced in the editing target activity Act(14), only the variables V (string1 and string2) that can be referenced in the activity Act(14) are displayed as the candidates F. Therefore, the user can easily perform the work of setting the variable V.

By the way, in the scenario editing mode, some activities Act among the plurality of activities Act constituting the scenario can be selectively executed (partial execution). In particular, the entity value E of the variable V is held in the second storage area R2 in the above-described embodiment. Therefore, when a partial execution target activity Act uses a variable V declared in a preceding activity Act prior thereto, only the partial execution target activity Act can be executed without executing the preceding activity Act by using an entity value E of the variable V read from the second storage area R2. Next, an example of control that enables such partial execution will be described.

Figure 53:
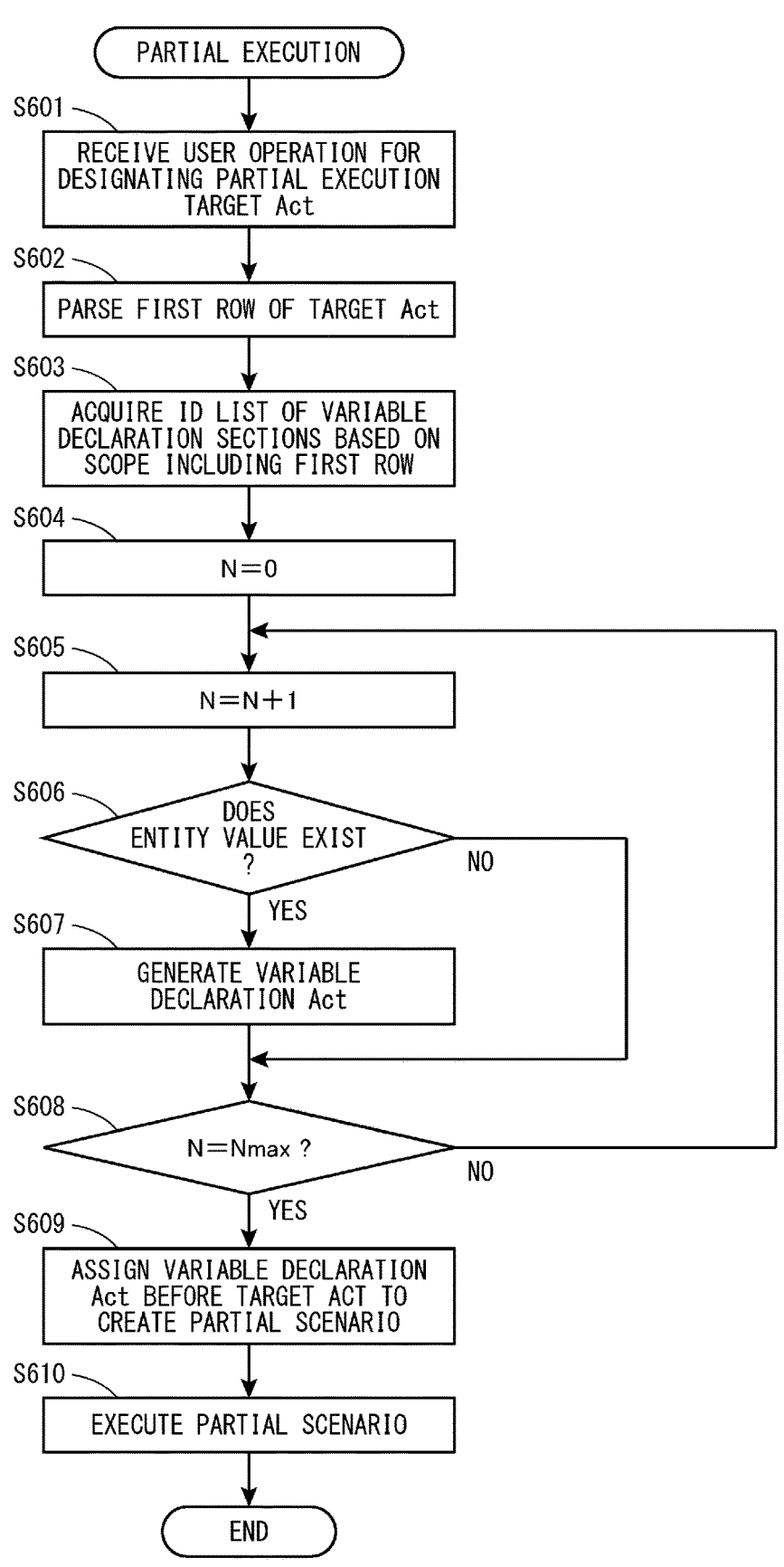
FIG. 53 is a flowchart illustrating an example of control for partial execution in a scenario editing mode.

FIG. 53 is a flowchart illustrating an example of the control for the partial execution in the scenario editing mode. In step S601, the scenario execution operation section 6312 receives an operation of the user for designating the partial execution target activity Act. In step S602, the scenario execution operation section 6312 executes parsing on the first row of the partial execution target activity Act.

Then, the scenario execution operation section 6312 acquires a list (ID list) of identifiers ID of variable declaration sections of variables V having scopes including the first row (step S603).

The scenario execution operation section 6312 resets a count value N for counting the identifier ID of the ID list to zero (step S604), and increments the count value N (step S605). Then, the scenario execution operation section 6312 confirms whether there is an entity value E held in the second storage area R2 in association with the Nth identifier ID in the list (step S606). When the entity value E exists for the Nth identifier ID (in the case of "YES" in step S606), the scenario execution operation section 6312 generates a variable declaration activity Act of declaring the variable V associated with the entity value E (step S607), and then, proceeds to step S608. On the other hand, when the entity value E does not exist for the Nth identifier ID ("NO" in step S606), the processing proceeds to step S608 without executing step S607. Incidentally, in this case, the absence of the entity value E of the identifier ID may be displayed on the display unit 6243.

In step S608, the scenario execution operation section 6312 confirms whether the count value N has reached the number (Nmax) of identifiers ID included in the ID list. When the count value N is less than the number Nmax ("NO" in step S608), steps S605 to S608 are repeated. On the other hand, when the count value N is the number Nmax ("YES" in step S608), the scenario execution operation section 6312 assigns the variable declaration activity Act generated in step S607 before the partial execution target activity Act to generate a partial scenario (step S609). Further, the scenario execution operation section 6312 sends the scenario execution instruction Ce for requesting execution of the generated partial scenario to the execution section 635, and the execution section 635 executes the partial scenario according to the scenario execution instruction Ce (step S610).

In step S610, the execution section 635 executes the partial execution target activity Act by using the entity value E of the variable V held in the second storage area R2. Specifically, the execution section 635 stores the entity value E read from the second storage area R2 in the first storage area R1, and uses the entity value E to execute the partial execution target activity Act.

In the present embodiment, the variable declaration activity Act generated in step S607 is an activity in which the declaration of the variable V and the acquisition of the entity value E of the variable V are performed by being executed by the execution section 635. The declaration of the variable V indicates that the variable V is valid at least after the activity in which the variable V is declared, that is, a scope of the variable V is present after the activity. In addition, as of the entity value E of the variable V is acquired, the entity value E is held in the first storage area R1 so as to be referenceable as the entity value of the variable V within a valid range of the variable V. Since the entity value E of the variable V to be declared is acquired by executing the variable declaration activity Act generated in step S607 in the present embodiment, the entity value E is held in the first storage area R1 so as to be referenceable at least in the valid range of the variable V that is the range after the variable declaration activity Act.

A description will be given regarding control of the partial execution in a case where an operation of the user for designating the activity Act(2) illustrated in FIG. 46E as the partial execution target activity Act is received.

First, in the scenario illustrated in FIG. 46E, the activity Act(1) corresponds to an operation of acquiring a value from an application program other than the scenario management program 612. In the activity Act(1), the value acquired in the operation is acquired as the entity value E_t of the variable V_t, and the entity value E_t is held in the first storage area R1. In addition, the activity Act(2) in the scenario illustrated in FIG. 46E corresponds to an operation of processing a value, and is the activity Act(2) that uses the variable V_t included in the activity Act(1). In other words, the activity Act(2) is an activity that references the entity value E_t, which is held in the first storage area R1 when the activity Act(1) is executed, as the entity value E_t of the variable V_t when being executed by the execution section 635. Note that the activity Act(1) illustrated in FIG. 46E declares the variable V_t, and thus, it is indicated that a scope of the variable V_t is present after the activity, that is, after the activity Act(2).

When receiving an operation of the user for designating the activity Act(2) as the partial execution target, the scenario execution operation section 6312 generates a variable declaration activity Act of declaring the variable V_t included in the activity (2). Then, the scenario execution operation section 6312 generates a partial scenario including the variable declaration activity Act of declaring the generated variable V_t and the activity Act(2) designated as the partial execution target, and sends the scenario execution instruction Ce for instructing execution of the partial scenario to the execution section 635. Therefore, when receiving the operation of the user for designating the activity Act(2) as the partial execution target, the scenario execution operation section 6312 sends the scenario execution instruction Ce in which the variable declaration activity Act of the variable V_t and the activity Act(2) are selected to the execution section 635 as the scenario execution instruction Ce in which the activity Act corresponding to the activity Act(2) is designated as the execution target. At this time, the variable declaration activity Act of declaring the variable V_t is an activity Act of acquiring the entity value E_t held in the second storage area R2, which is different from the activity Act(1) of acquiring the entity value E_t by referencing a path input in the input field 651. That is, the variable declaration activity Act is an activity Act of holding the entity value E_t of the variable V_t in the first storage area R1 with reference to the entity value E_t held in the second storage area R2. After holding the entity value E_t read from the second storage area R2 in the first storage area R1, the execution section 635 references the entity value E_t held in the first storage area R1 at the time of executing the partial execution target activity Act(2).

In this manner, the scenario execution operation section 6312 receives a scenario displayed in the scenario display field 645 as the scenario selected by the user, and receives selection of an activity Act included in the selected scenario (step S601). Further, the scenario execution operation section 6312 sends the scenario execution instruction Ce for instructing execution of activities Act (that is, the variable declaration activity Act and the selected activity Act) corresponding to the selected activity Act to the execution section 635. In such a configuration, the activity Act selected from among the plurality of activities Act included in the scenario can be partially executed, and an operation of the activity Act can be confirmed.

In a scenario that corresponds to the operation of acquiring a value from an application program other than the scenario management program 612, and includes an activity Act of acquiring an entity value E of a variable V as the value and an activity Act of using the variable V, the activity Act of using the variable V is an activity Act of referencing an entity value E to be held in the first storage area R1. In a case where an activity Act designated as a partial execution target includes an activity Act of referencing the entity value E to be held in the first storage area R1, the scenario execution operation section 6312 generates the activity Act of causing the entity value E to be held in the first storage area R1 with reference to the second storage area R2. In such a configuration, the execution section 635 can execute the activity Act designated as the partial execution target without referencing the entity value E held in the first storage area R1. For example, in a case where there is a difference between an entity value E held in the first storage area R1 and an entity value E held in the second storage area R2, such as a case where the entity value E held in the first storage area R1 is not immediately reflected in the entity value E held in the second storage area R1, it is possible to execute the activity Act that references the entity value E in the second storage area R2.

In addition, there is a case where an activity Act designated as a partial execution target in a state in which there is no entity value E held in the first storage area R1, such as a state after the scenario creation mode ends and the first storage area R1 is released, includes an activity Act that references the entity value E held in the first storage area R1 and does not include an activity Act of holding the entity value E in the first storage area R1. In this case, the execution section 635 causes the entity value E held in the second storage area R2 to be held in the first storage area R1 in association with the variable V used in the activity of referencing the entity value E held in the first storage area R1, and then, executes the activity Act of referencing the entity value E held in the first storage area R1. In this manner, when the entity value E of the variable V held in the second storage area R2 is utilized, the activity Act of referencing the entity value E held in the first storage area R1 can be partially executed without executing the activity Act of holding the entity value E in the first storage area R1 included in the scenario even in a state in which the entity value E is not held in the first storage area R1.

Note that the activity Act that is generated by the scenario execution operation section 6312 and references the second storage area R2 to hold the entity value E in the first storage area R1 is executed in addition to the activity Act designated as the partial execution target in the present embodiment, but, in a case where the partial execution target activity Act includes an activity Act of holding the entity value E in the first storage area R1, an activity Act that is generated by the scenario execution operation section 6312 and references the entity value E held in the second storage area R2 to hold the entity value E in the first storage area R1 may be executed instead of the above activity Act. In such a configuration, it is possible to execute the activity Act designated as the partial execution target without executing the activity Act of holding the entity value E in the first storage area R1 in the scenario. In a case where the activity Act of holding the entity value E in the first storage area R1 in the scenario is an activity that depends on an execution environment, an activity Act designated without depending on the execution environment can be executed. In addition, in a case where the activity Act of holding the entity value E in the first storage area R1 in the scenario is an activity that requires time to execute, it is possible to shorten the time required to execute the designated activity Act. Further, in a case where the activity Act of holding the entity value E in the first storage area R1 in the scenario is an activity that affects the outside, an activity Act that is designated without affecting the outside can be executed.

As described above, in the present embodiment, the storage section 6111 of the server 611 corresponds to an example of a "recording medium" of the present invention; the scenario management program 612 corresponds to an example of a "scenario management program" of the present invention; the terminal device 62 corresponds to an example of a "scenario management device" and a "computer" of the present invention; the display unit 6243 corresponds to an example of a "display unit" of the present invention; the editor 631 corresponds to an example of a "management section" of the present invention; the scenario creation section 633 corresponds to an example of a "scenario creation section" of the present invention; the execution section 635 corresponds to an example of an "execution section" of the present invention; the monitoring section 6371 corresponds to an example of a "monitoring section" of the present invention; the holding section 6372 corresponds to an example of a "holding section" of the present invention; the activity Act corresponds to an example of an "activity" of the present invention; the scenario execution instruction Cg corresponds to an example of a "scenario execution instruction" of the present invention; the first storage area R1 corresponds to an example of a "first storage area" of the present invention; and the second storage area R2 corresponds to an example of a "second storage area" of the present invention.

Note that the present invention is not limited to the above-described embodiments, and various modifications can be made to those described above without departing from the gist thereof. For example, a timing for storing the entity value E of the variable V in the second storage area R2 is not limited to the time of execution of the scenario creation mode, and may be changed. That is, the entity value E acquired in the first storage area R1 when the execution section 635 executes the activity Act in the scenario creation mode is stored in the second storage area R2 in the above-described embodiment. However, the entity value E of the variable V may be changed to be stored in the second storage area R2 after the end of the scenario creation mode and before the start of the scenario editing mode. In this modification, the scenario execution instruction Ce for instructing execution of a created scenario is sent from the scenario execution operation section 6312 to the execution section 635, and an entity value E acquired in the first storage area R1 by the execution of an activity Act in the scenario is held in the second storage area R2 by the holding section 6372.

That is, the scenario execution operation section 6312 receives a scenario execution operation indicating execution of the created scenario from the user, and sends the scenario execution instruction Ce to the execution section 635 based on the received scenario execution operation. In such a configuration, the user can acquire the entity value E of the variable V used in the activity Act included in the scenario by executing the created scenario, and hold the entity value E in the second storage area R2. Then, the entity value E read from the second storage area R2 can be confirmed on the display unit 6243 in the scenario editing mode.

Note that a specific configuration of the second storage area R2 holding the entity value E of the variable V can be appropriately changed. Therefore, the second storage area R2 may be secured in the storage section 623 instead of the memory section 622 to hold the entity value E of the variable V in the second storage area R2 in a nonvolatile manner. That is, the second storage area R2 may be a nonvolatile storage element.

In addition, it is not essential that the execution of the activity Act and the holding of the entity value E are executed in the separate processes (the execution process and the holding process). Therefore, the holding section 6372 may hold the entity value E acquired in the first storage area R1 in the second storage area R2 in association with the variable V in the same process as the execution process in which the execution section 635 executes the activity Act. In such a configuration, for example, in FIG. 41, the execution section 635 and the holding section 6372 are achieved by one functional block, and the functional block releases the first storage area R1 as the variable V becomes unnecessary and secures the second storage area R2 even after the release of the first storage area R1.

Similarly, it is unnecessary to execute the respective functional blocks (FIG. 41) configured in the computation section 621 in separate processes. Therefore, the editor 631 and the execution section 635 are not necessarily executed in separate processes, but may be executed in the same process. Alternatively, conversely, one functional block may be divided into a plurality of functional blocks. For example, the editor 631 does not necessarily have a function of receiving an operation of the user on the UI 624, and the function may be separated from the editor 631 and carried by another module.

In addition, it is unnecessary to configure all of the functional blocks 31, 33, 35, and 37 in FIG. 41 in the computation section 621 of the terminal device 62, and some functional blocks (for example, the execution section 635 and the like) may be configured in a processor of the server 611. In this case, the terminal device 62 and the server 611 cooperate to function as the "scenario management device" of the present invention.

The present invention is applicable to all RPA technologies for reducing a work load on a user by automating work that the user has been executing using a computer.

What is claimed is:

1. A scenario management device that creates a scenario for automating an operation of performing transcription to a second application, which is a transcription destination, based on data acquired from a first application, which is a transcription source, the scenario management device comprising:

a schematic procedure creation section configured to select the first application and the second application and create a schematic procedure, wherein the schematic procedure indicates transmission and reception of data between the first application and the second application;

an acquisition range designation section configured to designate a range for acquisition of data of the first application selected by the schematic procedure creation section;

a memory section that holds data in the range designated by the acquisition range designation section as table data in a table format;

a transcription destination designation section configured to designate the transcription destination to which data based on the table data is to be transcribed, the transcription destination being the second application selected by the schematic procedure creation section; and a scenario generation section that generates the scenario, which is an automation program, based on the schematic procedure created by the schematic procedure creation section, the range set by the acquisition range designation section, and the transcription destination designated by the transcription destination designation section.

2. The scenario management device according to claim 1, further comprising a transcription unit designation section configured to designate a data transcription unit for transcription to the second application.

3. The scenario management device according to claim 2, further comprising a transcription data preview section that displays transcription data to be transcribed to the second application selected by the schematic procedure creation section based on the data transcription unit set by the transcription unit designation section.

4. The scenario management device according to claim 1, further comprising a table operation section configured to designate an operation for table data to be held in the memory section, wherein the scenario generation section generates the scenario for performing transcription of data subjected to processing corresponding to the operation on the table data set by the table operation section.

5. The scenario management device according to claim 1, further comprising an automatic table recognition execution section that shapes the data of the first application into table data, wherein the memory section holds the table data shaped by the automatic table recognition execution section.

6. The scenario management device according to claim 1, wherein the memory section holds data of the first application selected by the schematic procedure creation section in association with a name.

7. The scenario management device according to claim 6, wherein the memory section holds the name as a variable name, and holds the table data in association with the variable name.

8. The scenario management device according to claim 1, wherein the schematic procedure creation section selects a web browser as the first application, and the range of data selected by the acquisition range designation section includes data in a specific range in an html file visible by the web browser, and at least one of data in a same hierarchy as the data in the specific range and data corresponding to the data in the specific range on a page different from the data in the specific range.

9. A computer-readable recording medium recording a program causing a computer to function as the scenario management device according to claim 1.

* * * * *